(12) United States Patent
Lovell et al.

(10) Patent No.: US 11,607,601 B1
(45) Date of Patent: Mar. 21, 2023

(54) GOLF EVENT MANAGEMENT SYSTEM WITH SCORING AND LOCATION TRACKING

(71) Applicant: PGA TOUR, INC., Ponte Vedra Beach, FL (US)

(72) Inventors: Walter Kenneth Lovell, Ponte Vedra Beach, FL (US); Jonas Henrik Gredenhag, Ponte Vedra Beach, FL (US); Jeremy Craven, Ponte Vedra Beach, FL (US); Marianne Marie Davis, Ponte Vedra Beach, FL (US); Troy Thomas Cooke, Ponte Vedra Beach, FL (US); Barry Thomas Walker, Ponte Vedra Beach, FL (US); Jeffrey Luke Howell, Ponte Vedra Beach, FL (US)

(73) Assignee: PGA TOUR, INC., Ponte Vedra Beach, FL (US)

( * ) Notice: Subject to any disclaimer, the term of this patent is extended or adjusted under 35 U.S.C. 154(b) by 0 days.

(21) Appl. No.: 17/841,660

(22) Filed: Jun. 15, 2022

(51) Int. Cl.
*A63B 69/36* (2006.01)
*A63B 71/06* (2006.01)

(52) U.S. Cl.
CPC ...... *A63B 71/0669* (2013.01); *A63B 2220/12* (2013.01); *A63B 2225/50* (2013.01)

(58) Field of Classification Search
CPC ............ A63B 71/0616; A63B 71/0669; A63B 24/0021; A63B 69/36; A63B 69/3691; A63B 2102/32; A63B 2220/12; A63B 2220/14; A63B 2220/62; A63B 2024/0056; G01S 19/19
See application file for complete search history.

(56) References Cited

U.S. PATENT DOCUMENTS

| 5,740,077 A * | 4/1998 | Reeves .............. A63B 71/0622 702/158 |
| 2009/0017944 A1* | 1/2009 | Savarese ................. G01S 13/56 473/409 |
| 2013/0166048 A1* | 6/2013 | Werner .................. G06Q 10/10 700/91 |
| 2022/0196783 A1* | 6/2022 | Dorris ................... G01S 5/0294 |

* cited by examiner

Primary Examiner — Lawrence S Galka
(74) Attorney, Agent, or Firm — Akerman LLP

(57) ABSTRACT

A score tracking system may include a tracking module, companion device, and location system. The tracking module may be configured to be carried by a player competing in a golf tournament. The companion device may be configured to receive an input corresponding to a stroke event and that includes a time stamp corresponding to an occurrence of the stroke event. The location system may collect or receive location data, which comprises or is used by the location system to generate a plurality of sets of location coordinates. Each set of location coordinates may correspond to a location of the tracking module at a specified time. The location system may pair the time stamp with a set of the location coordinates corresponding to the location of the tracking module at the occurrence of the stroke event.

36 Claims, 30 Drawing Sheets

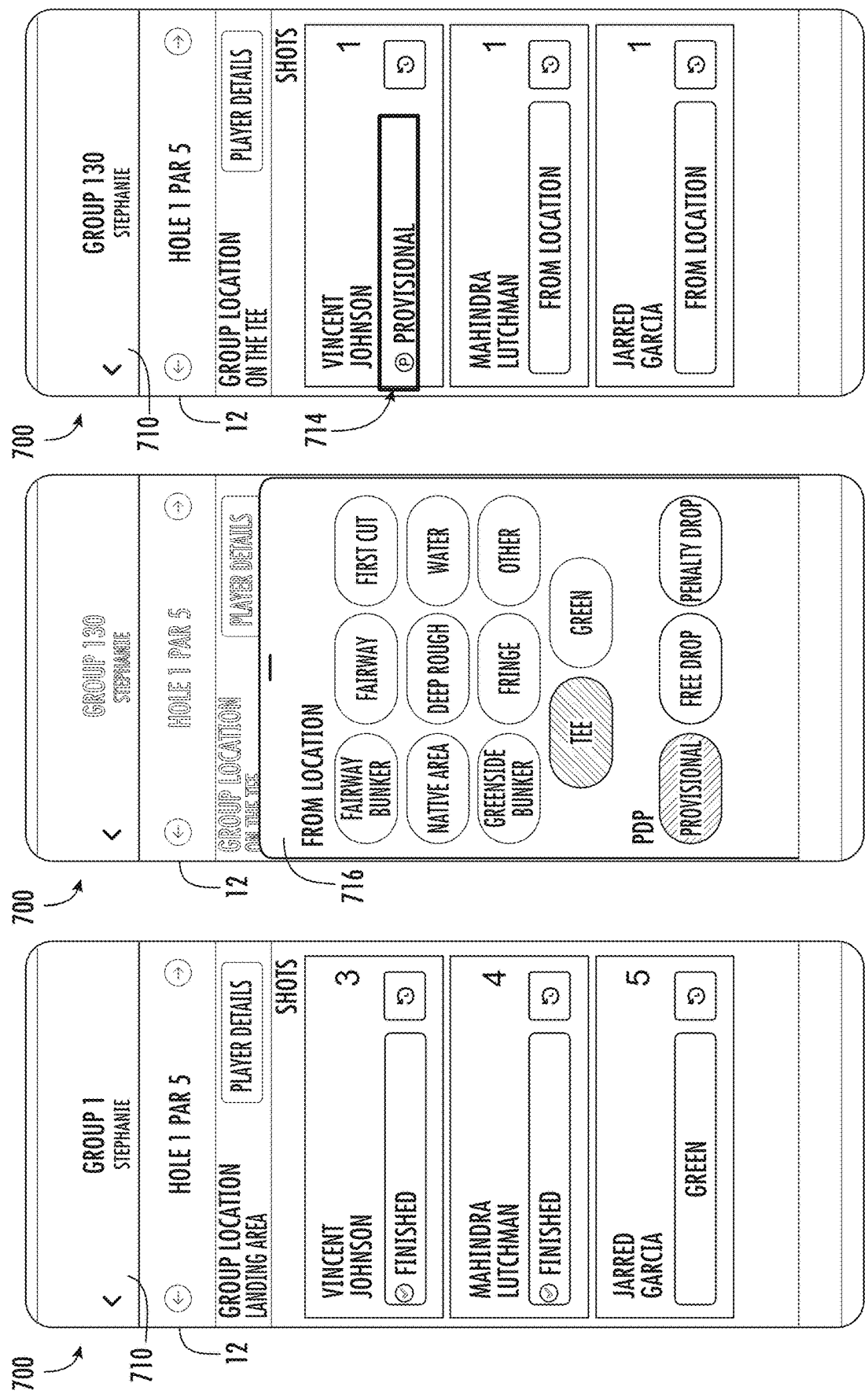

| TEAM PLAYER NAME | FINAL | TIME STAMP | STROKE TYPE | LOCATION | CLUB | PROVISIONAL | IN THE HOLE |
|---|---|---|---|---|---|---|---|
| STROKES ACCESSED | PRELIMINARY | TIME STAMP | STROKE TYPE | LOCATION | CLUB | PROVISIONAL | IN THE HOLE |
| STROKES ACCESSED | SHOT HIT | TIME STAMP | STROKE TYPE | LOCATION | CLUB | PROVISIONAL | IN THE HOLE |
| STROKES ACCESSED | ADDRESSING | TIME STAMP | STROKE TYPE | LOCATION | CLUB | PROVISIONAL | IN THE HOLE |
| STROKES ACCESSED | CLUB SELECTION | TIME STAMP | STROKE TYPE | LOCATION | CLUB | PROVISIONAL | IN THE HOLE |
| STROKES ACCESSED | IN THE HOLE | TIME STAMP | STROKE TYPE | LOCATION | CLUB | PROVISIONAL | IN THE HOLE |

GOLF EVENT MANAGEMENT SYSTEM WITH SCORING AND LOCATION TRACKING

TECHNOLOGY

The present disclosure is related to management of golf events including systems and methods of score and location tracking broadly adaptable to multiple network infrastructures.

BACKGROUND

Management of golf tournament play while also providing detailed location and score tracking for every shot requires a complex behind-the-scenes dance that is made even more difficult due to variability of course location and infrastructure. For example, prior to every PGA TOUR event each golf course is mapped to create a digital image of each hole that is used as background information in order to calculate exact locations and distances between any two coordinates, e.g., tee box and the player's first shot or the shot location and the location of the hole. Using the mapping data together with its ShotLink system, PGA TOUR collects location of every ball and scoring for every shot for every round. In addition to pre-tournament mapping, the ShotLink system also utilizes a complex and costly infrastructure that takes days to set up and takedown and must be transported between events. Successful operation of the ShotLink system is also dependent on a volunteer workforce of up to 350 volunteers per event. The tournament data provided by the ShotLink system has been proven to be invaluable to fans and players alike. However, the time, expense, and infrastructure required to operate the ShotLink system make it impractical for use at lower level tournaments.

What is needed are systems and methods for providing golf event management that provide accurate tracking operations in a portable design, requiring reduced setup time and personnel, and that are widely adaptable to course conditions and infrastructures.

SUMMARY

In one aspect, a score tracking system may include a tracking module, companion device, and location system. The tracking module may be configured to be carried by a player competing in a golf tournament. The companion device may be configured to receive an input corresponding to a stroke event and that includes a time stamp corresponding to an occurrence of the stroke event. The location system may collect or receive location data, which comprises or is used by the location system to generate a plurality of sets of location coordinates. Each set of location coordinates may correspond to a location of the tracking module at a specified time. The location system may pair the time stamp with a set of the location coordinates corresponding to the location of the tracking module at the occurrence of the stroke event.

In one example, the stroke event includes ball hit, and the location of the tracking module at the occurrence of the stroke event is used as a proxy for location of a ball of the player carrying the tracking module resulting from a previous stroke.

In the above or another example, the tracking module operates as a beacon in a location network. The location network may utilize ultra-wide band positioning.

In any of the above or another example, the tracking module is configured to transmit the location data to the location system.

In any of the above or another example, the location system is configured to receive the location data from a location network, and the location network is configured to calculate the plurality of sets of location coordinates.

In any of the above or another example, the location data collected or received by the location system comprises locating data that the location system uses to calculate the location coordinates.

In any of the above or another example, the plurality of sets of location coordinates comprise sets of GPS coordinates.

In any of the above or another example, the plurality of sets of location coordinates comprise sets of ultra-wide band positioning coordinates.

In any of the above or another example, the tracking module is configured to collect location data at predefined first intervals and transmit the collected location data to the location system at predefined second intervals, wherein the second intervals are greater than the first intervals.

In any of the above or another example, the location system is configured to segment holes of a golf course into zones, each zone corresponding to a range of location coordinates. The location system may determine a current zone the tracking module is located from the plurality of sets of location coordinates.

In any of the above or another example, the companion device includes an interface configured to receive the input corresponding to the stroke event. The stroke event may comprise address and ball hit. The interface may include an indicator configured to the pressed to indicate that the player is addressing the ball and held until the player hits the ball to indicate that the ball has been hit.

In any of the above or another example, the companion device is configured to be carried by a scorer that accompanies a group of players including the player. The companion device may be further configured to receive inputs corresponding to stroke events for all players in the group.

In another aspect, a score tracking method includes receiving, from a companion device, an input corresponding to a stroke event of a player competing in a golf tournament, wherein the input includes a time stamp corresponding to an occurrence of the stroke event; collecting or receiving, by a location system, location data, wherein the location data corresponds to a location of a tracking module carried by the player, and wherein the location data comprises or is used to generate a plurality of sets of location coordinates, each set of location coordinates corresponding to a location of the tracking module at a specified time; and pairing the time stamp with a set of the location coordinates corresponding to the location of the tracking module at the occurrence of the stroke event.

In one example, the stroke event includes ball hit, and wherein the location of the tracking module at the occurrence of the stroke event is used as a proxy for location of a ball of the player carrying the tracking module resulting from a previous stroke.

In the above or another example, the tracking module operates as a beacon in a location network. In one configuration, the location network utilizes ultra-wide band positioning.

In any of the above or another example, the tracking module is configured to transmit the location data to the location system.

In any of the above or another example, the location tracking system is configured to receive the location data from a location network, and the location network is configured to calculate the plurality of sets of location coordinates.

In any of the above or another example, the location data collected or received by the location system comprises locating data that the location system uses to calculate the location coordinates.

In any of the above or another example, the plurality of sets of location coordinates comprise sets of GPS coordinates.

In any of the above or another example, the plurality of sets of location coordinates comprise sets of ultra-wide band positioning coordinates.

In any of the above or another example, the tracking module is configured to collect location data at predefined first intervals and transmit the collected location data to the location system at predefined second intervals. The second intervals may be greater than the first intervals.

In any of the above or another example, wherein the method further includes segmenting holes of a golf course into zones, each zone corresponding to a range of location coordinates, and determining a current zone the tracking module is located from the plurality of sets of location coordinates.

In any of the above or another example, the companion device may include an interface configured to receive the input corresponding to the stroke event. The stroke event may include address and ball hit. The interface may include an indicator configured to the pressed to indicate that the player is addressing the ball and held until the player hits the ball to indicate that the ball has been hit.

In any of the above or another example, the companion device is carried by a scorer that accompanies a group of players including the player, and the companion device receives inputs corresponding to stroke events for all players in the group.

In any of the above or another example, the stroke event is input into the companion device by a scorer viewing a live video of the golf tournament.

In any of the above or another example, the stroke event is input into the companion device by a scorer viewing a video replay of the golf tournament.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

FIGS. 4A & 4B illustrate various views of a tracking module according to various embodiments described herein, wherein FIG. 4A shows a face-on view and FIG. 4B shows a side view;

FIG. 7O illustrates a group page wherein the first two players have finished the hole and the third player is on the green according to various embodiments described herein;

FIG. 7P illustrates recording a second shot off the tee recorded as a provisional according to various embodiments described herein;

FIGS. 7Q-7S illustrate user interfaces of the ST application depicting the work flow for recording a provisional shot that is ultimately used, resulting recordation of a penalty stroke according to various embodiments described herein;

FIG. 8D illustrates a stroke event review viewer of the data management tool according to various embodiments described herein;

FIG. 9B illustrates a second validation user interface of the validation system presenting scoring data for one or more groups according to various embodiments described herein.

DESCRIPTION

Figure 1:
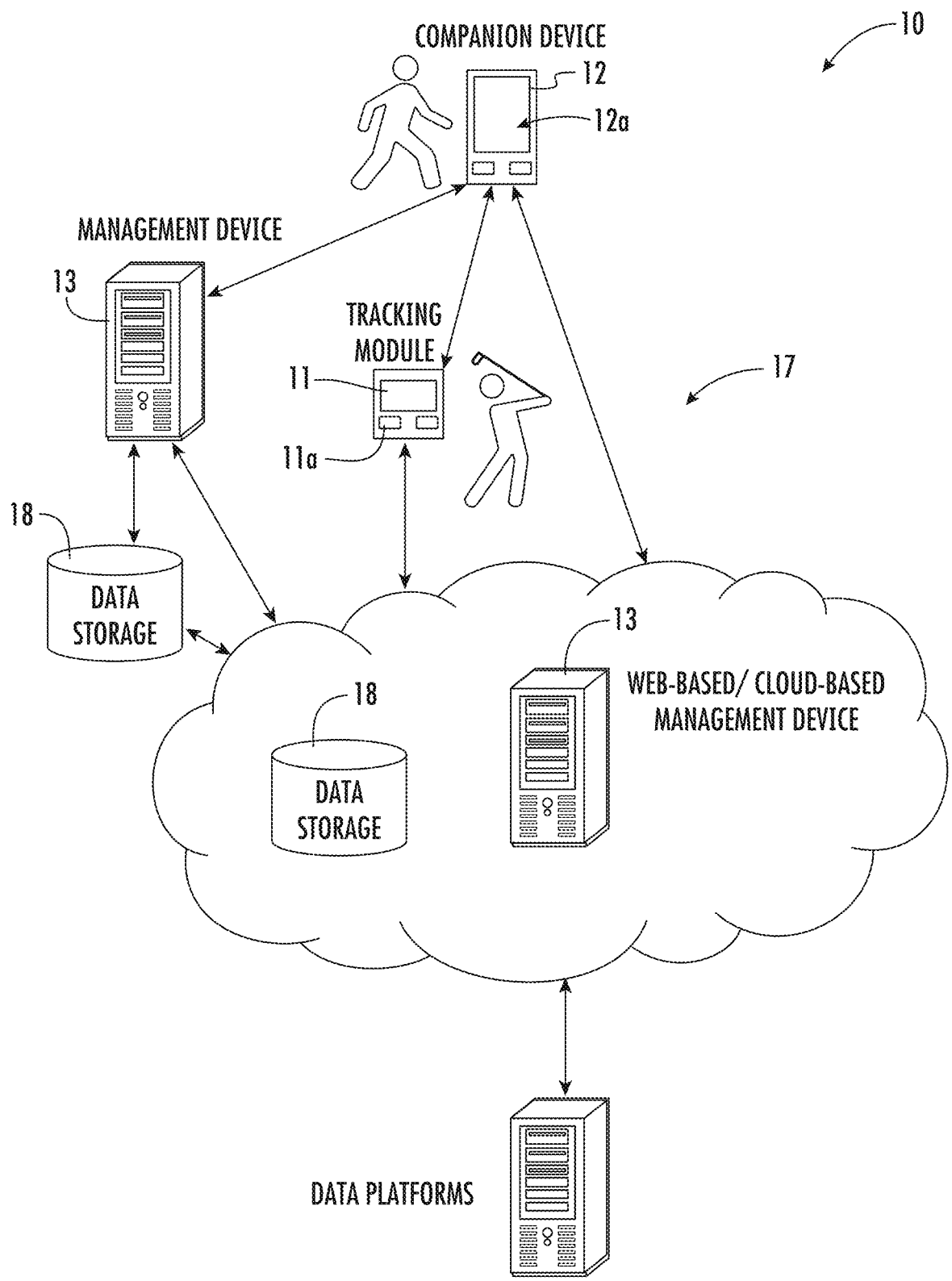
FIG. 1 schematically illustrates hardware and networking features of a STTM system according to various embodiments described herein.

The present description describes various embodiments of a score tracking and tournament management system, which may be referred to herein as a STTM system. The STTM system may include various systems, components, and modules configured to provide a lightweight platform for score tracking and management of tournament data. Data collection may be unobtrusive to competing players, yet provide accurate, detailed data regarding their game and performance. Management functionalities may be provided on-site, off-site, or in a hybrid configuration. Pre-round and in-round tournament and score management functionalities may be automated and employ customizable setup rules or profiles that are adaptable to a variety of tournament structures and that drastically reduce costs and personnel hours while also integrating multiple tournament processes such as player grouping, tee times, score collection, location tracking, error correction, and score verification. The STTM system may be utilized to provide tournament scoring and organization management and/or scoring system functionalities that may be utilized to provide thorough data and feedback to players and other interested parties, in real time or delayed.

Although some embodiments of the STTM system described herein may incorporate or utilize advanced infrastructure, the STTM system may be provided in a widely applicable flexible package configured for portability that may utilize limited infrastructure with little impact to the amount, quality, and accuracy of the ultimate data product and/or the tournament operational management support and functionalities obtained via its use. The flexible architecture of the STTM system may be expandable, retractable, and/or modular to conform to available infrastructure and resources with only minimal variation in data quality. For example, while various aspects of the STTM system are described herein as providing integrated functions or operations, the systems, components, and modules of the STTM system are not limited to combined use. Indeed, the systems, components, and modules described herein may be utilized separately or individually integrated with known or future developed systems.

Operations described herein may be performed in association with one or more electronic user devices. For example, computer readable instructions may be stored in memory and when executed by a processor cause an user device to perform operations described herein. The memory and/or processor may be local or remote with respect to the user devices. User devices may include one or more tracking modules, one or more companion devices 12, and/or one or more management devices. User devices may include suitable dedicated or multipurpose electronic computing devices and systems such as a mainframe, server, computer, dedicated device, desktop, laptop, tablet, smart device/phone, personal data assistant. When utilized to collect live event data, the companion device will typically be a handheld tablet, smart device/phone, personal data assistant, or dedicated handheld device.

The STTM system may include, incorporate, and/or communicate with user devices that execute applications to perform the operations described herein. The user devices may interface users with operations of the STTM system. For example, the user devices may be configured to access, execute, run, or emulate one or more STTM system applications and/or services. The applications and services may be stored in local and/or remote memory and executed by local and/or remote processors. In some embodiments, applications, services, or the like are provided in whole or in part in a cloud computing environment, e.g., SaaS, DCaaS, DaaS, PaaS, iPaaS, IaaS, or the like.

Figure 2:
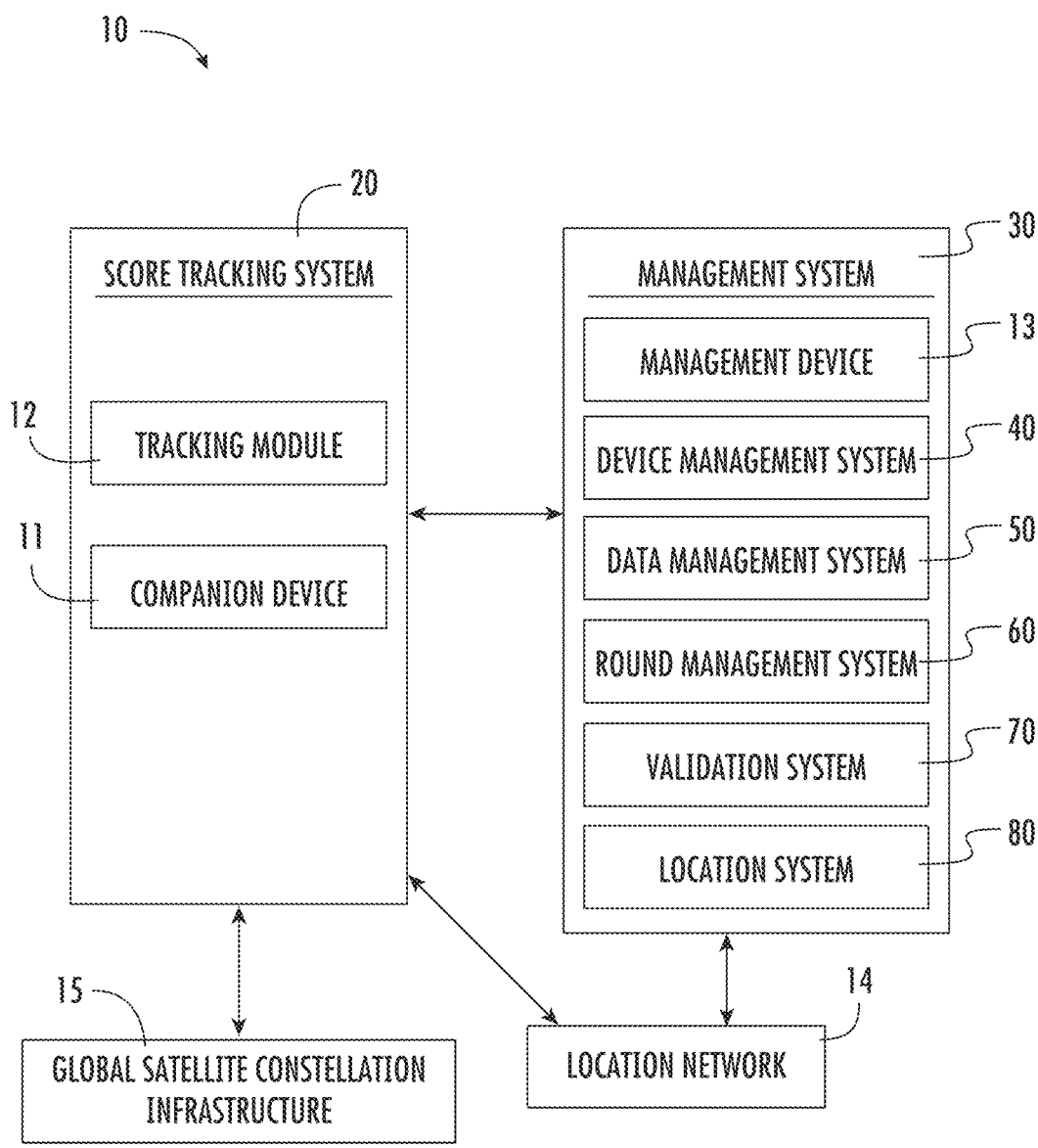
FIG. 2 schematically illustrates various elements and operating environment components of a STTM system according to various embodiments described herein.

With reference to FIGS. 1 & 2, a STTM system 10 may include a score tracking system 20 configured to track location and/or competition scoring, such as golf tournament scoring, and a management system 20 to manage operations of the STTM system 10, which may include the components thereof, such as devices and elements.

The STTM system 10 may include or incorporate various devices comprising one or more of a tracking module 11, companion device 12, management device 13, and/or location elements, such as a location network 14, or global satellite constellation infrastructure 15. The STTM system 10 may include or incorporate a communication network 17 configured to transmit system data to, from, or among STTM system 10 components to perform the operations of the STTM system 10 described herein. In various embodiments, the communication network 17 may include or operatively network one or more location elements.

Figure 4A:
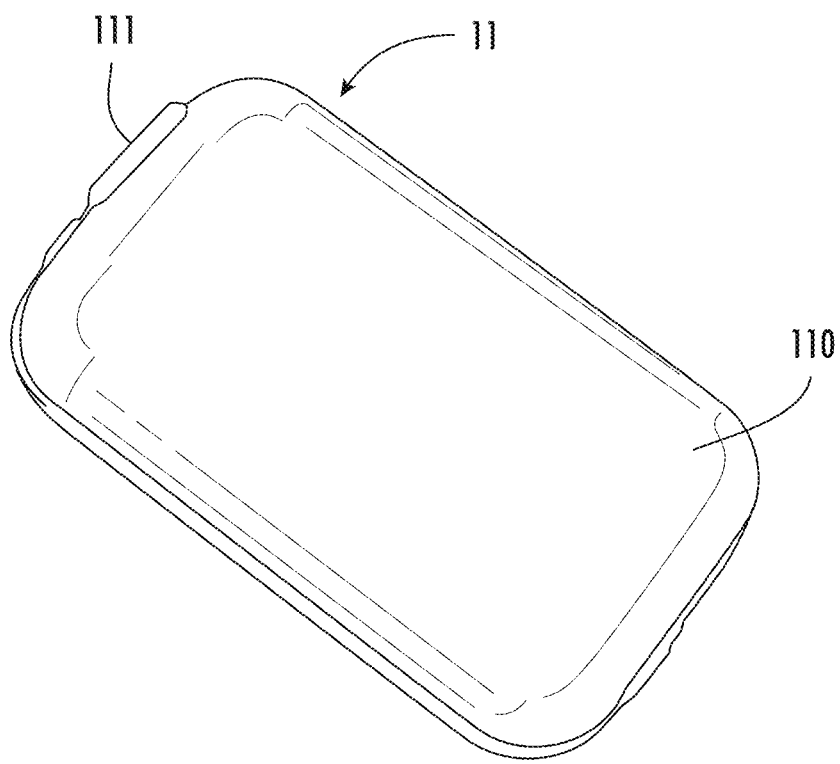
Figure 4B:
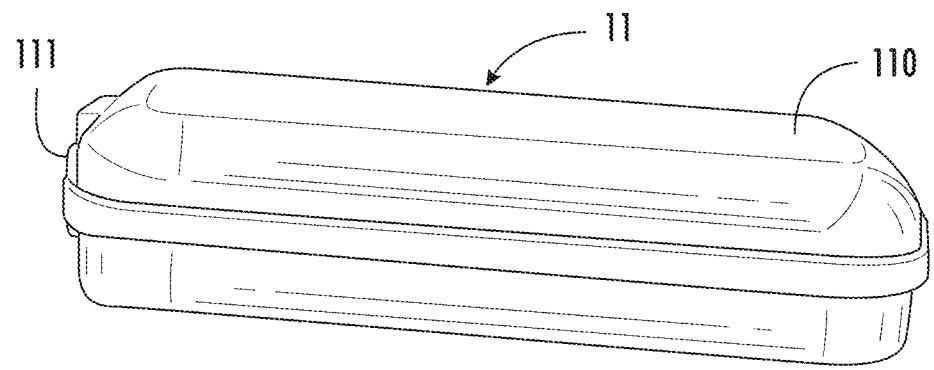
Figure 4C:
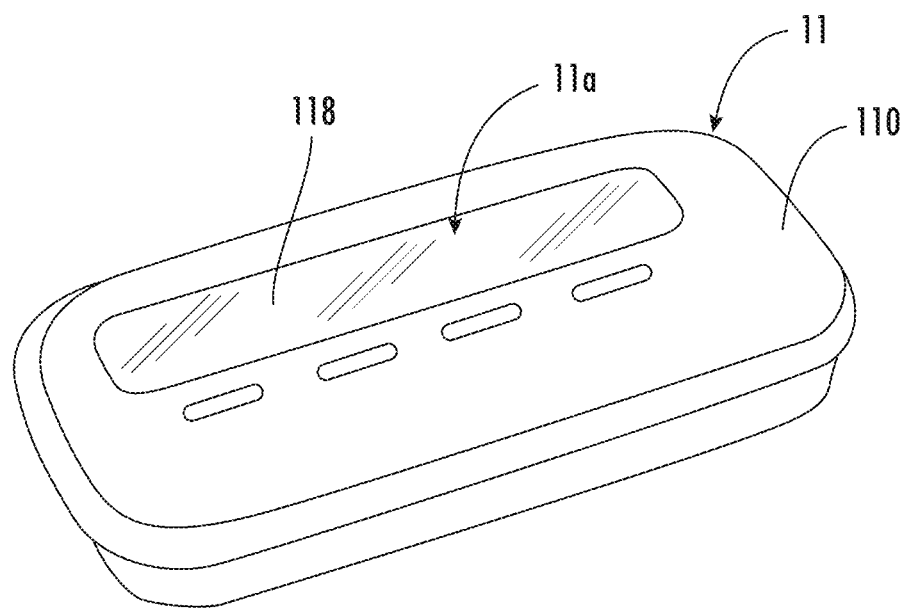
FIG. 4C illustrates a perspective view of a tracking module according to various embodiments described herein.

Tracking modules 11 may comprise user devices configured to be carried by a competing player or otherwise be located in close proximity to the competing player during play. Tracking modules 11 may include memories that include instructions and processors that execute the instructions from the memories to perform the various operations that are performed by the tracking modules 11. In certain embodiments, processors may be hardware, software, or a combination thereof. In some embodiments, tracking modules 11 may also include interfaces 11a (see, e.g., FIG. 4C) that may enable a scorer, player, and/or other user to interact with various applications, such as a score tracking application, which may be referred to as a ST application, and/or operations executed on the tracking modules 11, such as location signaling and/or location calculation processes, and to interact with the STTM system components, devices, systems, and/or elements thereof. In certain embodiments, tracking modules 11 may be and/or include a computer, any type of sensor, a laptop, a set-top-box, a tablet device, a phablet, a server, a mobile device, a smartphone, a smart watch, and/or any other type of computing device, and/or any combination thereof. Tracking modules 11 may be configured to perform various location operations. For example, tracking modules 11 may be configured to track their location and/or communicate locating information to the STTM system and/or location elements. Tracking modules 11 may be configured for location tracking utilizing various technologies and location schemes described herein. For example, in some embodiments, a tracking module 11 is configured to obtain GPS coordinates corresponding to its location and transmit such coordinates to STTM system devices, or systems, such as the management system 20, as described herein. In these or other embodiments, the tracking module 11 may operate as a beacon in a location network 14. Tracking modules 11 may be configured to communicate with various location elements such as location networks 14 and/or location services to transmit data comprising location data, which may include locating data that may be utilized to determine location of the tracking modules 11. The location data may also include a time stamp corresponding to the time the location data relates. Tracking modules 11 may be configured to communicate data, such a location and/or locating data, over various communication networks 17, such as a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an intranet, an internet protocol network, MPLS network, a content distribution network, short range wireless communication network, or any combination thereof. Tracking modules 11 may be configured to communicate directly with location elements, such as location networks 14, global satellite constellation infrastructures 15 via the various communication networks 17 or indirectly via another STTM system device or network device. For example, in one embodiment, tracking modules 11 may directly transmit data to STTM system 10 devices, elements, associated networks and/or location elements via one or more communication networks 17 and/or utilize a companion device 12 or management device 13 to transmit signals to access various network-based, web-based, cloud-based, and/or online services and content, such as those available on an internet, on other devices, and/or on various computing systems.

Companion devices 12 may be configured to communicate with, define, identify, and/or organize scoring data, which may include location data, associated with the tracking module 11. Additionally or alternatively, companion devices 12 may be utilized to collect and/or track other competition data. The companion device 12 may be utilized by a user to access data, content, services, and/or to perform a variety of other tasks and functions of the STTM system 10. As an example, the user may utilize the companion device 12 to transmit signals to access various web-based, cloud-based, and/or online services and content, such as those available on an internet, on other devices, and/or on various computing systems. As another example, the companion device 12 may be utilized to access an application, such as the ST application, that provides one or more operative functions of the STTM system 10, such as communication with the management system 30, one or more tracking modules 11, one or more management devices, and/or one or more location elements comprising one or more of a location network 14 and/or global satellite constellation infrastructures 15.

In certain embodiments, a companion device 12 may be used by a scorer to control one or more operative functionalities of the STTM system 10. The scorer may be a human such as a dedicated user or a player, a passive robot, an active robot, a humanoid, a program, a computer, any type of user, or a combination thereof. The companion device 12 may include a memory that includes instructions, a processor that executes the instructions from the memory to perform the various operations that are performed by the companion device 12. In certain embodiments, the processor may be hardware, software, or a combination thereof. The companion device 12 may also include an interface 12a (e.g. screen, monitor, graphical user interface, etc.) that may enable the scorer to interact with various applications, such as a ST application, executed on the companion device 12 and to interact with the STTM system 10, such as with one or both of the score tracking system 20 or management system 30. In certain embodiments, the companion device 12 may be and/or may include a computer, any type of sensor, a laptop, a set-top-box, a tablet device, a phablet, a server, a mobile device, a smartphone, a smart watch, and/or any other type of computing device. Illustratively, the companion device 12 is shown as a smartphone or tablet device in FIG. 1.

Management devices 13 may be utilized by management users with respect to functions of the management system 30 to receive and transmit signals to request various types of content, services, and data provided by and/or accessible by communications network 17 or any other network through which the STTM system 10 communicates. In further embodiments, the management user may be a robot, a computer, a humanoid, an animal, any type of user, or any combination thereof. Management devices 13 may include a memory that includes instructions, and a processor that executes the instructions from the memory to perform the various operations that are performed by the management devices 13. In certain embodiments, the processor may be hardware, software, or a combination thereof. Management devices 13 may also include an interface (e.g. screen, monitor, graphical user interface, etc.) that may enable the user to interact with various applications (e.g., management applications) executing on the management device 13 and to interact with the devices, elements, and systems of the STTM system 10. In certain embodiments, a management device 13 may be a computer, a laptop, a set-top-box, a tablet device, a phablet, a server, a mobile device, a smartphone, a smart watch, and/or any other type of computing device. Management devices 13 may be local or remote with respect to a competition location. Management devices 13 may be cloud-based or web-based.

In certain embodiments, the companion device 12, the tracking modules 11, the management device 13, and/or location network 14 may have any number of software applications and/or application services stored and/or accessible thereon. For example, the companion device 12, the tracking modules 11, the management device 13, and/or location network 14 may include applications for controlling the operative features and functionality of the STTM system 10 and/or score tracking system 20 or management system thereof, applications for controlling any system device, cloud-based applications, Von' applications, cellular applications, other types of phone-based applications, location and/or positioning applications, media streaming applications, content-based applications, media-editing applications, database applications, internet-based applications, browser applications, mobile applications, service-based applications, productivity applications, video applications, any other type of applications, any types of application services, or a combination thereof. In certain embodiments, the software applications may support the functionality provided by the STTM system 10, such as score tracking system 20 or management system 30 thereof, and methods described in the present disclosure. In certain embodiments, the software applications and services may include one or more graphical user interfaces so as to enable the users (e.g., scorers, players, system managers) to readily interact with the software applications. The software applications and services may also be utilized by the users to interact with any device in the STTM system 10, any network of or utilized by the STTM system 10 (e.g., a location network or global satellite constellation infrastructure), or any combination thereof. In certain embodiments, companion devices 12, tracking modules 11, and/or management devices 13 may include associated device identifying identities, or any other identifiers to uniquely identify a particular companion device 12, tracking module 11, and/or management device 13.

The communications network 17 may be configured to link each of the STTM system devices, components, and elements and may include any number of networks, which in one embodiment includes the location network 14. For example, the communications network may be utilized by the companion device 12 to connect with other devices within or outside communications network 17. In various embodiments, the companion device 12, tracking module 11, management device 13, and/or location network 14 may belong to and/or form a portion of communications network 17. In certain embodiments, the communications network 17 may be a local, mesh, or other network that enables and/or facilitates various aspects of the functionality of the STTM system 10. In certain embodiments, the communications network 17 may be formed between or among various user devices such as management devices 13, companion devices 12, tracking modules 11, databases 18, or combination thereof, through the use of any type of wireless or other protocol and/or technology. For example, user devices may communicate with one another in the communications network 17 by utilizing any protocol and/or wireless technology, satellite, fiber, or any combination thereof. Notably, the communications network 17 may be configured to communicatively link with and/or communicate with any other network of the STTM system 10 and/or outside the STTM system 10. In various embodiments, the tracking module 11 may be configured to communicate directly with one or more components of the management system 30 and/or location elements. The communications network 17 may be configured to transmit, generate, and receive any information and data traversing the STTM system 10. In certain embodiments, the communications network 17 may include any number of servers, databases, or other componentry. The communications network 17 may also include and be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an intranet, an internet protocol network, MPLS network, a content distribution network, short range wireless communication network, or any combination thereof. Illustratively, management devices 13 are shown as representative servers and are shown as being included within or utilizing the communications network 171. As described above and elsewhere herein, management devices 13 will typically comprise a user interface enabling a user to perform scoring and/or tournament competition management operations described herein. In certain embodiments, the communications network 17 may be part of a single autonomous system that is located in a particular geographic region, or be part of multiple autonomous systems that span several geographic regions.

The functionality of the STTM system 10 may be supported and executed by using any combination of the servers. The servers may reside in communications network 17 or environment thereof, however, in certain embodiments, the servers may reside outside communications network 17. The servers may provide and serve as a server service that performs the various operations and functions provided by the STTM system 10. In certain embodiments, the management devices 13 may comprise servers including one or more network servers, routers, gateways, switches, media distribution hubs, signal transfer points, service control points, service switching points, firewalls, routers, edge devices, nodes, computers, mobile devices, or any other suitable computing device, or any combination thereof.

The STTM system 10 may include or utilize a database 18 to store and relay information that traverses the STTM system 10, cache content that traverses the STTM system 10, store data about each of the devices in the STTM system 10 and perform any other typical functions of a database 18. Furthermore, the database 18 may include a processor and memory or be connected to a processor and memory to perform the various operations associated with the database 18. In certain embodiments, the database 18 may be connected to the servers, the companion device 12, the management device 13, the tracking modules 11, any devices in the STTM system 10, any process of the STTM system 10, any program of the STTM system 10, any other device, system, element, any network, or any combination thereof. The database 18 may comprise multiple databases 18. Databases 18 may be local or remote. The database may be cloud-based.

The STTM system 10 may further include or transmit competition related data generated by the STTM system 10 to one or more data platforms 19. The data platforms 19 may comprise hardware, software, servers, computers, programs, applications, or the like configured to view, manipulate, analyze, store, or otherwise consume the generated data. In some embodiments, data platforms 17 comprise competition data viewers and analyzing platforms available to players, coaches, administrators, fans, members of media organizations, broadcasters, or any other person. In a further embodiment, data platforms 17 comprise client platforms for data consumption, and may include competition data views or analyzing platforms. In the illustrated example, the data platforms 19 are shown as communicating via a web or cloud-based portion of the communication network 17. However, in various embodiments, the competition related data may be transmitted via other portions of the network, e.g., locally.

While the present disclosure may reference particular applications executed on one or more electronic user devices, it is to be understood that such applications, including any application services, may be provided within a single application, program, or platform or may be divided, virtualized, distributed, or combined into or among any number of executable platforms and resources.

The present description references various interface components. Interface components may include interface elements configured to interface a user with an operation such as selection of a data value or data element, display elements configured to interface a user with a display, data elements, or the like. Indicators, operators, options, and the like described herein with respect to interfaces may include buttons, toggles, switches, slide bar, swipe button/bar/field, sidebars, and or other interface elements. Such interface elements may be configured to be hard or soft. Similarly, interaction terminology such as pressing, tapping, selecting, and the like may be performed with the human body, a stylus or other implement, a peripheral device such as a mouse or keyboard, or other suitable user interaction.

With continued reference to FIG. 2, the score tracking system 20 may be configured to track scoring with respect to play of a plurality of competing players, such as golfers, competing in a competition. The competition is described herein as a golf tournament, but those having skill in the art will realize upon reading the present disclosure that the systems and methods described herein may be applied to other competitions and in other environments. Score tracking may also include tracking location of stroke events. As introduced above and described in more detail below, the score tracking system 20 may include a tracking module 11 configured to be carried by or accompany a player. In some embodiments, e.g., as illustrated in FIG. 2, the score tracking system 20 may also include or be configured to incorporate a companion device 12. The companion device 12 may be configured to receive score related input, such as stroke event inputs, from a scorer and transmit the score related data to the management system 30. The tracking module 11 may be configured with locating, positioning, and/or proximity technology, as introduced above and described in more detail below, that may be used by the tracking module 11 and/or another device, such as a companion device 12, management device 13, location network 14, and/or location system 80 to track the location of the tracking module 11. Using the companion device 12, a scorer may record events, such as stroke events, with respect to play. Recordation of events may result in generation and recordation of an associated time stamp and/or retrieval, identification, calculation, and/or transmission of location data from the tracking module 11 corresponding to a recorded event, e.g., when a player addresses or hits a ball. The location data or chronological syncing of the time stamp with the location of tracking module 11 may be used by the location system 70 as a proxy for the location of the player's ball following the previous hit or the starting location of the player's ball prior to hitting the ball. A notable benefit of the present score tracking methodology is that a single scorer, which will typically accompany a group of multiple golfers may record both score and location data in an unobtrusive manner. As described in more detail below, in various embodiments the tracking module 11 is configured to be compatible with a plurality of location service techniques, thereby providing flexibility with respect to tracking the location of the tracking module 11, e.g., by utilizing available infrastructure with respect to a course when necessary. The score tracking system 20 and/or the STTM system 10 may include or incorporate location services such as one or more of a global satellite constellation infrastructure 15 or location network 14. The location network 14 will typically be a local location network with respect to a golf course the tournament is played and may include radio receivers, transmitters, transceivers, antennas, UWB antennas, anchors, initiators, responders, cell towers, Wi-Fi access points, beacons, geo-beacons, BLE gateways, or the like. In some embodiments, a location network 14 including external location/signal networks that utilize short range or long range location technologies, which may include signals of opportunity.

In various embodiments, the tracking module 11 is configured to be in communication with the companion device 12 and operable to retrieve calculated location data or location signaling parameters from the tracking module 11 that may be used by the companion device 12, management device 13, and/or location system to calculate the location of the tracking module 11 at a given time, time range, or continuously. However, in some embodiments, the tracking module 11 may not be in communication with the companion device 12 with respect to location tracking operations, e.g., another device may calculate or receive the location of the tracking module 11. For example, time stamps set by the companion device 12 may be transmitted to another device for chronological pairing with the location of the tracking model 11 before or after transmission of the same to a management device 13 or the management device 13 may be in communication with the tracking module 11 and companion device 12 to receive the location data for pairing with the time stamp.

In one example, the tracking module 11 obtains its GPS coordinates via communication with global satellite constellation infrastructure 15 and transmits the coordinates to the management system 30. The companion device 12 may also transmit stroke events including associate time stamps to the management system 30. The location system 80 may then pair time stamps with corresponding location coordinates.

In one example, the tracking module 11 obtains its location, which may include location coordinates, via location signaling with a location network 14, such as a UWB or other location network described herein or similar. In one configuration, the tracking module 11 calculates its location as described herein and transmits the location to the management system 30. In another configuration, the location network 14 calculates the location of the tracking module 11 and transmits the location to the management system 30 or the companion device 12, which subsequently transmits the location and/or the location paired with corresponding time stamps to the management system 30. The companion device 12 may also transmit stroke events including associated time stamps to the management system 30. The location system 80 may then pair time stamps with corresponding location coordinates.

In one embodiment, the management system 30 includes a device management system 40 configured to manage a plurality of tracking modules 11 and assign the same to players. The device management system 40 may be executed on one or more management devices 13. In one configuration, the device management system 40 communicates with the tracking modules 11 during play to track locations of the tracking module 11. When the companion device 12 sets a time stamp with respect to a location of the tracking module 11 relative to an assigned player, the device management system 40 receives the time stamp and pairs it with the location of the tracking module 11 at the time set by the time stamp. This location information may be provided to the data management system 40 for review and/or made available for transmission or use by STTM system 10 operations or data platforms 19. As noted above and elsewhere herein, location calculation and/or pairing of location coordinates with time stamps may be performed by the location system 80 and made available to other systems of the management system 30 or the functionalities of the location system 80 may be provided by other systems of the management system 30. The location calculation may be perceptually instantaneous or otherwise in real time. In one embodiment, the companion device 12, tracking module 11, management device 13, location network 14, and/or location system 80 may continuously or near continuously track the location of the tracking module 11. Such continuous or near continuous tracking may be used to address location tracking/network latency. For example, when a scorer records a stroke event that causes setting of a time stamp at the time the ball is hit, in nearly all instances, the most recent calculated location within five seconds of the time stamp will provide an accurate location of the ball when hit. In one embodiment, the scorer will set the time stamp for location purposes at address.

In various embodiments, the management system 30 includes one or more of a round management system 60 configured to manage rounds and groupings for players that are playing in an event, a data management system 60 configured to review and edit scoring data recorded by the score tracking system 20, or a validation system 70 configured to provide streamlined validation of a player's official scorecard against scores collected by the score tracking system 20. In the above or another embodiment, the management system 30 may include a location system 80. The location system 80 may be configured to handle tracking module 11 location data, calculation of location data from locating data, pair time stamps with location data, make zone determinations, and/or compare zone determinations with scoring data zone identification. In one embodiment, the companion device 12 may transmit scoring data to the management system 30. The tracking module may also directly or indirectly transmit location data or locating data to the management system 30. Stroke events and corresponding time stamps may be available to the location system 80 for pairing with tracking module locations. The location system 80 may share data and/or functionalities with the various systems of the management system 30. For example, device management system and/or data management system may execute or access one or more of the above location determination functions, instead of or in addition to the location system 80. In various embodiments, the location system 80 includes or communicates with one or more location networks. As described in more detail herein, location networks may include GPS, Wi-Fi, RFID, BLE, UWB, NFC, cellular, etc.

As introduced above, a companion device 12 may be configured to execute or run the ST application. The ST application may comprise a mobile app, web app, cloud-based, or other application format and include instructions operable to perform the score collection features described herein with respect to the companion device 12. When the companion device 11 is configured to communicate with the tracking module 11, the ST application may be configured to provide communication protocols between the companion device 12 and the tracking module 11. For example, the ST application may configure the companion device 12 to communicate with the tracking module 11, provide updates, receive data for storage, provide processing operations, transmit alarm initiation instructions, obtain battery life or charge status, receive tracking module 11 location data, initiate a location data event, relay data received from the tracking module 11 to a storage or another computing device, perform proxy services for the tracking module 11, or other operations described herein. Additionally or alternatively, the ST application may configure the companion device 12 for communication with management devices 13 of the management system 30. For example, the ST application may be configured to receive and incorporate groupings assignments, round information, tee times, or the like from the round management system 60. In the above or another example, the ST application may be configured to receive player and tracking module 11 assignments from the device management system 40, incorporate the player and tracking module 11 assignments into collected scoring data (stroke event data, location data, time stamps, club selection, etc.), transmit stroke event data including associated time stamps to the STTM system 10, e.g., location system 80, device management system 40, data management system 50, and/or validation system 70, and/or communicate with tracking modules 11 to pair the tracking modules 11 with the assigned players. In some embodiments, however, assignments may be retained by the management system 30 and the companion device 12 may accompany stroke event time stamps or location data with identifiers of respective tracking modules 11 from which the management system 30, e.g., data management system 60 or location system 80, uses to pair the location of the tracking module 11 at the time stamp with the player assigned to the tracking module 11. In an above or another embodiment, the ST application may be configured to transmit collected scoring data recorded by the companion device 12 to the management system 30, e.g., data management system 60, validation system 70, and/or location system 80.

Figure 4D:
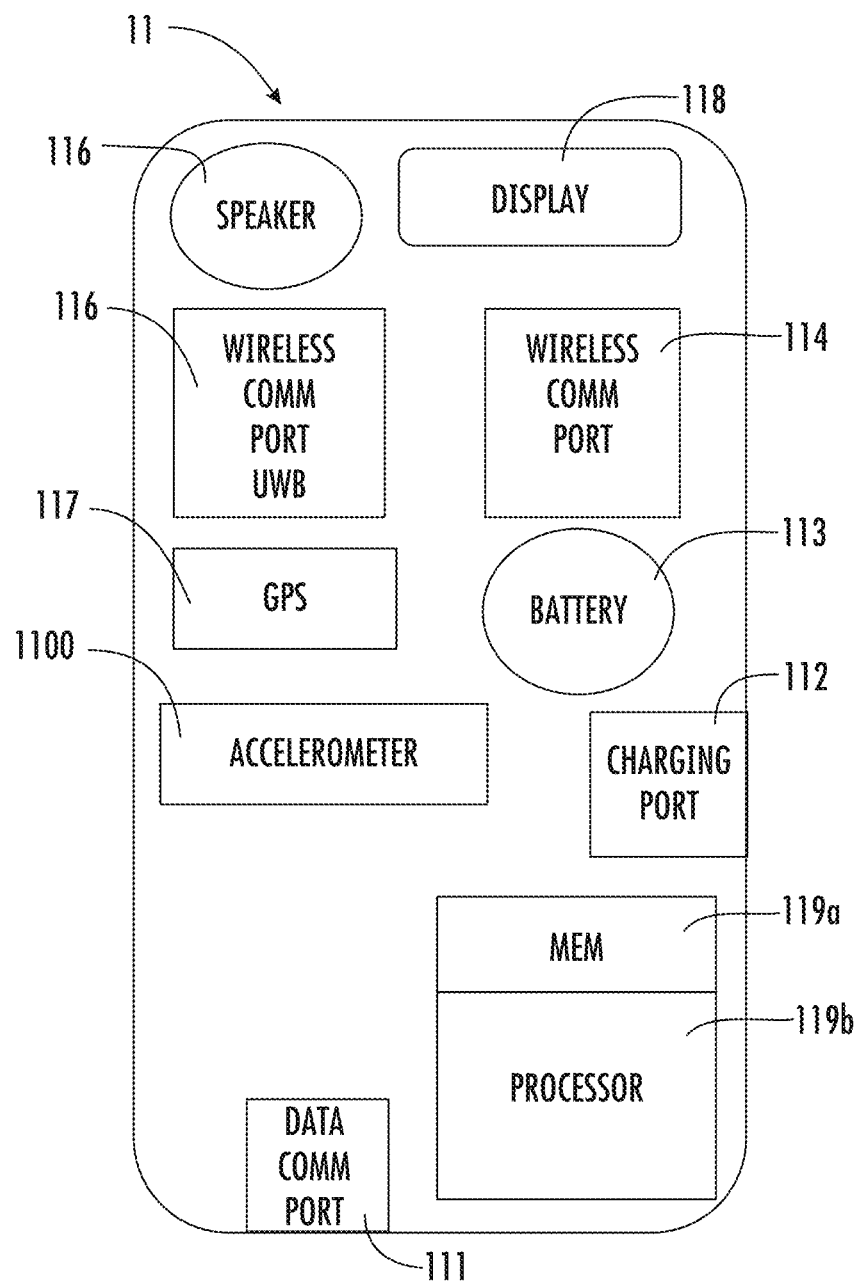
FIG. 4D illustrates various components of a tracking module according to various embodiments described herein.

In one embodiment, the tracking module 11 comprises a compact housing that may be easily carried or worn by an individual. FIGS. 4A-4D provide views of example tracking modules 11. While larger tracking modules 11 may be used, in the illustrated examples, the tracking modules 11 are provided with a housing 110 generally smaller than a deck of cards. In one example, the housing 110 may be fitted with a clip for clipping to a belt, pocket, or other surface. In one embodiment, a wearable receptacle for receiving the tracking module 11 may be provided that may be carried or worn by an individual. In one example, the receptacle may include a clip for clipping to a belt or pocket or may include or attach to a wearable band. Numerous variations may be implemented. For example, the tracking module 11 may be integrated or imbedded in a clothing article, such as a belt, belt buckle, hat, or bracelet. In some embodiments, the tracking module 11 may be integrated in a tablet, laptop, smart device, such as a phone or PDA, or other portable electronic device. In various embodiments, the housing 110 may be configured to be opened for maintenance, part replacement, upgrades, or other desired purpose. For example, the housing 110 may include a removable panel or comprise a clamshell design. In one embodiment, the housing 110 may be waterproof or water resistant with respect to the interior of the housing 110. For example, a panel or clamshell may seat on a gasket FIG. 4D is a semi-schematic of an interior of a tracking module 11 illustrating components that may be included in various embodiments of a tracking module 11. In some embodiments, the tracking module 11 includes a wired data communication port 111. The port 111 may be provided or accessible from an exterior of the housing 110 or may be accessible by removal of a panel or clamshell thereof. The wired data communication port 111 may be utilized for programming, downloading, or other data communication needs as an alternative or backup to wireless data communication.

The tracking module 11 may include one or more batteries 113 configured to provide power for the tracking module 11 operations. Various standard and custom sized batteries 113 may be used, such as AA, CR123A, 23A, or coin cell such as CR2032. While a compact size is preferred, larger batteries 113 may also be used. In one example, a user may wear or otherwise carry a separate battery pack or power source that powers the tracking module 11, either by wired or wireless connection. Any suitable type of battery 113 may be used that is sufficient to power the tracking module 11. For example, batteries 113 may include lithium, alkaline, silver oxide, carbon zinc, zinc air, lithium ion, NiCD, or NiMH. Various tracking modules 11 configurations may include or be configured to operate with rechargeable batteries 113, such lithium ion, NiCD, or NiMH. In one embodiment, the tracking module 11 includes a battery 113 that is rechargeable, such as a rechargeable lithium polymer 2300 mAh battery.

Some configurations of the tracking module 11 may include a charging port 112 operable to receive a supply of power to charge the battery 113. The charging port 112 may include a female or male connector. The port 112 may be configured to be waterproof or water resistant to prevent water from entering the charging port 112. For example, the charging port 112 may be separated from the interior of the housing by a gasket. In a further example, access to the charging port 112 is provided by removing a panel seated on a gasket or by inserting an external charging interface connector through a slit in a water barrier material. In another example, a removable plug may be seated within or over the charging port interface to prevent water intrusion. In one embodiment, the tracking module 11 is configured to be charged wirelessly. In one embodiment, the tracking module 11 is configured with a charging port to recharge batteries while in the housing. For example, the housing may include a wired or wireless charging port. A magnetic wireless charging port, USB (e.g., A, B, Mini A/B, Micro A/B, C), Thunderbolt, DC power connectors, or other suitable power delivery interface technology may be used. Custom charging interfaces may also be used. In some embodiments, a charging port 112 is configured to similarly be operable for use as a wired data communication port 111. In one embodiment, the charging port 112 comprises a USB C connection. In the above or another example, the housing may be equipped with a charging interface configured to be plugged into a charger having a plurality of charging ports for bulk charging of multiple tracking modules 11.

In various embodiments, the tracking module 11 may be configured with a wireless communication port 114 comprising one or more wireless receivers, transmitters, and/or transceivers. The wireless communication port 114 may be configured to transmit and/or receive wireless data communications, e.g., signals, via any wireless communication medium or protocol, such as those including or incorporating radio waves, cellular, WiFi, short-range wireless, Bluetooth, or other suitable wireless communication technology. The wireless communication port 114 may be configured for multiband operation. For example, the wireless communication port 114 may be configured for communication in multiple frequency bands. The multiple frequency bands may include cellular networks (4G, LTE-M, NBIot, 2G, etc.) and/or other frequency bands. The wireless communication port 114 may be configured to transmit and/or receive data, such as location and/or locating data, from a location network, global satellite constellation infrastructure, or the like. The wireless communication port 114 may be configured to transmit and/or receive locating data such as parameters for calculation of or location. The wireless communication port 114 may be configured to operate as a beacon as described in more detail below. The tracking module 11 may be configured with a location alarm. The location alarm may be wirelessly activated remotely via wireless communication from one or more of a remote command center, management device, or companion device equipped with a suitable wired or wireless transmitter or transceiver for transmitting the alarm activation signal to the wireless communication port 114 of the tracking module 11, which may include communication through intermediate wired networks of a communication network. For example, the alarm activation signal may be transmitted and/or received via Wi-Fi, cellular, short-range wireless, Bluetooth, or other suitable wireless communication technology.

In one embodiment, a companion device of a management device, such as a management device of the device management system, may be configured, e.g., via an application, to transmit the alarm activation signal that when received by the wireless communication port 114 of the tracking module 11, causes the tracking module 11 to output an alarm. The alarm may include activation of vibration device, such as an ERM motor or LRA, may be housed in the housing and operable to produce vibration in response to receipt of the alarm signal. Additionally or alternatively, the alarm signal may trigger an audible alarm to be output from a speaker 116 or other noise producing device within or associated with the housing. Additionally or alternatively, the alarm signal may trigger activation of lights, such as LEDs, or activation of an LCD or other lighted display.

The tracking module 11 may include memory 119a and a processor 119b to execute instructions stored in the memory 119a or otherwise received to perform the operations of the tracking module 11. In some configurations the housing 110 includes a memory expansion port or slot for connecting to additional memory storage. The expansion slot may be configured to house an expansion memory device, such as a micro SD card or the like, or receive a plug for a wired connection to an expansion memory device. The memory 119a may be used to store collected data such as location and time data. Such data may be transmitted to a storage device, receiving device, processing device continuously, periodically, daily, or upon request.

The tracking module 11 may be equipped with an accelerometer 1100. The accelerometer 1100 may be utilized for movement detection. Movement detection may be utilized in conjunction with positioning and location tracking, determination, or acquisition, e.g., movement detection may initiate transmission of location signals and/or listening for the same. Movement detection may initiate transmission of tracked, determined, or acquired location or position data, e.g., to a companion device, location network, or STTM system device. In some embodiments, the accelerometer 1100 may be configured for movement detection with respect to detecting a swing by the player. Detection of movement corresponding to a swing may be used in addition to or instead of scorer entry of a swing or "shot hit" as described below. The accelerometer 1100 may similarly be configured to detect address, e.g., corresponding to a time period with a pause in movement before detection of movement corresponding to a swing.

The tracking module 11 may include a user interface 11a for interfacing operations and/or states with a user. In various embodiments, the user interface 11a includes a display 118 for displaying information. Any suitable display 118 may be used, such as an OLED screen. The information may include battery capacity, battery life or state, an operational mode, such as awake, asleep, ready to receive instructions, operating, or the like. In some embodiments, the display 118 may present data with respect to a current operation or assignment. For example, the display may be configured to display a group number and/or player to which the tracking module 11 is assigned with respect to data collection.

In one embodiment, the user interface 11a includes one or more indicator lights. The indicator lights may be used to indicate an operation state, such as powered, processing data, uploading data, downloading data such as instructions, assignments, or updates, receiving and/or acquiring location/position data, receipt of instructions, transmitting data, operation underway, operation complete, or the like.

In one embodiment, the tracking module 11 includes a speaker 116 operable to output sound. The speaker 116 may be used to output audible alarms for locating purposes, battery life, confirmation of receipt of a user interaction or a communication, initiation of wake-up and/or sleep modes, communication of instructions received from a companion device 12, or other desired use.

In various embodiments, as introduced above, the tracking module 11 is equipped with locating, positioning, and/or proximity technology to assist in locating a misplaced tracking module 11 and/or determining precision location of the tracking module 11. For example, the tracking module 11 may be configured to output locating signals, such as packets, blinks, requests, response, etc., directionally or omni directionally, that may be used by a companion device, location network, management system, and/or location system to locate and/or determine the location/position of the tracking module 11, e.g., based on signal strength, signal parameters, and/or signal characteristics. Additionally or alternatively, the STTM system, which may include location elements described herein, may be configured to locate a tracking module 11 utilizing other techniques, such as those described below.

The STTM system or score tracking system thereof may comprise a location network configured to provide location tracking functionalities and/or services. The location tracking network (see FIG. 2) may include a plurality of location signaling devices. Location signaling devices may include receivers, transmitters, transceivers, gateways, beacons, UWB antennas, anchors, initiators, responders, real time kinematic (RTK) base stations, or the like setup for outdoor location/position determination. The location signaling devices may be configured to utilize radio waves such as UHF, NFC, Wi-Fi, Bluetooth Low-Energy, and/or UWB. The location signaling devices may be positioned around a course of play and be configured to communicate location signals with a plurality of tracking modules 11. The location network may be configured for device-side location calculation and/or network-side location calculation. The location network and/or tracking module 11 may utilize various localization techniques such as RSSI, RSSI-fingerprinting, and/or time of flight (ToF), time difference on arrival (TDPA), and/or angle of arrival (AoA).

The tracking module 11 may include one or more short range communication devices, such as WiFi, Bluetooth, BLE, NFC, and/or Ultra-Wide Band chips configured to provide short range location signaling, location searching, proximity determination, and/or ranging. FIG. 4D illustrates a wireless communication port 115 configured for ultra-wide band, but other short range communication protocols and/or signaling may be utilized. Wireless communication port 115 may be in addition to or instead of wireless communication port 114. In some embodiments, wireless communication port 115 comprises a Wi-Fi chip, BLE chip, LTE chip, and an ultra-wide band chip and wireless communication port 114 comprises a cellular chip. Depending on the configuration, a locating service may be utilized by the tracking module 11, STTM system, location signaling devices of a the location network, and/or any device suitably configured to receive the location or locating signal and utilize the signal and associated data to locate and/or determine a position/location of the tracking module 11.

Additionally or alternatively, the tracking module 11 may be configured to receive locating signals from location signaling devices that may be used to determine the location/position of the tracking module 11, either by the tracking module 11, companion device, location network, location system, or otherwise. Beacons signals, for example, may be used to determine the location/position of the tracking module 11. As introduced above, the locating signal may be output via short range communication technology. In various embodiments, locating signals may be transmitted via radio waves such as UHF, NFC, Wi-Fi, Bluetooth Low-Energy, or Ultra-Wide Band. For instance, the tracking module 11 may be configured to receive locating signals, e.g., beacon packets or UWB anchors. In a device-side use case, the tracking module 11 may calculate its location using received location signals or relay the location signals/packet data and/or associated receipt parameters to another device, such as a companion device or management device, for direct processing or indirect processing, e.g., by utilization of an API. For example, if beacons are present, the tracking module 11 may receive beacon packets which the tracking module 11 or a companion device or management device in communication with the tracking module 11 may use for location/position determination, e.g., via RSSI, RSSI-fingerprinting, and/or ToF techniques. In a network-side location calculation use case, the tracking module 11 may continuously output signals, transmit locating response signals to locating signals received from location signaling devices, transmit poll signals, or the like which the location network or other STTM system component, such as the location system, may use to calculate location of the tracking module 11, e.g., via TDPA, ToF, and/or AoA. In one embodiment, the location network includes a plurality of location signaling devices, e.g., beacons or anchors, positioned around an area of play, such as a green, fairway, rough, and/or tee box. The tracking module 11 may receive transmitted signals for position/location determination. In a further example, the tracking module 11 may transmit response locating signals. In an above or another example, three or more beacons or anchors may be used, e.g., around a green, for precision and accuracy.

In one embodiment, the tracking module 11 may be configured for UWB location/position determination in conjunction with the location network. For example, the tracking module 11 may include multiple antennas for direct or indirect utilization of AoA/phase difference. The tracking module 11 may be configured for single-sided, two-sided, or multi-sided ranging as an initiator and/or responder. The tracking module 11 may be configured to operate as an initiator in a time difference of arrival model with synchronized anchors of the location tracking network positioned around a golf course for precision location and accuracy, e.g., down to 1 cm. In one embodiment, multiple positioning technologies may be utilized to enhance positioning such as Wi-Fi, BLE, and/or UWB. In further embodiments, one or more of these positioning technologies may be utilized in conjunction with one or more global satellite constellations. In some embodiments, the location system includes a UWB positioning system including a plurality of anchors that receive locating signals from the tracking module 11. The anchors may utilize time difference of arrival (TDoA) or other suitable technique to determine the coordinates of the tracking module 11. It will be appreciated that in such a network or any other location network, the location system may receive and/or collect the locating data or location data. The location system may calculate location from the locating data. The location system may further comprise all or a portion of the location network.

The tracking module 11 may be configured to utilize one or more global satellite constellations for accurate location determination and position. Illustratively, FIG. 4D shows inclusion of a GPS chip or receiver 117 configured to receive GPS location coordinate data. While the present description generally refers to GPS, those having skill in the art will appreciate that such reference applies equally to other Global Navigation Satellite Systems (GNSS), such as GLONASS, BeiDou, Galileo, or other current or future GNSS. GPS location may be augmented with WAAS (Wide Area Augmentation System), Differential GPS (DGPS), e.g., Global Differential GPS (GDGPS), real time kinematic (RTK), Continuously Operating Reference Stations (CORS), Signals of Opportunity (SOP)-based or augmented navigation, UWB, LTE, cellular, radio, television, Wi-Fi, other satellite signals, or the like. In some embodiments, the location network may be used instead of or in a hybrid manner with one or more global constellation coordinate systems. The location network may utilize location signals and methodologies including but not limited to RTK, CORS, SOP-based, UWB, LTE, cellular, radio, or Wi-Fi. In one example, the tracking module 11 is configured to utilize any and or all of the available global satellite constellations (GPS, GLONASS, BEIDOU, GALILEO & QZSS) for accurate positioning 0.5-5 m typ. accuracy outdoors or better. In one embodiment, the tracking module 11 transmits its coordinate location to the management system over a cellular network.

In one embodiment, the communication network includes a LPWAN (Low Power Wide Area Network) through which the tracking module 11 transmits location data directly or indirectly to the management system. In one example, the LPWAN includes a LoRa network. The companion device may similarly transmit stroke event data over such a network. Unlike current score tracking methodologies, the configuration of the present score tracking system may utilize low data loads suitable for small data packet transmission over low power, long range networks, while still maintaining a robust volume of accurate data.

As introduced above, the STTM system may utilize a UWB positioning/location network for all or a portion of location services. GPS or other location services may also be used at the same time, in a hybrid configuration, or as a separately selectable option or setting with respect to the system devices.

In various embodiments, the tracking module 11 may be configured to continuously output a location or locating signal or may be configured to output the location signal upon receipt of an instruction to do so. For example, an ST application or location tracking network may be operable to address one or multiple tracking modules 11 to initiate output of the location signal. In one embodiment, tracking modules 11 are configured to determine location coordinates every n seconds and transmit all or a portion of the coordinates every n+x seconds. For example, a tracking module 11 may be configured to collect location coordinates at any predetermined time interval and transmit collected location coordinates at any time interval.

In one embodiment, a tournament course and/or surrounding grounds may be mapped and divided into geolocation zones. Location data, which may include locating data, of a tracking module 11 may be transmitted to the management system, e.g., to a management device, for determination of a current geolocation zone corresponding to the location of the tracking module. The current zone may be transmitted to the tracking module 11, which may trigger an action by the tracking module. In one embodiment, the tracking module 11 is programmed to identify the current zone and identification of the current zone may trigger an action. In some embodiments, the tracking module 11 may transmit coordinates to a management device that passes the coordinates through an API including geolocation zones and returns the current zone of the coordinate corresponding to the tracking module. Actions that may be triggered include alerts, API calls, database entries, alarms, etc. based on entering, exiting, or being in a particular zone.

Figure 3:
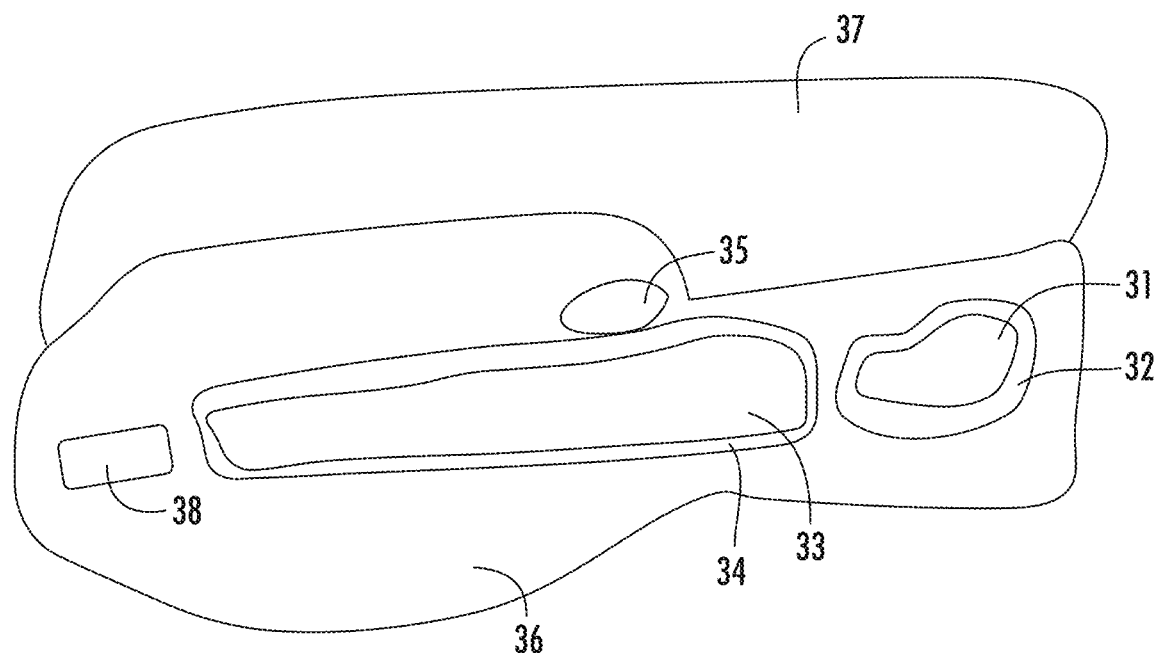
FIG. 3 illustrates zone features for location tracking according to various embodiments described herein.

FIG. 3 illustrates an example geolocation zoning of a golf hole. The zones include a green zone 31, fringe zone 32, fairway zone 33, first cut zone 34, hazard zone 35, rough zone 36, natural area zone 37, and tee box zone 38. Each zone includes the coordinates corresponding to the respective zone. As noted above, other or additional zones may be included. In various embodiments, all holes are zoned. As introduced above and described in more detail below, geolocation zoning may be used for various operations of the STTM system. For example, the companion device, score tracking system, or management system may mark or record a group of players as being on the green when the tracking module assigned to the first player in the group crosses into the green zone 31. As noted above, the location system may collect or receive location data with respect to the tracking modules. The location system may use this location data to determine a location of the tracking module. The location coordinates may be applied to predefined coordinate ranges corresponding to defined zones to determine which zone the tracking module is currently located. This zone determination may be performed in real time, e.g., within less than 10 seconds or 5 seconds or less. The location system may utilize a most recent set of location coordinates or intervals of location coordinates to determine a current location and/or zone in which each tracking module 11 is located to track location of the tracking modules 11. Similarly, the group may be marked or recorded as completing a hole when the tracking module assigned to the last player in the group crosses out of the green zone 31 after the group is marked or recorded to be in the green zone 31. When the tracking module 11 assigned to the first player to cross into the tee box zone 38 is detected, the group may be marked or recorded as being in the tee box. As described in more detail below, the user entries into the ST application on the companion device may additionally or alternately be used to mark or record locations. In one embodiment, a group marked or recorded as in the tee box, may advance the ST application to the hole associated with the tee box. In another embodiment, a scorer entering, into the companion device, "in the hole" with respect to the last player in a group to hole out a hole, automatically advances the ST application to the next hole. In another embodiment, the ST application will not advance to the next hole until "in the hole" is entered for all players on a preceding hole and a player enters the tee box of the hole.

As introduced above, tracking modules 11 may be configured to collect location coordinates at any predetermined time interval and transmit collected location coordinates at any time interval. In one example, the tracking module may be configured to obtain location coordinates, e.g., GPS location, every second and transmit the obtained location coordinates to the location system every five seconds. However, the tracking module 11 may be configured to collect location data and transmit collected location data at any desired time intervals.

In one embodiment, the location of the tracking module 11 is continuously tracked, e.g., at one second intervals, or as otherwise programmed. In one embodiment, pairing time stamps with location may analyze location coordinates collected prior to and after the time corresponding with the time stamp to identify the most likely location.

As described in more detail below, the scorer using the companion device, may also enter ball locations or "from location." Such locations may correspond to defined zones of the hole. Using the zone determination from the tracking module coordinates, the location system may compare the determined zone with an input zone and identify the presence of any inconsistencies. For example, the determined zone may be fairway but the input zone may be bunker or hazard. In this situation, the location system may be configured to accept the zone location as bunker or hazard. In one embodiment, the location coordinate may be adjusted to the bunker or hazard. In another embodiment, the location coordinate may be retained and only the zone location corresponding to the "from location" is changed to correspond to that entered by the scorer.

The companion device may record time stamps at address and/or shot hit. The location network may apply an algorithm that analyzes locations prior to and after the time stamp. The lookback and forward time periods may be adjustable in the location system. As an example, the lookback and forward time periods may be 30 seconds. In one embodiment, the lookback period may be longer than the forward period. The location system may look to the locations most proximate in time to the time stamp and identify the most accurate. Identification of the most accurate location may include determination of a period of time of 5 to 10 seconds or longer with little to no change in location. As described above, the tracking module may be able to detect when a swing is made. Such data may be provided to the location system to confirm or enhance the analysis with respect to the time stamp. For example, the location system may pair the location at the time of the swing and cross-reference the location with the location obtained by the scorer provided in the time stamp. In some embodiments, if the location is not known or does not correlate with an expected location, e.g., coordinates correspond to a different hole, the location is not recorded.

In one embodiment, tracking modules 11 are configured with operation windows. For example, location data, which may include locating data, will not be stored or transmitted outside of the defined time of the operation window. Such an operation window may be registered to each tracking module 11. In this or another example, location data or locating data will not be stored or transmitted if the tracking module 11 is not registered to a player in the tournament. In any of the above or another example, the tracking module 11 may not transmit location data or locating data if the coordinates obtained are not coordinates of the course(s) hosting the tournament. Thus, in some embodiments, the tracking module 11 may be programmed with allowable coordinates associated with the tournament. Such a limitation may enhance privacy to users of the tracking module 11. In some embodiments, operation window registration, player registration, and/or coordinate limitations may be overridden by the STTM System 10, e.g., to locate a lost or missing tracking module 11.

In one embodiment, the STTM System 10 may be configured to pass a notification to a tracking module 11 registered to a player that is out of position or playing too slowly. For example, the tracking module 11 may output a text notification (if so equipped), audible and/or visual alarm, or vibration. Additionally or alternatively, a companion device assigned to a group including a player that is out of position or playing too slowly may receive such a notification via the ST application. In a further example, the notification may include instructions with respect to how to correct the problem, e.g., arrive at a particular location at or by a time or ask player to increase pace.

Figure 5A:
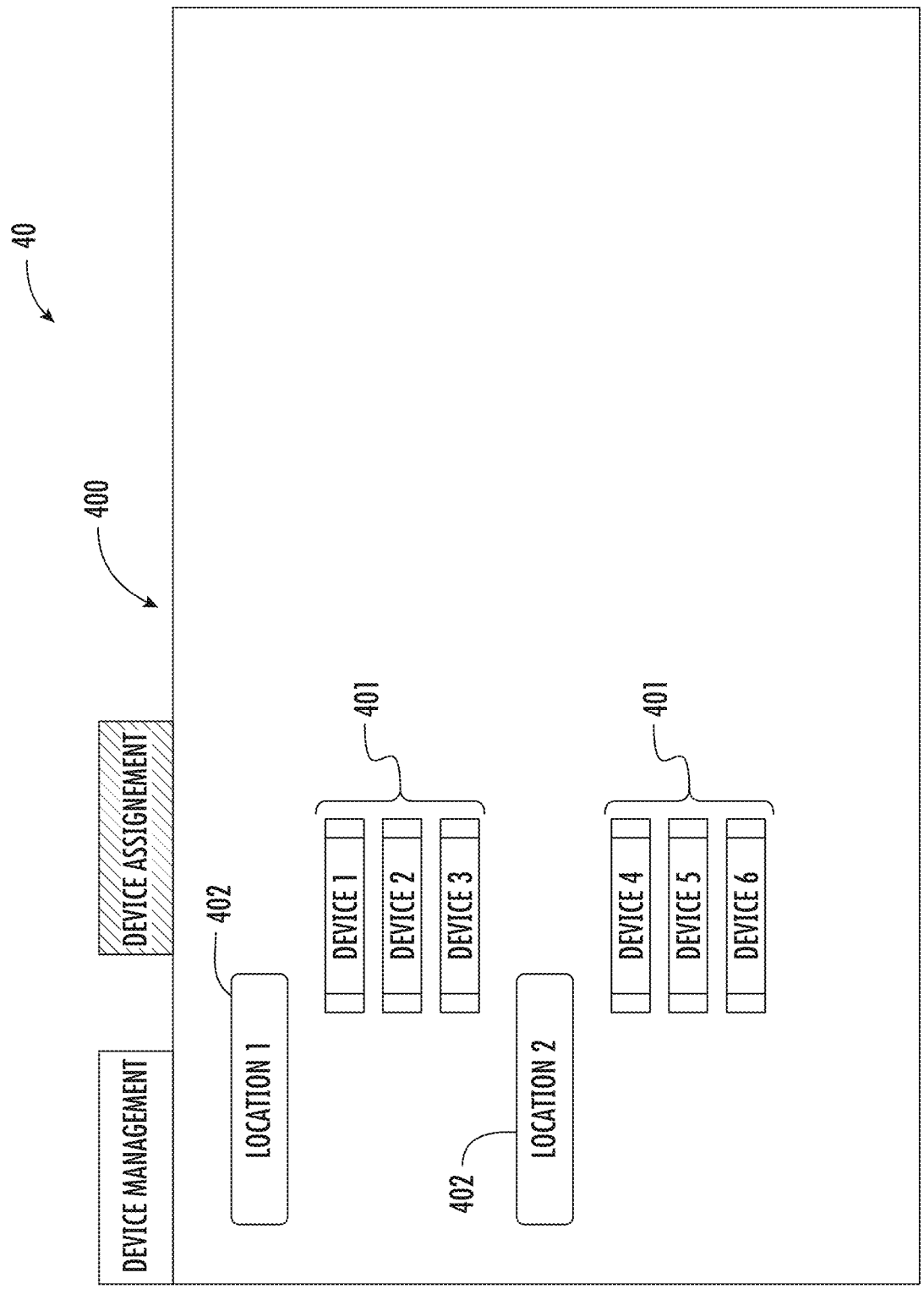
FIG. 5A provides an overview listing of the tracking modules and their associated locations that are loaded into the device management system according to various embodiments described herein.
Figure 5B:
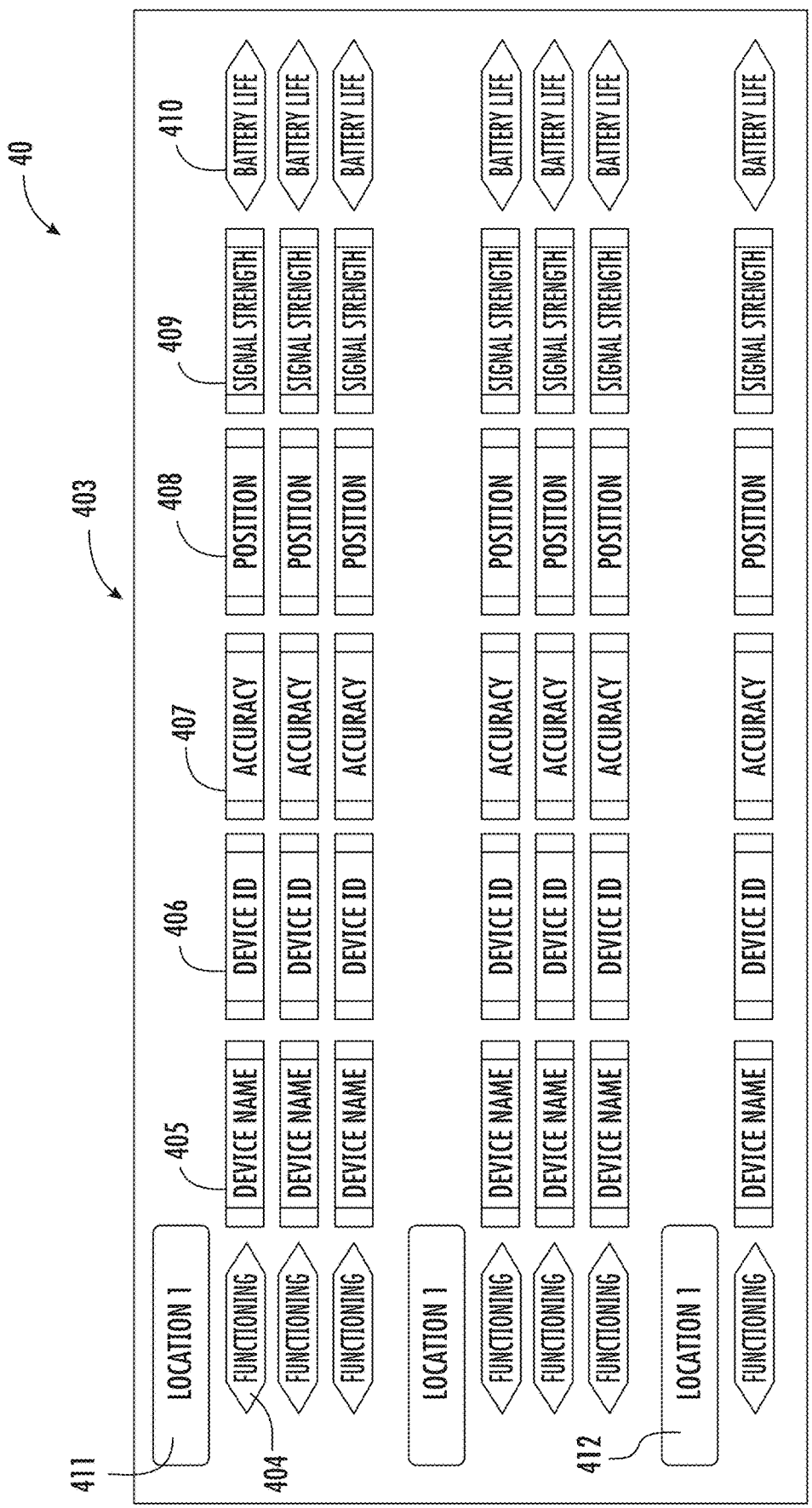
FIG. 5B illustrates an example user interface generated by a device management system to provide tracking module management functionalities and present device management data for loaded tracking modules according to various embodiments described herein.
Figure 5C:
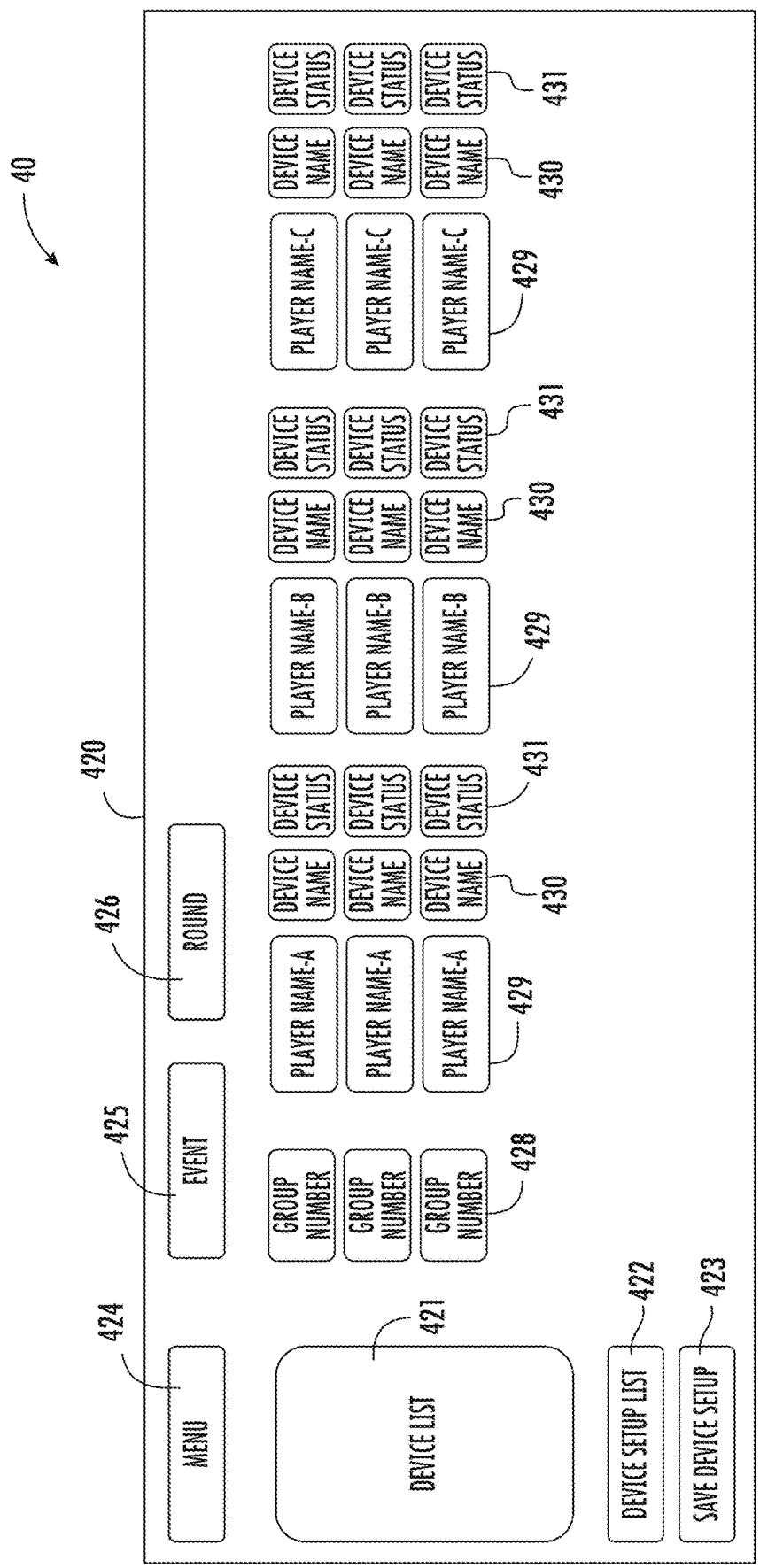
FIG. 5C illustrates a device assignment user interface that enables a user to perform device assignment operations according to various embodiments described herein.

As introduced above, and with particular reference to FIGS. 5A-5C, the STTM system may include a device management system 40 configured to assign tracking modules 11 to players. The device management system 40 may provide device managers data and/or device access to device management operations locally, remotely, and/or from any location via management devices. In some configurations, the device management system 40 is configured to assign Tracking modules to a group which, in turn, will be assigned to a player. The tracking modules may be actively assigned to a player, e.g., a software of the tracking module may be programmed, typically temporarily, to a player such that location data, locating data, or other data transmitted from the tracking module includes identification of the assigned player. The location data may include a time stamp corresponding to the time the location data was collected or otherwise relates with respect to the location of the tracking module. In some embodiments, the tracking module is player agnostic and an identification number or other unique identifier associated with the tracking module is established in the STTM system such that communications from the tracking module pair the identifier with the assigned player. In various embodiments, whether programmed or agnostic, the companion device may be configured to associate the tracking module with an assigned player. For example, the ST application may be programmed by the device management system or by the scorer to associate the tracking module with the assigned player for display on the companion device. In some embodiments, the companion device may transmit tracking module identifiers and/or player names to the STTM system, such as location system, device management system 40, data management system, or validation system, when a stroke event associated with a location time stamp is input.

The device management system 40 may be configured to import and group tracking modules for tournament operation. In one example, the device management system 40 may be configured to store and/or present tracking module management data. In certain embodiments, the device management system 40 is configured to load or import new tracking modules and create new devices. Importation of new tracking modules may include uploading a file, such as a CSV file, including tracking module profiles or a list of tracking module profiles to manage. Tracking module profiles may include specific tracking module management data such as identifiers and/or other tracking module data. The device management system 40 may be configured to store the tracking module profiles to a location and save the associated tracking modules loaded and the location of the tracking modules. The device management system 40 may be configured to directly or indirectly receive specific device related management data from the loaded tracking modules and present at least a portion of this data on a user interface display. FIGS. 5A-5B illustrate embodiments of a user interface that present device management data and enables users to perform device management operations.

FIG. 5A provides a device management overview presentation 400 including a device listing 401 of the tracking modules and their associated locations 402 that are loaded into the device management system 40 according to various embodiments. The device management system 40 is configured to enable a user to create a location and delete a location. In one embodiment, when a user deletes a location, a warning prompt may be generated to notify the user of the deletion upon user confirmation. Locations 402 may be locations associated with the listed tracking modules. A location 402 may reference a geographic location by coordinate, landmark, or location reference (e.g., $9^{th}$ hole, volunteer meeting area, gear locker, equipment room, geolocation zone, etc.). Additionally or alternatively, a location 402 may refer to a physical container that contains the respective tracking modules (e.g., container 681). In one example, locations 402 refer to containers comprising containment devices configured to function as charging stations to charge tracking modules and/or storage stations for storing tracking modules. In one example, locations 402 refer to a physical container containing the tracking modules as well as a geographic location of the container, which may be a coordinate, a geolocation determined zone corresponding to the listed tracking modules, or a location that is defined by the device management system 40. The locations 402 and devices included in the device listing 401 may be imported into the device management system 40 prior to assignment. In one configuration, the number of devices per location may be pre-defined in the device management system 40 at importation.

FIG. 5B illustrates an example user interface 403 generated by the device management system 40 to provide tracking module management functionalities and present device management data for loaded tracking modules. The data elements included in tracking module device management data or profiles shown in the illustrated embodiment include (a) functioning 404, (b) device name 405, (c) device ID 406, (d) accuracy 407, (e) position 408, (f) signal strength 409, and (g) battery life 410 for each tracking module. In other embodiments, fewer or additional device data elements may be presented. A location element 411, which may correspond to the location 402 provided in the overview presentation 400, may be provided at the top of the hierarchy. The loaded and stored tracking modules and associated device data elements may be stored to the identified location 411 and may be presented underneath the location 411 element. In one configuration, the device management system 40 may be configured to enable a user to move locations and associated device management data to change the order in the presentation. In the above or another configuration, a user may be able to collapse and expand the tracking module data for selected locations, e.g., by interacting with the location 411 field. In an above or another configuration, the presentation includes a location labeled "storage" 412 that stores loaded but currently unused tracking modules. In one example, this location label is fixed and cannot be deleted. As noted above, the device management system 40 may be in direct or indirect communication with loaded tracking modules to receive data associated with one or more device data elements. In various embodiments, the presentation may be configured to auto refresh at predetermined time intervals, such as every 30 seconds, or upon the occurrence of an event, such as a device data element being received outside a predetermined acceptable range or beyond a threshold value. In one configuration, the presentation may include a manual refresh option to cause the presentation to immediately update the values of the device data elements.

If a respective tracking module is sending location signals, e.g., GPS information/coordinates, poll signals, response signals, location signal parameters, location data, locating signals, etc., "functioning" is identified in the functioning 404 data element.

Device name 405 may be a unique name associated with the device. Device ID 406 may be an assigned manufacture ID number of the GPS or other location technology. Accuracy 407 may refer to a measured accuracy of the device's location as a distance. Position 408 may refer to the current location of the device. Depending on configuration and location technique(s) being used, the position value may be provided in latitude/longitude, grid coordinates, or other suitable position coordinate designation. In various embodiments, the device management system 40 may perform one or more location operations associated with the location system. For example, the device management system 40 may receive transmitted location data from tracking modules during play. The device management system 40 may provide such location data to the location system continuously, upon request, or at predetermined intervals. In one example, the location system receives time stamps from the ST application corresponding to location events entered into a companion device. The location system may provide the time stamps to the device management system 40 for pairing with the corresponding location of a specified tracking module at the time stamp. In another example, companion devices may transmit location events to the device management system 40 for location pairing. Any suitable data handling and flow may be used to perform such location operations during play. For example, tracking modules may transmit location and/or locating data to the location system and companion devices may transmit location events to the location system for time stamp and tracking module location pairing.

Signal strength 409 may be the current signal strength of the location signals received by and/or transmitted by the respective tracking module. For example, signal strength 409 may refer to a wireless signal strength, such as cell, Wi-Fi, UWB, etc., and may be queried by the device management system 40 to measure the health of the tracking module with respect to its ability to share location or other data, such as swing. In one embodiment, signal strength 409 may refer to accuracy for location based coordinates. Battery life 410 may provide a value related to life of a battery of the tracking module. For example, a battery life element data value may be presented as a percentage of battery life remaining or a time or time period when the battery will be fully depleted or depleted to a threshold level In some embodiments, communication between the device management system 40 and tracking modules may be two-way. For example, the device management system 40 may be configured to address tracking modules. In one such configuration, removing or transferring a tracking module from a location 402/411 via operation of the device management system 40 may cause a communication to be transmitted to the removed tracking module. The communication may cause the tracking module to update its location to "unassigned", "storage", or a new location as the case may be. In one example, the tracking module may include a user interface (e.g., see FIG. 4C) allowing a user to view the device data elements associated with the tracking module. In the above or another example, the communication may cause the tracking module to output a notification that it is not to be used, not to be associated with that location, or is to be moved to another location. The notification may include audio, text display, lights, or other indicia that when perceived by a user provides the desired notification. In one example, tracking modules include a notification button that when pressed by a user causes output notifications associated with the tracking module. In some embodiments, tracking modules are not configured to store an indication of an assigned location.

In one embodiment, the device management system 40 is configured to enable a user to assign tracking modules to players. Assignment of tracking modules may be based on player groupings for a round, for example. With reference to FIG. 5C, the device management system 40 may be configured to generate a device assignment user interface 420 that allows a user to perform device assignment operations. In various embodiments, the device assignment user interface 420 and the device management overview 400 may be provided in a tab format allowing a user to simply select the desired tab to perform device management or device assignment operations from either interface. In one embodiment, the device assignment user interface 420 may receive groupings from the groupings engine and automatically assign tracking modules from a device list to the groups and players.

The device assignment user interface 400 may include various device assignment elements. For example, the device assignment may include elements selected from one or more of (a) device list 421, (b) device setup list 422, (c) save device setup 423, (d) menu 424, (e) event 425, (f) round 426, or (g) group presentation 427. The group presentation 427 element may display the groups for device assignment along with players associated with the group, if available. For example, the group presentation 427 may include one or more of (a) group number 428, (b) player name 429, (c) device name 430, or (d) device status 431.

Device list 412 may include a list of devices not assigned to a group number. Device setup list 423 may include a stored configuration of device assignments to a group layout. In certain embodiments, a save device setup 423 operator may be provided as an option operable to save a device setup for a set of groups. Menu 424 may contain one or more additional options that are not visible for quick selection on the main panel. Event 425 may identify the event in a golf tournament or other event that the device assignments for each group will be reviewed and managed. Round 426 may identify the round of an event that device assignments will be reviewed and managed.

As introduced above, the device assignment elements may include a menu 424 that contains additional options that assist a user in the setup for device assignments. In one example, the menu 424 may include a "location select" option enabling a user to select or specify a location for one or more devices that will be used for device assignment. In the above or another example, the menu may include a "tournament" option enabling a user to select the tournament. The tournament option or another option may be available to specify a tour in which the tournament is associated. It will be appreciated that the assignment elements may be provided in any suitable presentation format and elements referenced with respect to the menu 424 may be provided on the main device assignment user interface 420 display.

In one embodiment, the device management system 40 may be configured to load a shell of group numbers and the devices assigned to that group. In various embodiments, each assignment in the group may be in sequential order. The order may be static unless assigned and re-assigned to the group. As introduced above, the device list may contain the list of all tracking modules that have not been assigned to a group and, hence, available for assignment. The device management system 40 may be configured to enable a user to assign devices in the device list to a group. A user may further be enabled to assign the devices in a specific order in the group. Upon assigning devices to a group, the user may save the allocations via the save device setup operator.

The group presentation provided on the device assignment user interface 420 may be configured to provide the group number and the devices associated with that group. If a selected round has players, the group presentation may show each of the players associated with the group in teeing order. For example, when a round is selected from the round 246 element, the players for the groupings may be automatically filled in the group presentation. Group number 428 may include a number associated with the groupings for the round and that may also be assigned to each tracking module assigned to the group for deployment. Player name 429 may include the name of each player that is assigned to the group, and may be presented in teeing order. Device name 430 may include the name of the device. Device status 431 may include details of the device's current hardware functions such as battery life and signal strength.

In one embodiment, assigning tracking modules to a player associates a tracking module identification number with a player at the backend of the STTM system such that data obtained from and/or recorded by the tracking module is accompanied by the identification number and the STTM system components receiving the data, e.g., companion device, location system, validation system, data management system, device management system 40, and/or data platform, associate the identification number with the assigned player. Such STTM system components may receive the player and tracking module identification number assignments set by the device management system 40 for such purposes. In one example, the companion device receives the player and tracking module identification number assignments set by the device management system 40 and associates the tracking module data with the player when scoring, e.g., storing and/or transmitting to the same STTM system components. As introduced above, the STTM system may include a location network configured for device-side and/or network-side location tracking, e.g., utilizing an UWB anchor network. On a network-side location tracking use case, the device and player assignments may be transmitted to system components configured to calculate locations from data collected by the network-side location network or subsequently used to associate calculated location data of a tracking module with that of the assigned player.

As introduced above, and with reference to FIGS. 6A-6G, the STTM system may include a round management system 60 configured to manage rounds and groupings for players that are playing in an event. The round management system may provide data managers data access to round management operations locally, remotely, and/or from any location via management devices. In various embodiments, groupings may be managed by a groupings engine 500 configured to one or more of store tee times, adjustment to prior published tee times, or record the order of players in each tee time group. In some embodiments, the groupings engine 500 may be configured to automatically generate groupings for future rounds based on scoring rules. Rounds may be managed by a rounds engine 501 configured to manage one or both of round states or round cuts.

Figure 6A:
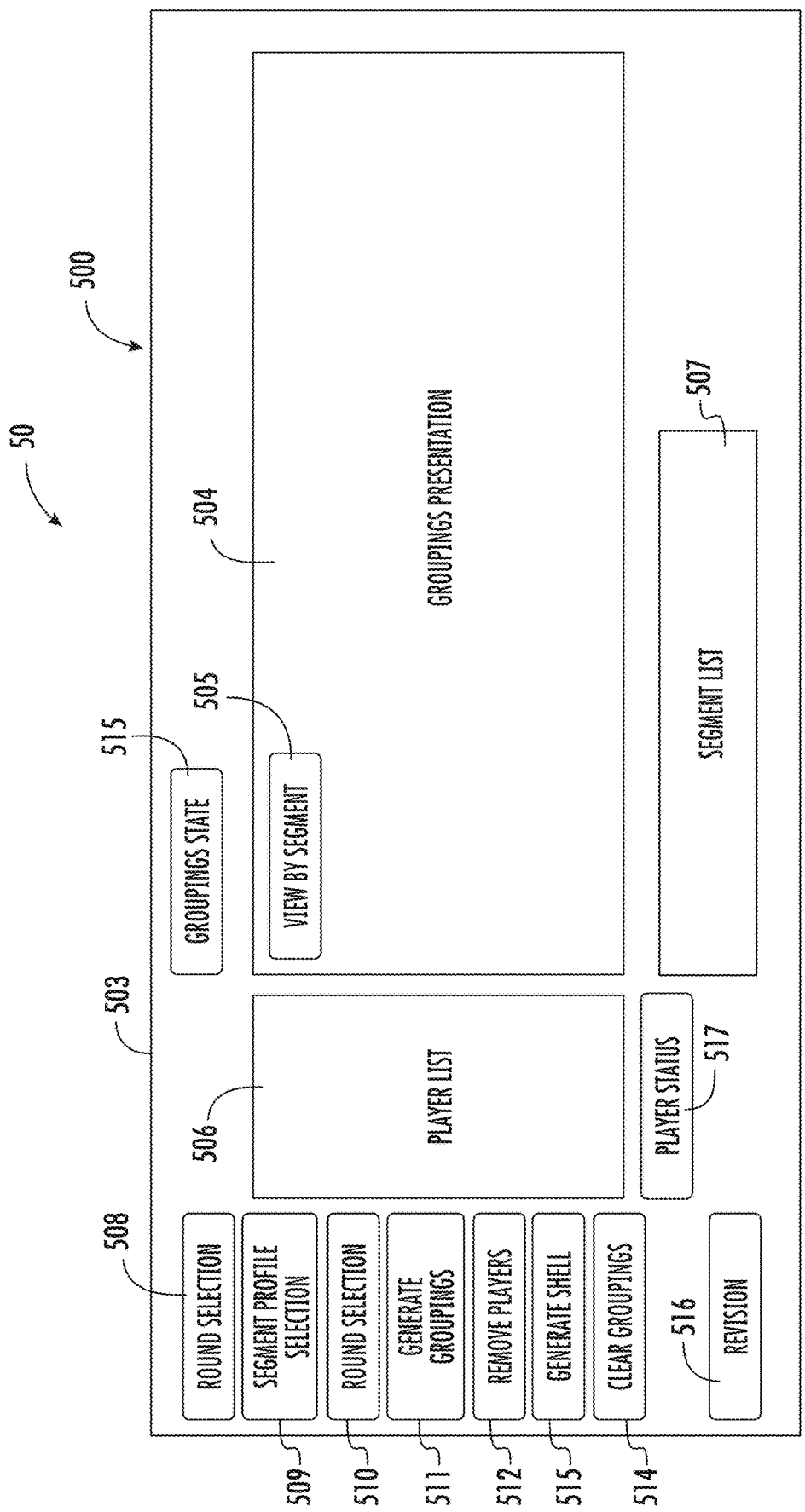
FIG. 6A illustrates a groupings engine user interface comprising a groupings management panel according to various embodiments described herein.

The groupings engine 500 may be configured to manage groupings. Management of groupings may include creating groupings of players. In one example, the groupings engine 500 may be configured to enable a user to define and manipulate groupings for any round of any event. FIG. 6A illustrates a user interface of the groupings 500 engine comprising a groupings management panel 503 configured to interface a user with various operations of the groupings engine 500. In various embodiments, the groupings management panel 503 may be configured to provide one or more elements, e.g., interface elements, display elements, or associated operational elements, selected from (a) groupings presentation element 504 comprising a list of groups with their associated tee times for each segment; (b) a view by segment element 505 operable to enable the user to view each segment, a defined portion of the segments, or all segments at once; (c) a player list element 506 that identifies players that have not been grouped or that are otherwise available to be grouped; (d) a segment list element 507 that identifies segments that have been created for a particular round; (e) a round selection element 508 operable to enable a user to select a round for reviewing and editing of groupings wherein segments are associated with the round; (f) a segment profile selection element 509 operable to load a previous created profile with segment information; (g) an edit segments element 510 for creating or change segments for the round; (h) a generate groupings element 511 configured to generate groupings based on predefined and/or definable segment rules for the round; (i) a remove players element 512 configured to remove players in the grouping presentation component while retaining the tee time data; (j) a generate shell element 513 configured to generate groupings without players but with groupings based on segment rules for the round; (k) a clear groupings element 514 conjured to remove players and tee time data from the groupings presentation component; (l) a groupings states element 515 comprising a selectable list of grouping states; (m) a revision element 516 to access operations of a revision editor operable to adjust groupings and flag a round as groupings revised; or (n) a player status element 517 providing access to operations of a player status editor operable to change a player's status for a round in an event.

Figure 6B:
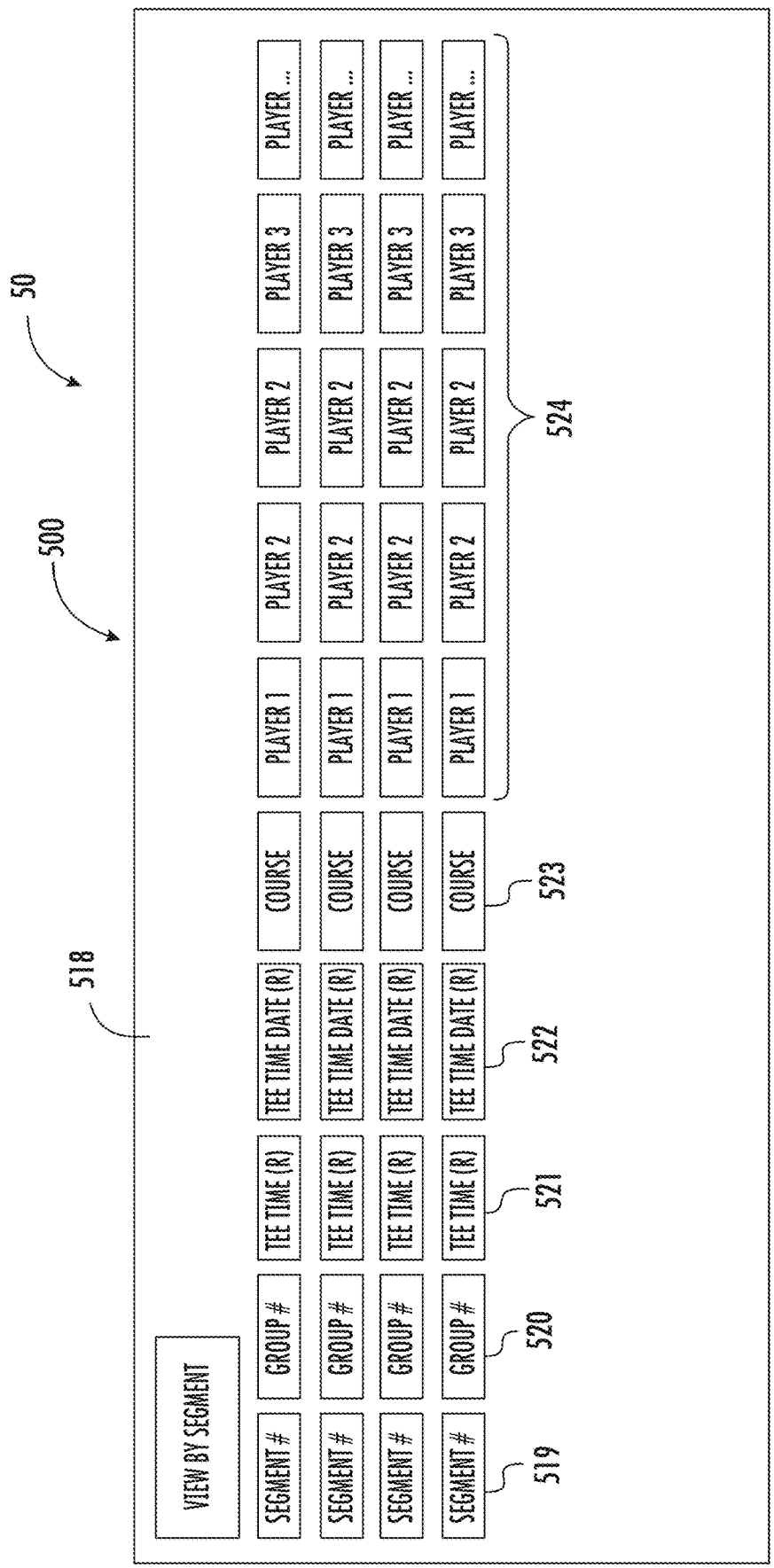
FIG. 6B illustrates a groupings presentation by segment according to various embodiments described herein.

With further reference to FIG. 6B, the groupings engine 500 may be configured to display a groupings presentation 518. The groupings presentation 518 may be displayed in whole or in part or be accessible via interaction with the groupings presentation element 504 (FIG. 6A). In the illustrated embodiment, the groupings presentation 518 includes grouping data elements provided in rows wherein each row represents a group of players with tee times. For each group, one or more of the following grouping data elements may be provided: (a) segment number 519 providing the segment number associated with the group, (b) group number 520 associated with the group of players for a specific tee time, (c) tee time 521 presenting the current time created for the group, (d) tee time data 522 presenting the date of the tee time created for the group, (e) course 523 presenting the course the group will be playing for the identified tee time, and (f) player 524 providing the name of the player assigned to each group, which may be presented in order of play.

As discussed in more detail below, various grouping and/or round data may be subject to revision. In the illustrated display, grouping data that has been subject to revision from an original value are displayed with a label, which is an (R) in this example, to denote revisions to the original tee time.

In various embodiments, the groupings engine 500 may provide various viewing and/or editing options with respect to groupings and related data elements in the groupings presentation. For example, the groupings engine 500 may provide an interface element allowing a user to sort columns of the data, e.g., by numerical value, alphabetically, chronologically, or other suitable data point characteristic. In one example, an interface element may be provided such that a user may selectively cause the groupings engine 500 to present groupings by segment number or all segments at once. In the above or another example, the groupings engine may be configured to enable a user to edit data points in the rows of the data. For instance, editing features may be provided together or separately from the displayed data. In one embodiment, the displayed data elements referenced in FIG. 6B may comprise interface elements that display respective data point values and are configured for user interaction to optionally edit the data point value. The groupings engine 500 may provide editing features with respect to the grouping data elements selected from (a) a segment number editor that includes a list of available segments that have been created or loaded from a profile; (b) a group number editor operable to enable a user to change a group number value, typically a positive integer; (c) a tee time editor operable to enable a user to change a tee time (e.g., hour: minute); (d) a tee time date editor operable to enable a user to change a tee time date (e.g., month: day: year); (e) a course editor operable to enable a user to change a course, which may include a selectable list of courses available for the tournament and event selected; (f) a player editor operable to enable a user to change a player (e.g., selecting a player may provide a field to enter another player or may display a list of selectable players, which may include drag and drop or other selectable methodology), or (g) combination thereof. As noted above, the displayed elements in the grouping presentation 518 may comprise interface elements. In one embodiment, interaction with such interface elements may cause the above editor operations. In one configuration, the groupings engine 500 is operable to enable a user to selectively add rows, delete rows, or both.

With further reference again to FIG. 6A, the player list element 506 may display or be configured to selectively display a list of all players in a field for the selected event who have not been placed in the groupings presentation 518 or been assigned to a group. In various embodiments, a user may assign a player to a tee time via interaction with the player list element 506 or via another interface element in the groupings presentation 518. In one embodiment, the player list element 506 is configured to display a player name and a player's event score total, which may be relative to par.

The grouping engine 500 may utilize segments and segment profiles. A segment may include a block of tee times that present a starting phase for a round. For example, two segments of groups may include one starting on hole one and the other starting on hole ten. A segment profile may include a set of segment rules that the groupings engine 500 uses to assist in groupings creation. The groupings engine 500 may include or access one or more segment profiles. Segment profiles may be loaded and/or created using a segment data manager. In various embodiments, the groupings engine 500 may be configured to automatically apply one or more segment profiles to a round. For example, a user may one or more of define, save, load, or delete profiles that the grouping engine 500 applies to an event or round thereof. In one embodiment, the groupings engine 500 is configured to allow a current user to search segment profiles and/or users profiles or another user that includes associated segment profiles, such as segment profiles created by or previously used by the other user. In one example, the user may select segment profiles and import the selected profiles into the current event or their profile or export segment profiles to the profile of the other user.

Figure 6C:
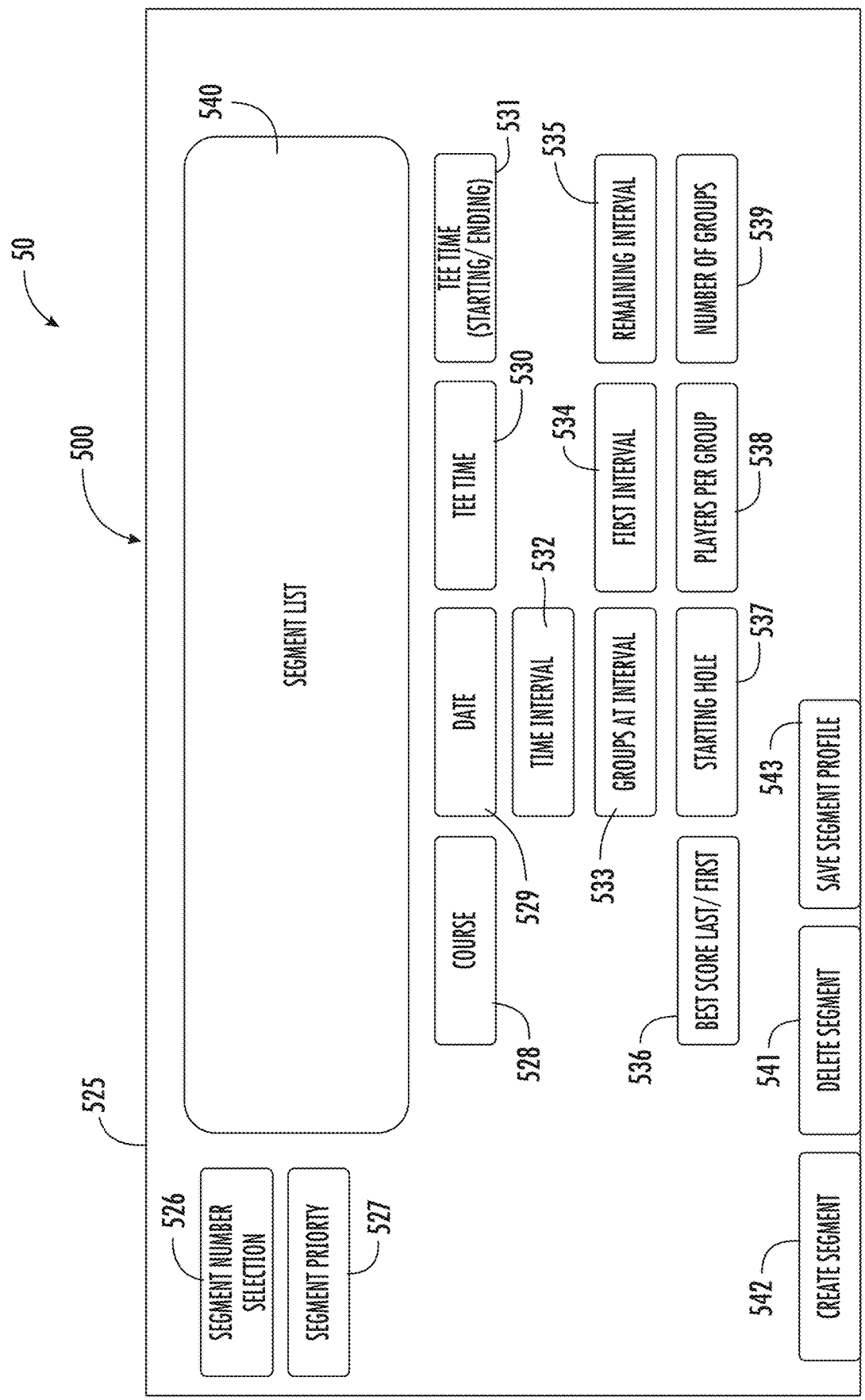
FIG. 6C illustrates a segment profile management interface that includes example data elements of a segment profile along with definitions of options to edit the data elements or create a new segment according to various embodiments described herein.

FIG. 6C illustrates a segment profile management interface 525 that includes example elements of a segment profile along with definitions of options to edit the data elements or create a new segment. The example elements and definitions of options to edit may be available to a segment data manager to create a new segment profile. The elements may include one or more data elements selected from (a) segment number selection 526 including a list of the segments that have been created for a selected round; (b) segment priority 527 comprising a positive integer value that cannot be duplicated is set in another segment associated to the round such that a particular segment may exist in the system once per round; (c) course 528 including a list of courses that are associated with a selected event; (d) date 529 identifying a date when the tee times are to start the play; (e) tee time 530 identifying the initial tee time for starting or ending; (f) tee time (starting/ending) 531 comprising an option to flag the tee time as the starting tee time or the ending tee time; (g) time interval 532 used to specify a time interval between times from the start or end time set in the tee time (above) and the tee time (starting/ending) (above); (h) groups at interval 533 that, if set, identifies the number of groups that will be at one interval while the remaining groups are at a different interval as applied using the first interval (below) and remaining interval (below); (i) first interval 534 representing the number of groups as defined in the groups at interval (above); (j) remaining interval 535 representing the time interval for the groups not defined in the groups at interval (above); (k) best score last/first 536 that identifies if the player with the best score is set in the first tee time or the last tee time; (l) starting hole 537 for all tee times for the segment; (m) players per group 538 identifying a maximum number of players that are assigned to a group; (n) number of groups 539 identify the initial number of groups for the segment, or (o) combination thereof. A segment list panel 540 may comprise a display of all the data elements for each segment for the segment profile that is loaded in the segment profile management interface 525.

In one configuration, the groupings engine 500 is configured to enable a user to create or delete a segment. For example, the elements of a segment profile may be editable via interaction with the elements in a display wherein the options to edit the elements comprise interface elements a user may use to edit data elements of the segment profile or otherwise. For example, to delete a segment a user may select to delete a segment 541 from the segment profile manager interface 525. To create a new segment a user may select create a new segment 542 from the segment profile manager interface 525. Upon selection, the user may be presented with default data elements with the next sequential number from the current segments in the profile, the next sequential number from the current segments in the profile, the current selected course, or predefined time interval. In various embodiments, additional data elements may be set to other default values or left blank to be further specified by the user.

When loading a pre-existing segment profile, the number of groups per segment may be defaulted to the size of the field for the round divided by the number of segments. When editing a segment after the number of players has been updated, the number of groups in each segment may be updated based on the size of the field for the round divided by the total number of segments. In one configuration, if there is an uneven number of groups in a multi-segment profile, the odd group may be automatically placed in the highest even segment priority by default.

After editing or creating a new segment profile, a user may save the segment profile 543. In one example, the user may be prompted to provide the profile with a name, which may be a new name for the profile. The user may also save the profile and override the current segment profile with the updated profile.

With reference again to FIG. 6A, the groupings engine 500 may be configured to generate groupings. In one embodiment, a user may interact with the generate groupings element 511 to generate groupings for an event, round, or segment thereof. For example, when the generate groupings element 511 option is activated the groupings engine 500 may utilize the current segment profile to create groupings. Tee times may be generated based on the configuration of each segment in the segment profile, described above.

When generating groupings, a player slot may be identified for each player based on the number of players per group, as defined in the segment configuration, with the slot representing the order each player will play. The slot referenced as one being the first player to play, the slot referenced as two being the second, and so on. If multiple segments are part of the segment profile for the round, the groupings engine 500 may automatically initiate player assignments starting with segment set as priority one and work in sequential order as each segment is completed with player assignments. If best score last/first 536 is set to last, player assignments may begin at the last tee time of the segment and operate backwards from there. If best score last/first 536 is set to first, player assignments may begin at the first tee time of the segment and operate forwards from there. With respect to player selection and slotting when best score last/first 536 is set, the groupings engine 500 may assign the player with the best tournament score in the first slot, the player with the second best score in the second slot, and so on until a player has been assignment to each slot in a tee time before moving to the next tee time. In some embodiments, a segment profile may tie multiple players. In one example, if multiple players are tied, the groupings engine 500 may apply the following order rules to determine the next player for assignment, such as: (a) earliest tee time from previous round; (b) highest segment priority from the previous round, with the highest being first; (c) the lowest slot number, with the lowest being first; and (d) the course with the highest priority, with the highest being first.

The groupings engine 500 may be configured to utilize the elements of a segment profile for a selected round to create a groupings shell or for groupings automation. For example, when the generate groupings element 511 is activated, the groupings engine 500 may be configured to create the groupings using the profile that is currently selected for the round. The tee times may be generated based on the configuration of each segment in the segment profile, as described above. When the generate shell component is activated the groupings engine may be configured to present a slot based on the number of players assigned to each group for each segment to generate a grouping's shell.

Each round may be associated with a grouping state. The grouping state may be editable via the grouping state element 515. In one embodiment, grouping states may be selected from one or more of (a) draft, (b) to be reviewed, (c) reviewed, (d) official, or (e) combination thereof. A "draft" state may be utilized while a user is working on creating the groupings that are needed for the round. In one embodiment, the "draft" state may be set as a default state when first creating the groupings. A "to be reviewed" state may be set when a defined set of groupings is ready for review. A "reviewed" state may be set when the defined set of groupings has been reviewed and has been determined by the review to be ready to transition to an "official" state. An "official" state may be set when the set of groupings have been reviewed and approved, ready for distribution.

In various embodiments, the groupings engine 500 may be configured to apply one or more groupings state rules. For example, the groupings engine 500 may restrict setting of groupings states that progress toward official that skip a groupings state. In one example, a "reviewed groupings" state cannot be set until a groupings state of "to be reviewed" has been set and the "official" groupings state cannot be set until the groupings state of "reviewed" has been set. In various embodiments, the groupings engine 500 is configured to log all groupings states with a time stamp of selection by the user. The user making the groupings state selection may also be logged and associated with the selection.

In some embodiments, draft groupings are stored for subsequent review by the groupings engine 500. In one example, the stored draft groupings are not distributed to other STTM system components. In some embodiments, review may be performed to modify groups, e.g., to create featured groups of interest, ensure a player is not in early groups multiple weeks in a row, separate players known to play slow, separate players that do not get alone, etc. In one example, when groupings data enters a state for review, management users may review the data and thereafter set the groupings date to an "approved" state once signed off. Once the groupings data has been approved and the associated state set to "approved", the groupings data may be available to other STTM systems.

As introduced above, the groupings engine 500 may include a revision editor. In the illustrated embodiment, the operations of the revision editor may be activated by interaction with the revision element 516 in the grouping management panel 503. Revision state may be specified in various states. For example, revision states may include a "to be revised", "revision", and "revised state". A "revised" state may be set as a default state that is set prior to any revisions being made after groupings are official and before a revisions process starts. A "revision" state may be displayed when a user utilizing the revision editor is in the process of revising groupings that already have a state set to "official". A "revised" state may be displayed when the groupings review process is completed and it is a change from the original groupings that were set as the official groupings state. In one embodiment, when a change is made to the groupings or data elements updated by the revision editor, the revision state may automatically be set to "revision" and the groupings state restarts at the "to be reviewed" state. In a further or another embodiment, the "revised" state may be set when the groupings validation process is completed any time after the original groupings were set to an "Official" groupings state.

Figure 6D:
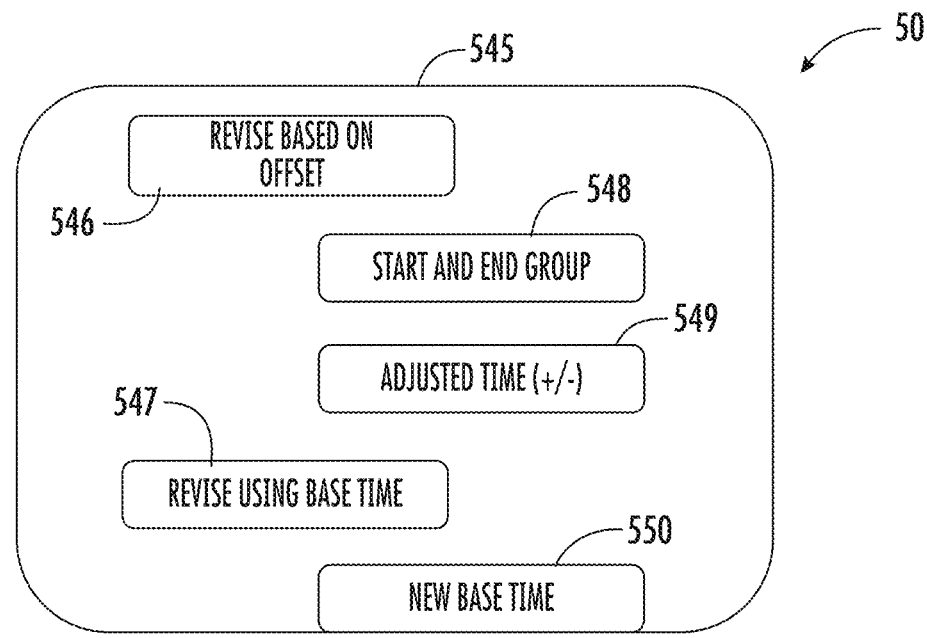
FIG. 6D illustrates an interface of a revision editor configured to adjust tee times using a "revise based on offset" methodology or a "revise using base time" methodology according to various embodiments described herein.

The revision editor may be equipped with various operations that a user may use to adjust tee times from a current groupings tee times. For example, FIG. 6D illustrates an interface of a revision editor 545 configured to adjust tee times using a revise based on offset element 546 or a revise using base time element 547 methodology. The revise based on offset element 546 may cause the revision editor 545 to apply a revise based on offset methodology that utilizes a start and end group. The start and end group may be predefined or set by a user, e.g., by interacting with the start and end group element 548, and represent the starting group and the ending group that the tee times will be adjusted. The revise based on time element 547 may cause the revision editor 545 to apply a revise based on offset methodology, which in one embodiment may also include an adjustment of time that may be specified via interaction with an adjusted time (+/−) element 549 in the illustrated interface, comprising an amount of time that will be applied to an original tee times of the groups identified by the setting of the start and end group step. The start and end group and/or adjusted time (+/−) elements 548, 549 may include interface elements including fields for entering text, selectable lists of groups and/or time differences, or other suitable interface elements. The revise using base time methodology may allow a user to utilize a new base tee time, via interaction with a new base time element 550, that replaces the original base tee time and the adjustments for the remaining tee time are thereafter generated based on data elements defined in the segment profile for the round. In various embodiments, when a revision is used and applied, the round state is set to "revision" and the grouping engine 500 begins a grouping validation process.

Figure 6E:
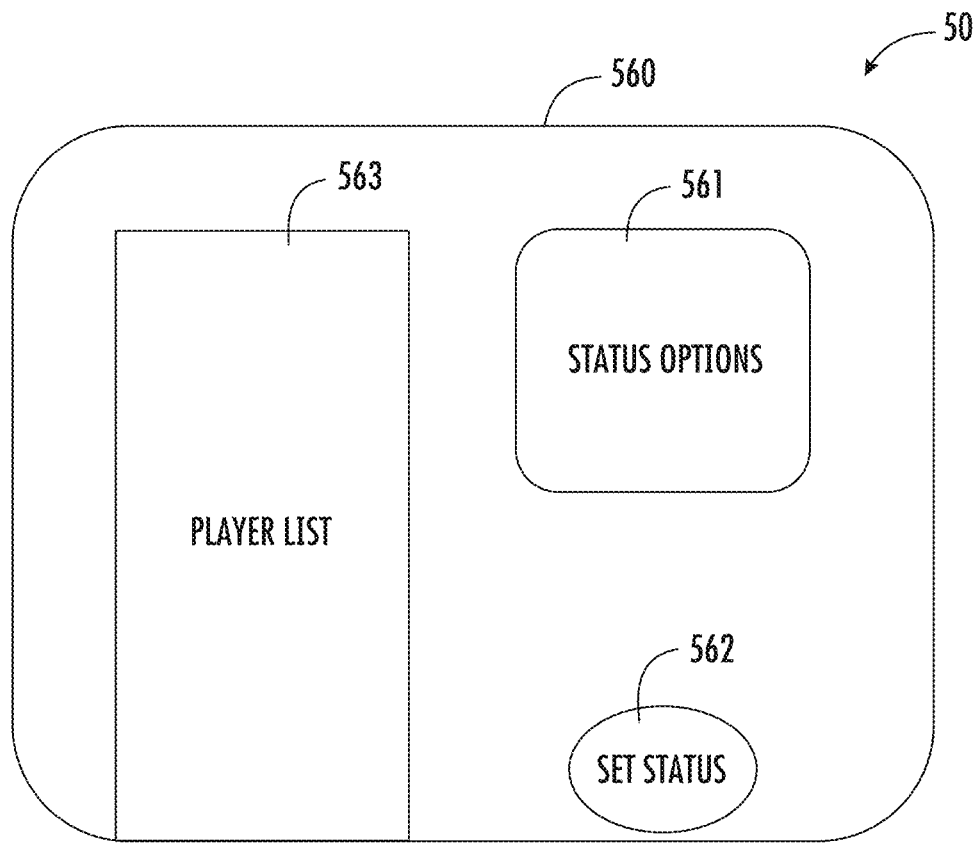
FIG. 6E illustrates a player status editor interface according to various embodiments described herein.

As introduced above, the player list element 506 may contain or provide access to a list of all players in the field for the event. In some embodiments, a player status for the event and/or round may be associated, e.g., displayed, with the name of the player. In some embodiments, the groupings engine 500 may include a player status editor configured to change a player status. For example, in one configuration, a user may highlight a player in the player list and select the player status component to access the player status editor to change the player status for the selected player. With reference to FIG. 6E, depicting an example interface of the player status editor 560, a list of status options 561 may be provided that a user may use to set a player status for a selected player. A set status operator 562 may be provided to enable a user to set a status for a selected player. Various player status options may be provided, which may include one or more of (a) uncut—status that identifies players who are still eligible to play in the event; (b) cut—status that identifies players who are flagged cut, which may be manually set or automatically updated after a cut rule has been run, as described in more detail below; (c) withdrawn—status that identifies players that has withdrawn from a round; (d) disqualified—status that identifies players that have been disqualified from a round; or (e) made cut but did not finish—status that identifies players that are to be paid official money but do not continue to play in the remaining rounds. In various embodiments, the player list 563 may automatically update upon setting a player status. The player status editor 560 may be configured to provide additional options to further define a player's status. For example, the player status editor 560 may provide a user an option to define if a player status entered by the user as "withdrawn" will also be set for future rounds for the player. When the status of a player is set to "withdrawn", "disqualified", "cut", or "made cut but did not finish", the player may be removed from the groupings presentation 504 and the player list 506 in the groupings management panel 503 for the rounds identified.

As introduced above, the round management system may include a rounds engine configured to enable a user to define round states different than the round states as defined relative to the various grouping creation processes described above with respect to FIGS. 6A-6E. In some embodiments, the rounds engine is also operable to enable a user to create and run player cuts on a round. In one example, the rounds engine may be configured to provide playoff management operations along with round states and/or cuts.

Figure 6F:
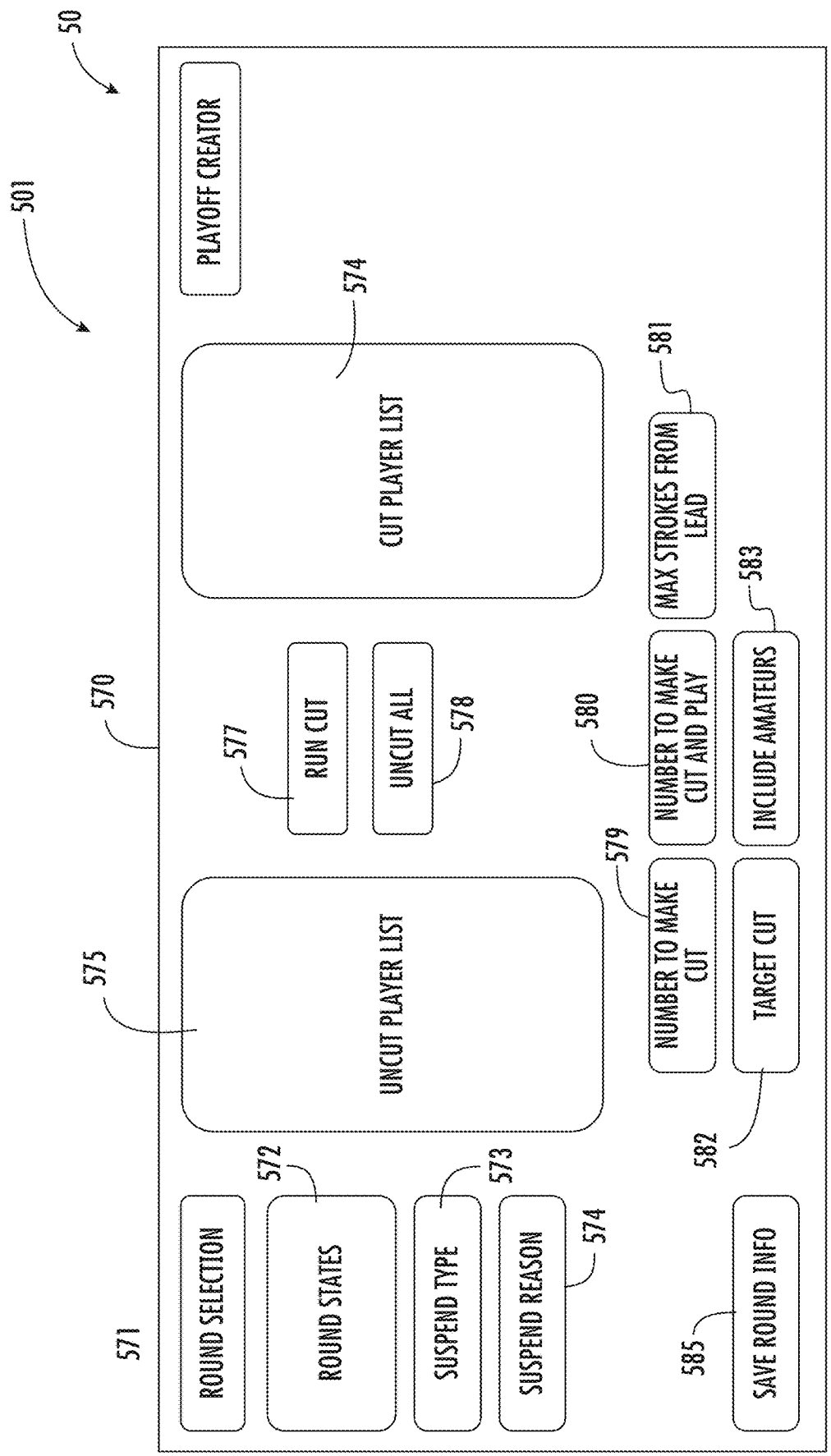
FIG. 6F illustrates a rounds engine interface comprising a rounds management panel according to various embodiments described herein.

FIG. 6F illustrates a user interface of the rounds engine 501 comprising a rounds management panel 570 configured to interface a user to various operations of the rounds engine 501. In various embodiments, the rounds management panel 570 may be configured to provide one or more elements, e.g., interface elements, display elements, or associated operational elements. In the illustrated embodiment, the elements include one or more round selection elements selected from (a) round selection element 571, (b) round states element 572, (c) a suspend type element 573, and (d) suspend round element 574.

The round selection element 571 may be operable to select a round for control. The round selection element 571 may comprise or cause a selectable listing of rounds available for an event to be presented for user selection.

The round states element 572 may be operable to select a round state, and may comprise or cause a selectable listing of available round states to be presented for user selection. In some embodiments, one or more round states may be automatically set by the rounds engine 501. In various embodiments, round states may include (a) not started—default state prior to groupings being set to official; (b) groupings official—state corresponding to and available only when the respective groupings of the round have been set as "official", as described above; (c) in progress—state that is automatically set when the first stroke or score of a round is created, which may additionally or alternatively be set manually in some embodiments; (d) suspended—state that is set if the round is interrupted due to weather or other circumstances; (e) play complete—state that the round may automatically be set to when the last score for a round is created, which in some embodiments may additionally or alternatively be set manually; (f) official—state that is set when no more changes to the round data will be needed such as stroke information or score changes; (g) cancelled—state set if the round has been cancelled and will not be played for the remaining time of the event; or (h) or combination thereof.

In various embodiments, when a round state is set to "suspended" the user may use the suspension type element 573 to select a suspension type. In one example, the round engine 501 may require or prompt a user to select a suspension type when setting a round state to "suspended". In various embodiments, the suspension type element 573 may include or be operable to cause a selectable listing of suspension types to be presented for user selection. Example suspension types may include one or more of delayed, cancelled, suspended, or done for the day.

In various embodiments, when a round state is set to "suspended" the user may use the suspension reason element 574 to select a suspension reason. In one example, the round engine 501 may require or prompt a user to select a suspension reason when setting a round state to "suspended". In various embodiments, the suspension reason element 574 may include or be operable to cause a selectable listing of suspension reasons to be presented for user selection. Example suspension reasons may include weather or environmental reasons. In one configuration, suspension reasons may include one or more of darkness, rain, lightning, fog, wind, or frost. In a further configuration, suspension reasons may include a text field for entry of a custom reason for suspension, e.g., tornado warning, equipment issues, or course maintenance.

The round management panel 570 may also include one or more elements configured to interface a user with operations of the round engine 501 with respect to cut management for a round. It will be appreciated that while certain elements are depicted in a single or same panel, such elements may be provided in many different ways, including different panels and/or in different combinations. With respect to cut management elements, two selectable listings are available in the illustrated embodiment: an uncut player list element 575 and a cut player list element 576. The uncut player list element 575 includes or is operable to cause a selectable list to be presented of all players for the round that have not been flagged as cut. The cut player list element 576 includes or is operable to cause a selectable list to be presented of all players who have been cut for the round. The cut management elements also include a run cut element 577 and an uncut all element 578. The run cut element 578 is configured to run the cut rules based on the selected settings discussed below and set the defined players of a player status of cut. The uncut all component 578 is configured to remove the player status of cut.

With respect to the cut rules, the selectable settings may include number to make cut 579, number to make cut and play 580, max strokes from lead 581, target cut 582, include amateurs 583, or combination thereof. Number to make cut 579 may correspond to a number of players that will make the cut based on scores and have player status remain uncut, while all other players who are set as uncut will be set to a player status of "cut". Number to make cut and play 580 may correspond to the number of players that will make the cut based on scores and will continue to play proceeding rounds. If this is set then the difference between number to make cut 579 set above and number to make cut and play 580 may include players whose player status will be set to "made cut but did not finish". All other players may be set to a player status of "cut". Max strokes from lead 581 may correspond to a number of players who make the cut being a number of par relative strokes from the lead. Target cut 582 may correspond to a number of players who make the cut that is closest to the value set, whether above or below the value. If the value of players is the same above and below, all players above the value may be considered "uncut" while all remaining players will have the player status of "cut". Include amateurs 583 may correspond to whether amateurs are to be included as part of the cut rules. If set, then a competing amateur is part of the cut rules. If not set, then the cut rule will not include the amateur. Include Amateurs 583 may be selected in addition to the other cut rule components. It will be appreciated that different and/or additional settings may be provided if selectable settings are included.

The round management panel 570 may also include a save round info element 585 giving a user an option to save or cancel changes made to the round states and/or the cut configuration. In one embodiment, when a cut rule definition is saved for a round, the cut rules may be used for live projected cut presentations in the STTM system. However, the round engine 501 may be configured to not set the player status as defined above until the user runs the cut rule option.

Figure 6G:
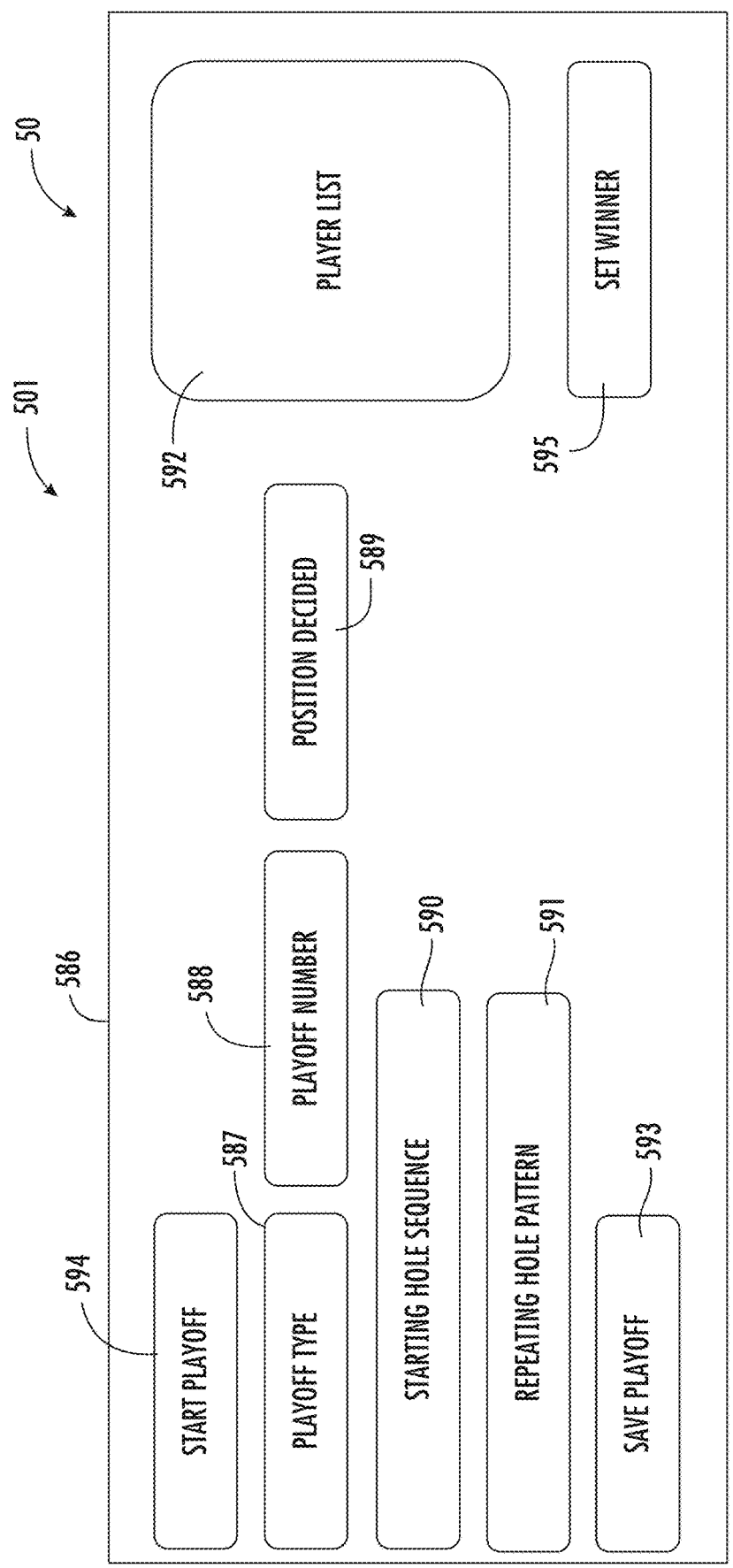
FIG. 6G illustrates a rounds engine interface for creating a playoff according to various embodiments described herein.

The round management panel 570 may also include one or more elements configured to interface a user with operations of the round engine 501 with respect to a playoff round creator. For example, the round management panel 570 includes a playoff creator component operable to provide access to the playoff round creator configured to create a playoff for a selected round. FIG. 6G illustrates an example user interface of the rounds engine 501 configured to interface a user with various operations of the playoff round creator 586.

The playoff round creator 586 may include various elements for defining a playoff round. For example, the playoff round creator 586 may include one or more definable elements selected from (a) playoff type 587, (b) playoff number 588, (c) position decided 589, (d) starting hole sequence 590, (e) repeating hole pattern 591, (f) player list 592, (g) save playoff 593, (h) start playoff 594, or (h) set winner 595.

The playoff creator 586 may be configured to include a plurality of selectable playoff types for selection via the playoff type element 587, such as one or more playoff types selected from "sudden death", "number of holes", and "number of holes/sudden death". "Sudden death" corresponds to a playoff format wherein, starting on a first playoff hole, players in the playoff play until a player has a better stroke score than the other players in the playoff. If more than two players are playing, the players having higher scores than the best score on the hole are eliminated. "Number of holes" corresponds to a playoff format wherein the playoff beings with all players in the playoff playing a number of holes, as defined in the starting hole sequence below. If a player has the best score, then that player wins and the playoff is over. If there is a tie after the defined number of holes, the playoff repeats the defined number of holes. This process continues until a player has a better score than the other players in the playoff. Multiple players in this playoff type can be eliminated if their score is not better than the best score. "Number of holes/sudden death" corresponds to a playoff format wherein the playoff beings with all players in the playoff playing a number of holes, as defined in the starting hole sequence below. If a player has the best score, then that player wins and the playoff is over. If there is a tie after the defined holes, then the playoff goes into sudden death as defined above.

The playoff number element 588 may set or be operable to set the number playoffs enabling a user to store multiple playoffs for a round. The positions decided element 589 be define or be operable to define what player positions will be played for in the playoff. For example, playoff positions decided may include position one for multiple players tied for first or position three for multiple players tied for third.

The starting hole sequence element 590 may define or be operable to define the holes that the playoff will be played first. For the "number of holes" playoff format, the starting hole sequence element 590 provides the defined holes for the format. The repeating hole pattern element 591 may define or be operable to define the repeating hole pattern for a "sudden death" playoff format in an instance where a winner has not been identified after the starting hole sequence holes are completed.

The save playoff element 593 may be operable to save the playoff settings. In some embodiments, the playoff settings may be saved without starting the playoff.

The start playoff element 594 may be operable to start the playoff. In one embodiment, the playoff may not be started in the round generator until play is completed in the selected round. In one example, the playoff may require validation that the previous round has completed. In another embodiment, the playoff may start before the previous round has been completed.

When play is completed in the selected round a player list 592 is imported into the playoff round creator 586 by analysis of scores according to the playoff number 588 and/or position decided 589 values set. The playoff round creator 586 may then be configured to apply the remaining playoff settings to create a new round according to the rules. The players qualified for the playoff round may be placed in groupings, which may include automatically, as described above, with a max four players per group; however, in some embodiments, manual group placement may be used. In some embodiments, the groupings for the playoff may be configured to be reviewable via the groupings presentation. In another or a further embodiment, the round state may automatically be set to "groupings official".

As introduced above, companion devices may be used by scorers to perform scoring functions. Scorers may include caddies, players, or others that are viewing play. Companion devices may execute or run an ST application. Companion devices may be equipped with wireless data communication transceivers configured to wirelessly transmit score data, which may include event data, to STTM system components. During play, each group may have an assigned companion device that the scorer uses to collect score data. The score data may be transmitted to the management system, which may be configured to handle data received from a plurality of companion devices during play. The companion devices may be configured with various wireless communication technologies as described above, which may include short range and/or long range communications with the devices of the STTM system. Companion devices may be configured to communicate with tracking modules to trigger and/or define data collection events that may be used to officially score player rounds. For example, companion devices may be carried by scorers accompanying groups of players or otherwise observing play. In various embodiments, companion devices may not be configured to communicate with tracking modules and companion devices may transmit location and/or location data to the location system, location elements, and/or other STTM system components. Companion devices may similarly transmit collected score data and/or event data to the location system, location elements, and/or other STTM system components.

In various embodiments, the companion device may be configured to wake-up the tracking module, initiate an event capture such as collection of event data, e.g., event capture, location/position determination or related data for processing and determination of the same by the companion device or another processing device. In one embodiment, the tracking module may be configured to receive instructions for event capture. The instructions may be transmitted by a companion device or management device. For example, a companion device and/or management device may be networked with or otherwise operable to provide instructions and/or receive instructions or data from multiple tracking modules. It is to be appreciated that management devices may include or provide data to the location system.

The scorer, utilizing the companion device, will typically accompany players whose score the scorer is tracking; however, in some embodiments, the scorer may remotely view the player via a live or delayed feed. When the scorer is also entering events setting time stamps for address or when a ball is hit, that may be paired with the location of the tracking module to provide a proxy for ball location following the previous shot or ball starting location for a current shot, the feed should be live or with a precisely known delay as to retain accuracy linking the location of the player relative to the location of the ball. In a remote viewing use case, the tracking module may be configured for communication with a management device or intermediate relay device via a suitable communication protocol, which may include short range communication protocols or long range communication protocols depending on the proximity of the management device or intermediate relay device, in order to provide its location data or calculation parameters. In configurations wherein location of the tracking module is subject to network-side calculation by another device, the other device may be in direct or indirect communication with the management device.

The ST application or companion device running and/or accessing the ST application—which may be local, remote, web-based, or cloud-based—may be utilized by a scorer to score one or more rounds of golf, typically a golf tournament event. The collected scoring data may be stored or transmitted by the companion device as discussed in more detail elsewhere herein. Reference to transmission of scoring data, which may include event data and/or location data, from the companion device and/or tracking module may include indirect or direct transmission to one or more the location system, management systems, and/or data platforms. For example, scoring data may be immediately or subsequently transmitted to the location system and/or one or more management systems for further data management, data review, data correction, score validation, data analysis, data storage, location identification, location calculation, zone identification, or applications configured to perform other STTM system operations. Data viewing platforms may refer to distribution to subscription services or platforms, such as those of downstream clients, business or consumer level platforms, private or public networks for fan consumption alone or together with other data, surface web platforms, or the like. In various embodiments, the scoring data may be distributed or made available for use or integration with a web-app, mobile app, or other application for public or private viewing, analysis, or archival storage.

The ST application may be configured for multiple selectable scoring level operations. For example, in a stroke level operation, the scorer may utilize the ST application to record strokes as they occur, without utilizing the location functions of the tracking module or utilization and/or incorporation of the tracking module as described herein.

When utilizing the tracking module to obtain location information, the ST application or other STTM system application or service may combine location data with stroke level data. In laser operator level scoring, the scorer may utilize the ST application to record strokes without additional location information or may also track player location via the tracking module for use in combination with laser location tracking, either via a manual laser pointing device such as those used by PGA Tour laser operators or via operation of an automated laser system that tracks or continuously tracks ball location throughout a round. The laser information may be output or translated into a coordinate grid system based on a survey or GPS or similar mapping of the course. In a combination use configuration, the location data obtained from the different techniques may be utilized for separate end uses, combined for analysis to achieve greater accuracy, or one location technique may be used as a backup or reference for another. In one embodiment, the companion device and ST application may be configured to allow a single scorer to collect stroke level data for all players in a single group.

In one embodiment, the companion device may be pre-loaded with or configured to access, via the ST application, specific event data such as one or more of (a) par values for a particular course, (b) course hole sequence (which may be associated with par values), (c) pre-defined from locations (which may include location indicators as well as from locations available for selection in a "from location" screen), (d) score level of event (which may be recordation of stroke only or utilization and/or incorporation of location tracking, e.g., GPS, UWB, BLE, Wi-Fi, cellular, or the like, range finder, laser operator, or combination thereof), (e) course name, (f) player group data for an assigned group, multiple groups, or all groups of players of an event such as player names in a group, player number in a group, player image, e.g., headshot, or (g) combination thereof. In one example, the ST application is executed, at least in part, e.g., in a cloud-based environment, and the above event data is automatically provided to the companion device, such as upon startup. If the event is conducted on multiple courses, course data for a particular or multiple courses may be provided or selectable by a scorer, e.g., via a user interface. Course name and number may be provided. The companion device may automatically be provided with round details, which may include group updates, group assignments, event changes, event notices, or other round details.

In one embodiment, using the ST application, the companion device may be configured to receive group location data. A scorer may interface with a user interface of the companion device to input group location data by any suitable method, such as input into a provided field, select from a list of displayed options, or the like. In one example, when the players in a group are on the tee box, the scorer inputs or selects "tee". In a further or another example, when the first caddie or player of the group arrives at the player's ball in the fairway, the scorer may input or select "fairway". In a further or another example, when the first caddie or player of the group arrives at player's ball around the green, the scorer may input or select "green".

The outputs of the data management system, device management system, rounds management system, groupings engine, and/or rounds engine may be transmitted to the ST application to conform the operation of the ST application to the outputs. For example, groupings output may be sent to the ST application to populate one or more groups to which a companion device is assigned.

As introduced above with respect to FIG. 3, in various embodiments group and/or player location may be tracked automatically via location tracking techniques and associated location networks, e.g., GPS, Wi-Fi, RFID, BLE, UWB, NFC, cellular, or the like. For example, the ST application may incorporate geo-fencing that triggers group location change at pre-defined boundaries. Geo-fencing may also be applied by other STTM system applications by tracking the location of the companion device and/or tracking module.

To track player hits, the companion device may present a selectable list of players from which the scorer may select. When tracking player hits, the companion device may be configured to present a selectable list of locations the player will be hitting the shot from. Example locations may include tee, fairway, green primary rough, bunker, sand, fringe, waste area, or native or natural area. In one configuration, "from location" is to be set at any time for a player and have it be "sticky" for the next shot. In other words, the scorer may set a player's "from location" as soon as that location is known and have that value persist until the scorer either changes the location or indicates the ball has been hit.

In one example, the scorer may also input when the player is addressing the ball. This may be entered as an event, e.g., upon the occurrence of, when the player first addresses the ball, or as a toggle. In a toggle case, the user interface of the companion device may include an "address" button that the scorer presses when the player is addressing the ball. The scorer may subsequently press a "shot hit" button or otherwise indicate that the ball has been hit. The "address" may be interpreted by the ST application as remaining down until the scorer presses or taps the "shot hit" button or other indicator at which time both addressing and hit events are sent or recorded. In another configuration, the scorer maintains contact with the "address" button until the ball is hit. When the scorer releases the "address" button, the release is interpreted as the ball being hit. In some embodiments, interaction with the address button is transmitted in real time before indication of the ball being hit. In other embodiments, the interactions may be transmitted together in real time following the shot being hit or may be stored locally for subsequent transmission. When collecting location data, such as location coordinate data, for shots utilizing the tracking module, the ST application may be configured to map the tracking module assigned to the player to the player's name. When the scorer indicates the ball is hit, the location of the tracking module is captured as described elsewhere herein and recorded. In some configurations, capturing the location of the tracking module may be triggered via interaction with an "address" button.

The companion device may also be configured to score various stroke types, such as drop, penalty, and provisional. For instance, the companion device may query the scorer or request entry of a shot type, if applicable. If the scorer selects "drop", the companion device may prompt the scorer to indicate if there was a penalty. If the scorer selects "penalty", the companion device may prompt the scorer to indicate if there was a drop. If the scorer selects "provisional", the companion device, one the next stroke, may prompt the scorer to indicate if the provisional is being used. If yes, and the shot location was "from the tee", a penalty stroke may automatically be added to the player's score. If not, and the shot location was "from the tee", the companion device may prompt the scorer to indicate if there was a drop and, if so, automatically add a penalty stroke to the player's score.

As introduced above, the user interface may present a "shot hit" button or other indicator that the scorer may interact with to indicate the ball has been hit. In one example, the "shot hit" indicator is a button that a scorer taps when the ball is hit. In another example, the "shot hit" indicator is a button the scorer presses and holds until the ball is hit wherein release of the button indicates when the ball is hit rather than "pressing". In a further example, multi-stage "shot hit" indicator or multiple indicators may be used to indicate at least two of address, location time stamp, and shot hit. For example, a two-stage "shot-hit" indicator may be used to indicate address and/or location in a first stage and location and/or shot hit in a second stage. In one configuration, the scorer may press a two-stage indicator button when the player is in the address position and release the indicator button when the ball is hit, wherein pressing sets the location time stamp and release is interpreted as the ball being hit.

In some embodiments, after the scorer indicates the ball has been hit, the scorer may be prompted to indicate if the ball is in the hole. The interface may present a button, swipe bar or field, or the like that the user may interact with to indicate if the ball is in the hole. In one example, the scorer is presented with a bi-directional swipe field whereby the scorer indicates "yes" or "no" by swiping the field in the direction of the desired indication. In one embodiment, an "in the hole" prompt may be displayed if the scorer fails to interact with the associated indicator within a predetermined number of seconds to indicate the ball is "in the hole", the ST application may take the lack of indication as a null response having the value that ball is not in the hole. In another configuration, the ST application may similarly be configured to take lack of indication as the ball being in the hole. The scorer may have the option of indicating null response or allowing the time to expire. For example, the scorer may swipe right for in the hole, left for not in the hole, or allow time to expire for not in the hole. After indicating the ball has been hit or that the ball is not in the hole, the user interface may automatically return to a group page from which the scorer may select the same or next player taking a shot to record the same. When the scorer indicates that all players are in the hole, the scorer may be prompted to indicate or have available a button or other indicator to proceed to the next hole. In another example, when the scorer indicates that all players are in the hole, the ST application may automatically proceed to the next hole.

As noted above, the scoring data may be collected in real time and stored locally or transmitted immediately, upon the occurrence of an event, such as collection of another piece of scoring data or when one or all players finish a hole or group of holes, periodically, at scheduled intervals, when the companion device is in proximity of a management device (which may include a network access point or node), upon collecting a predetermined amount of data, or based on remaining available data storage.

Figure 7B:
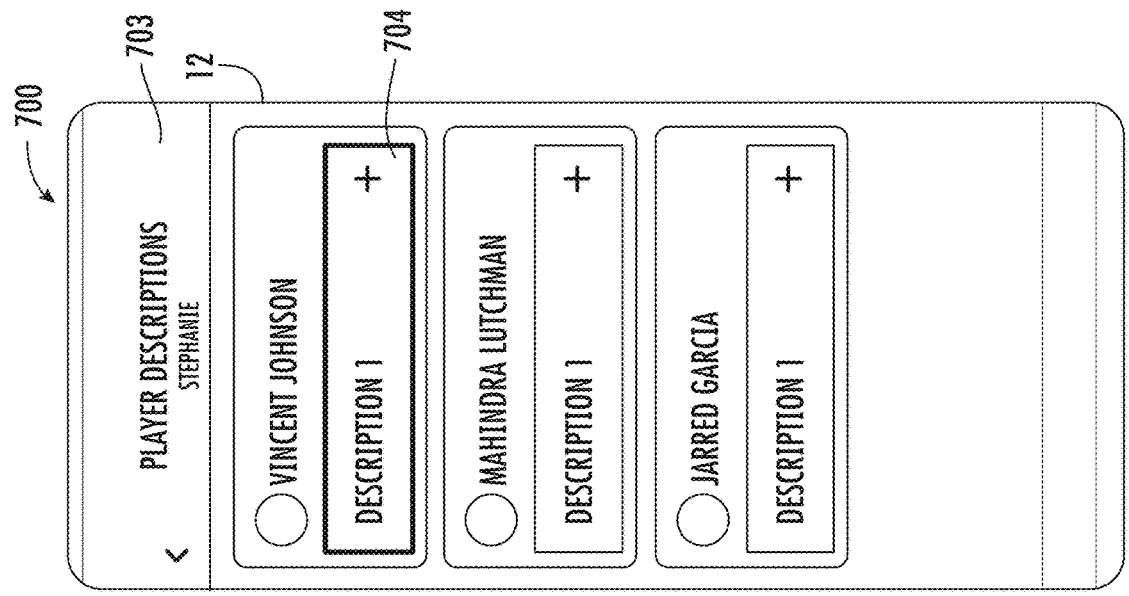
FIG. 7B illustrates player descriptions election screen of the ST application according to various embodiments described herein.
Figure 7A:
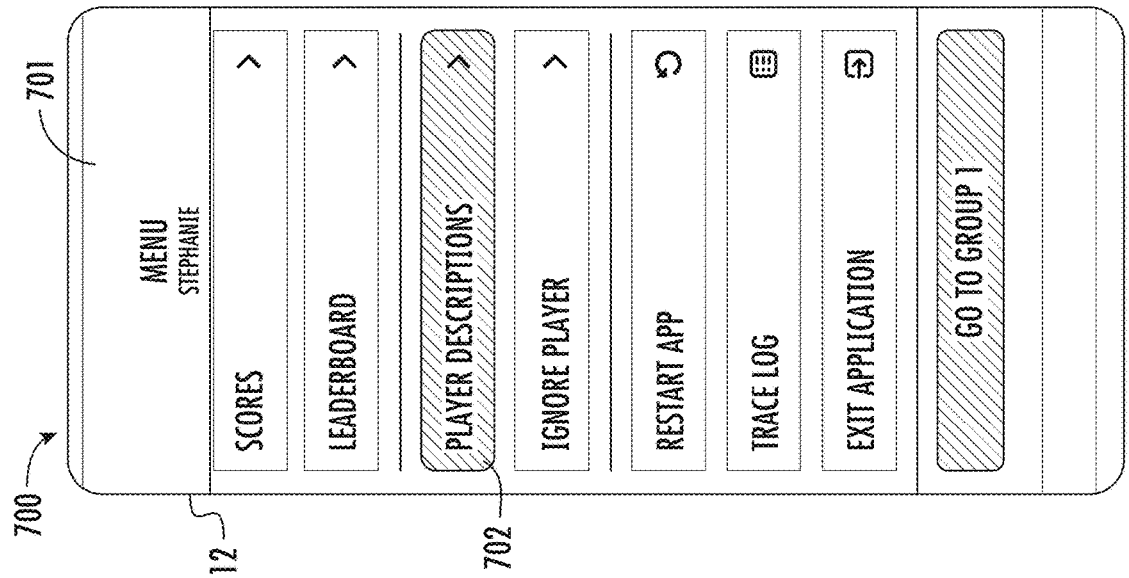
FIG. 7A illustrates a menu screen of the ST application according to various embodiments described herein.
Figure 7E:
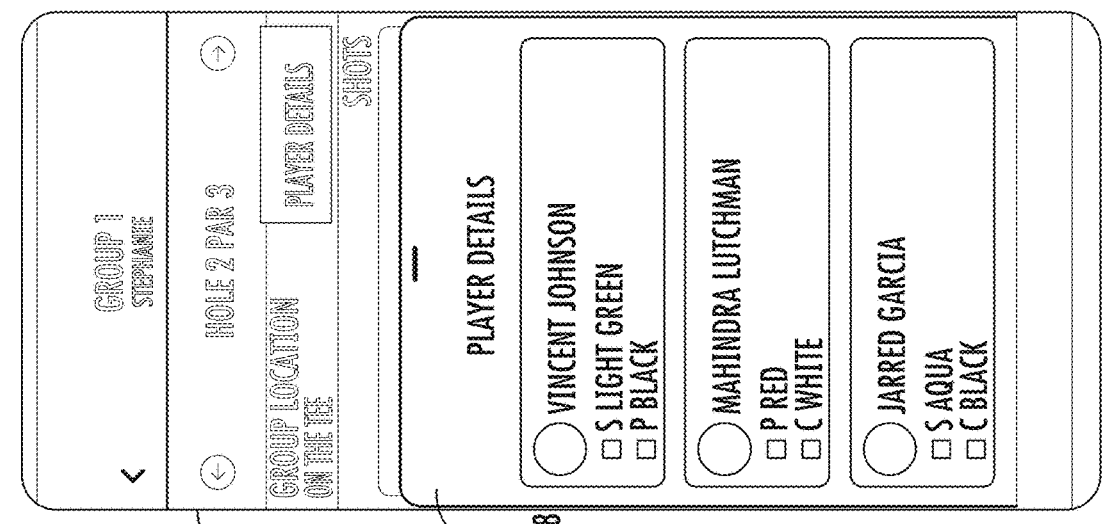
FIG. 7E illustrates a summary player details screen of the ST application according to various embodiments described herein.
Figure 7D:
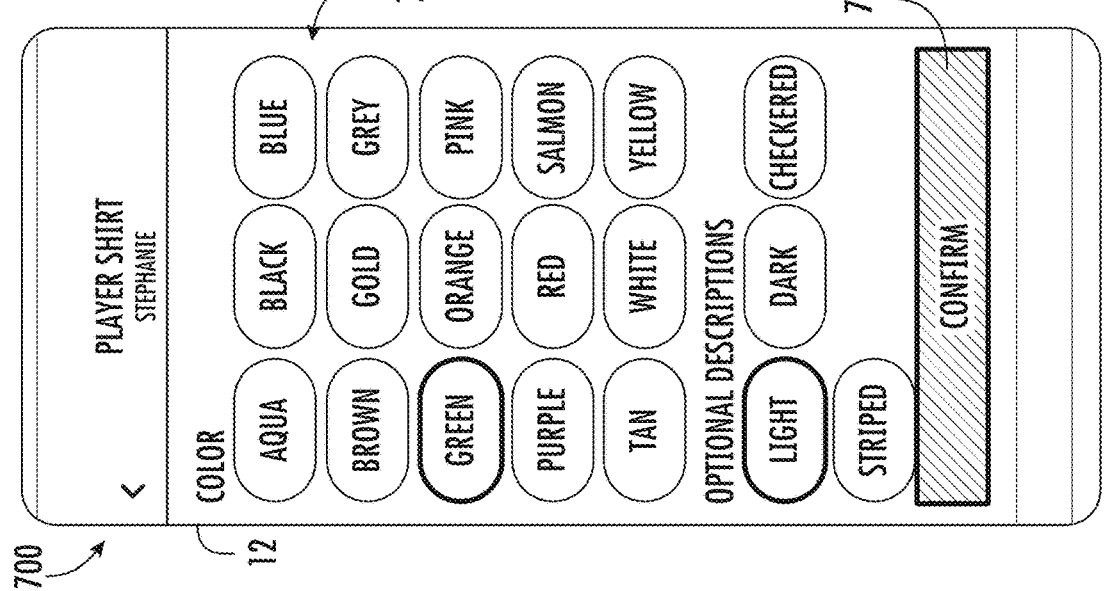
FIG. 7D illustrates a descriptive characteristics selection screen for a selected descriptive category of the ST application according to various embodiments described herein.
Figure 7C:
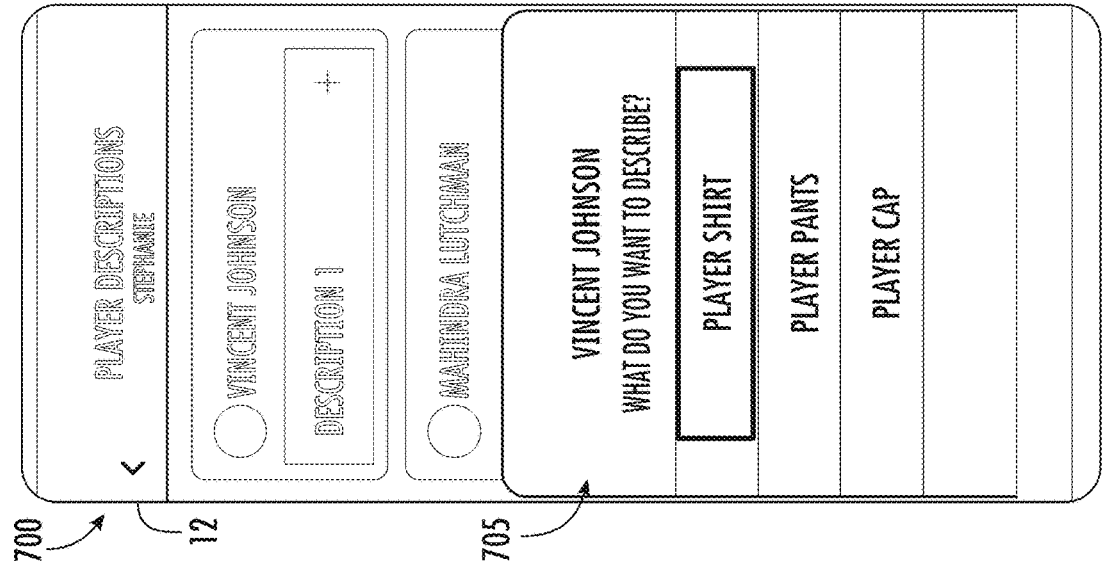
FIG. 7C illustrates a descriptive category selection screen of the ST application according to various embodiments described herein.
Figure 7H:
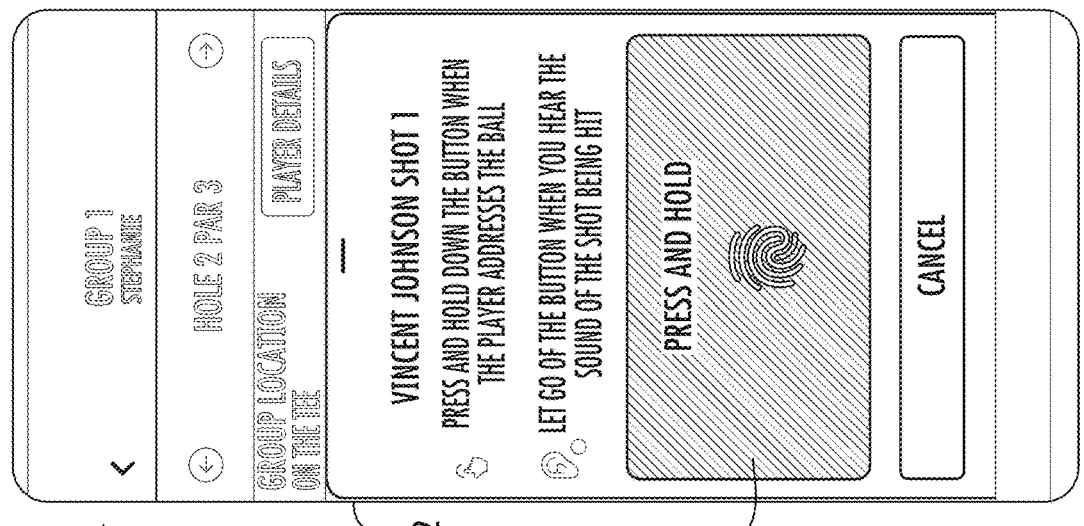
FIG. 7H illustrates an interface for indicating "shot hit" using the ST application according to various embodiments described herein.
Figure 7G:
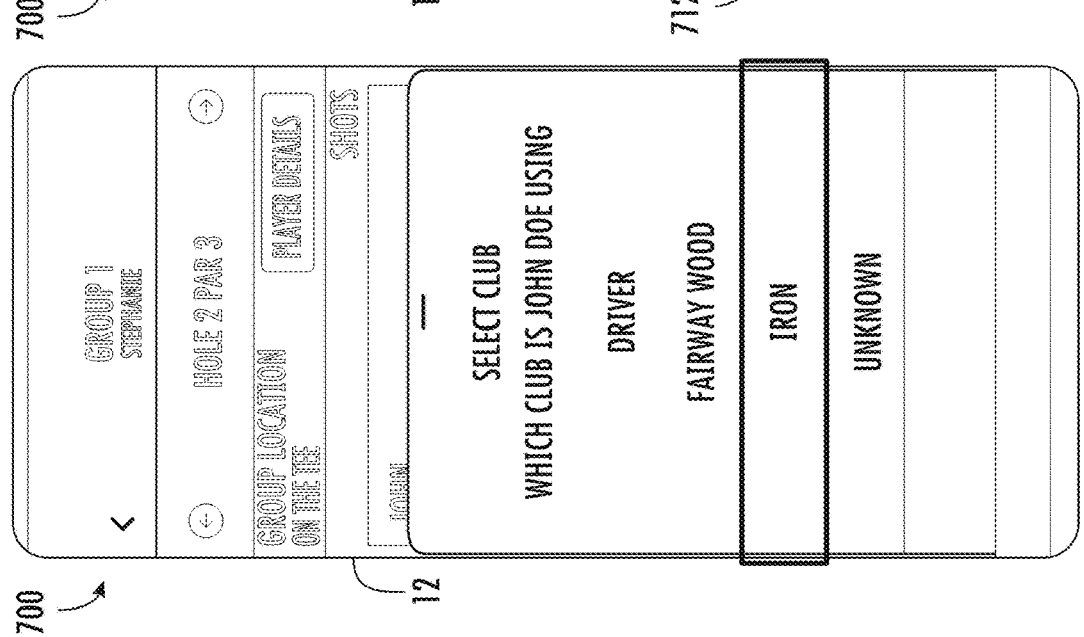
FIG. 7G illustrates selection of "iron" from the select club screen of the ST application according to various embodiments described herein.
Figure 7F:
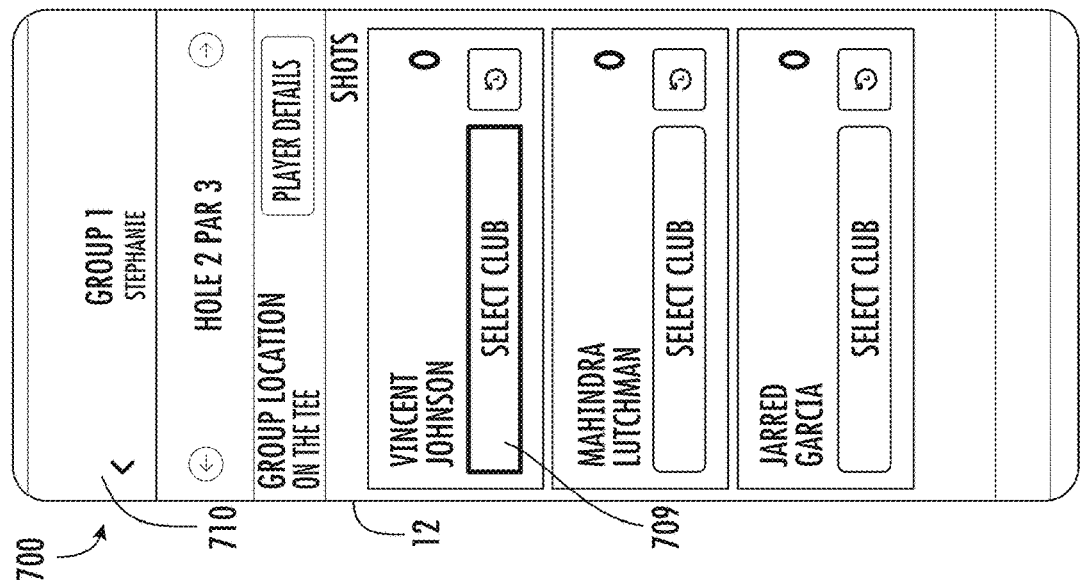
FIG. 7F illustrates a selection of the "select club" feature from the group screen of the ST application according to various embodiments described herein.
Figure 7K:
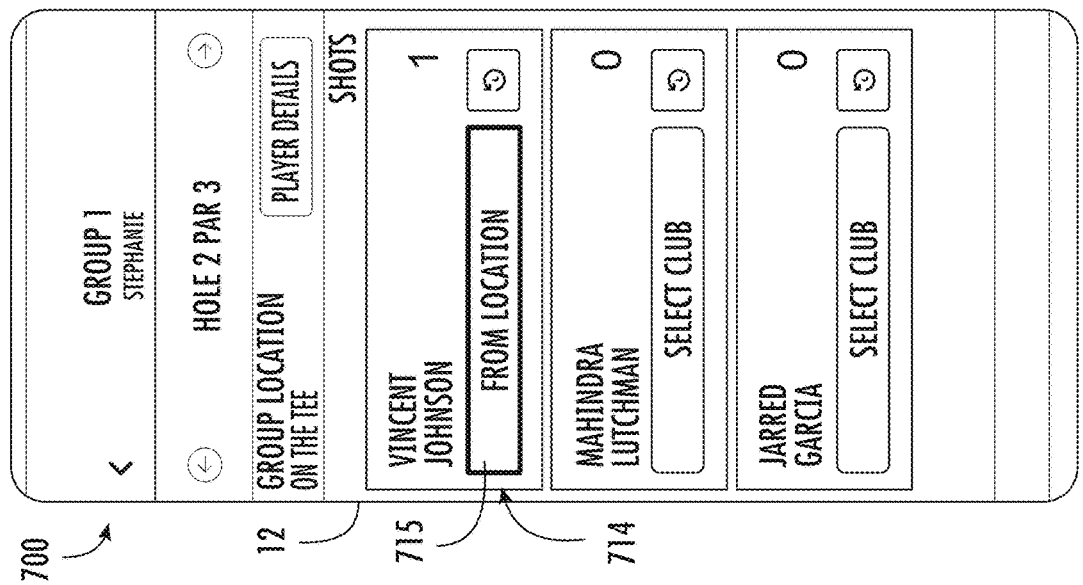
FIG. 7K illustrates a selection of the "from location" feature from the group screen of the ST application according to various embodiments described herein.
Figure 7J:
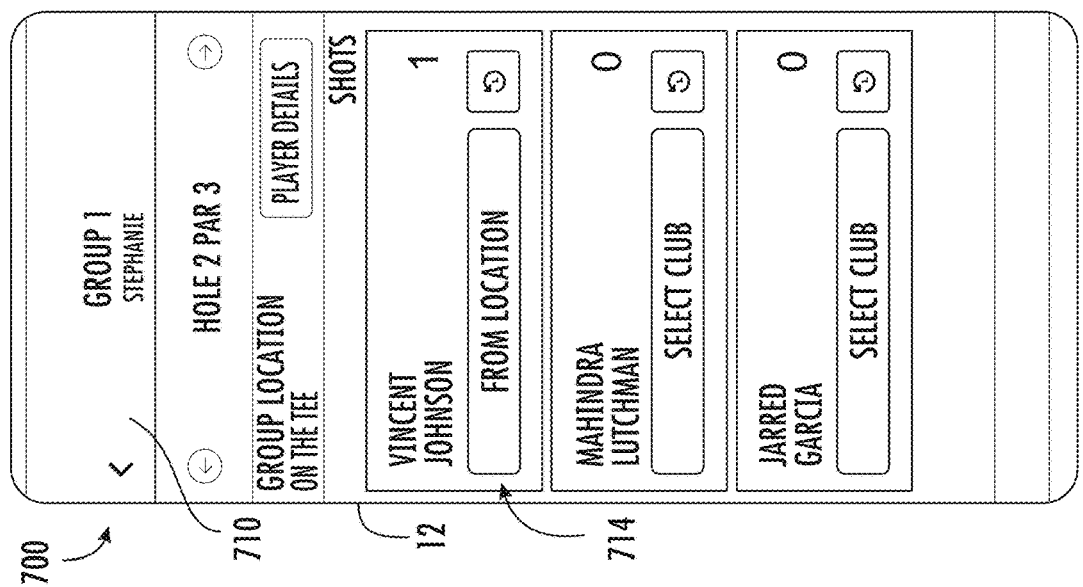
FIG. 7J illustrates a group screen displaying a recorded stroke after the score has indicated "shot hit" using the ST application according to various embodiments described herein.
Figure 7I:
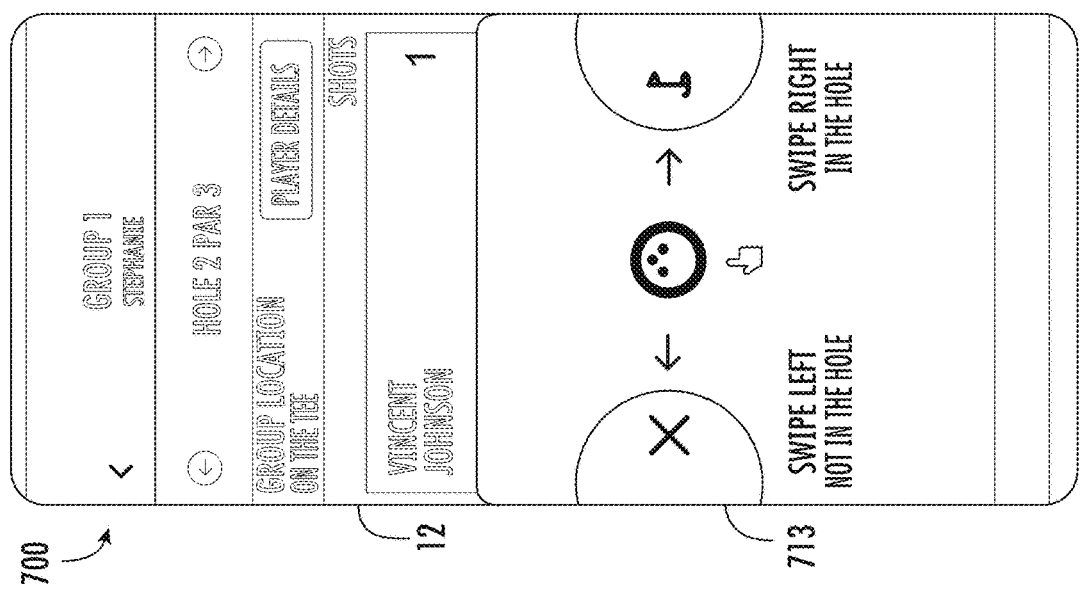
FIG. 7I illustrates an "in the hole" prompt of the ST application according to various embodiments described herein.
Figure 7N:
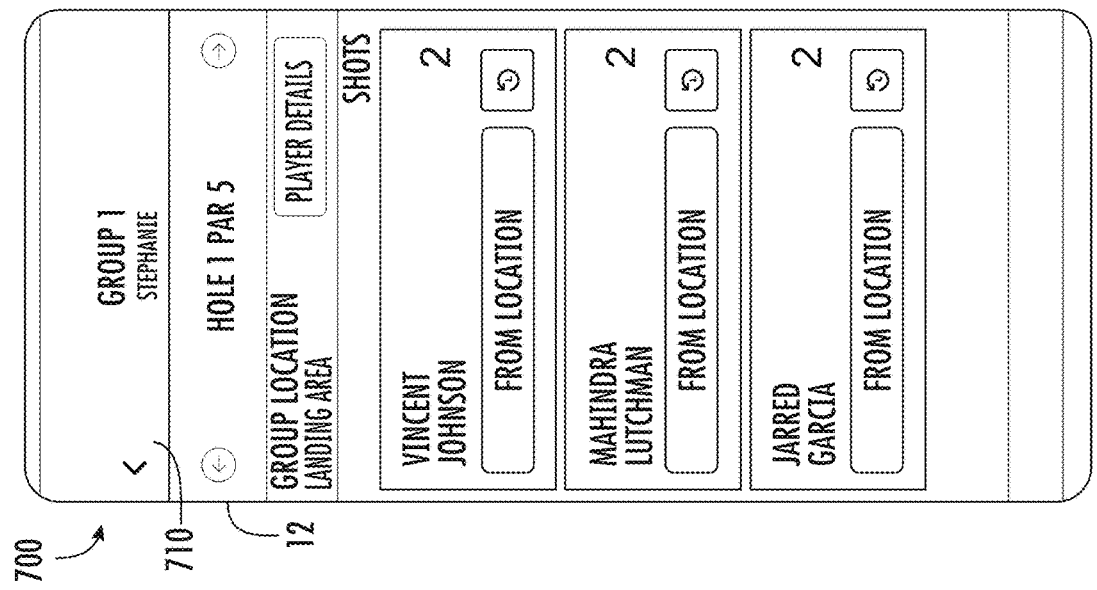
FIGS. 7M & 7N illustrate a group screen showing the transition of the "from location" from "fairway" back to "from location" after indicating "shot hit" using the ST application according to various embodiments described herein.
Figure 7M:
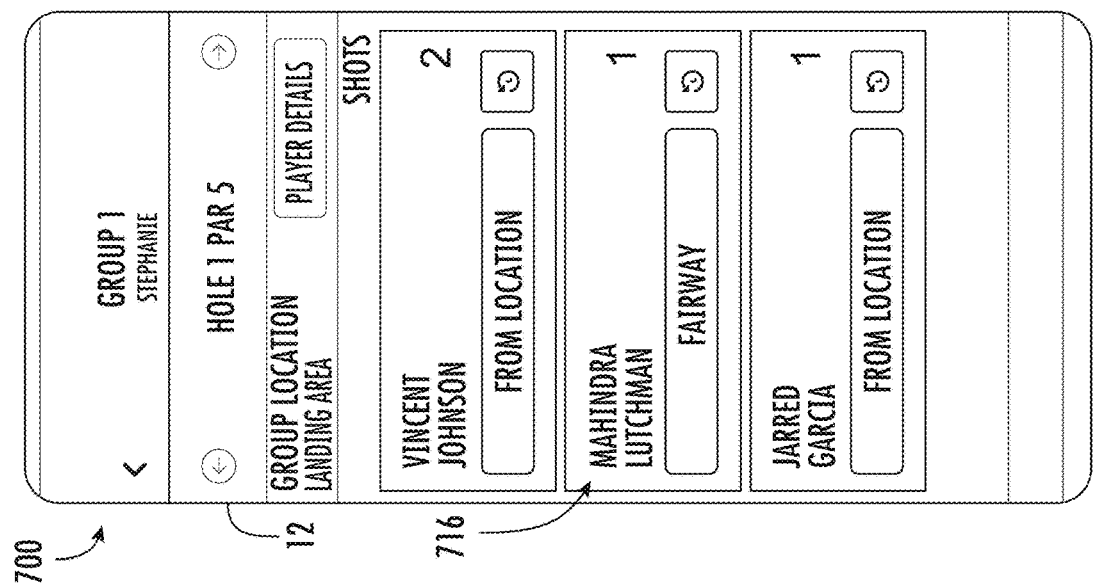
Figure 7L:
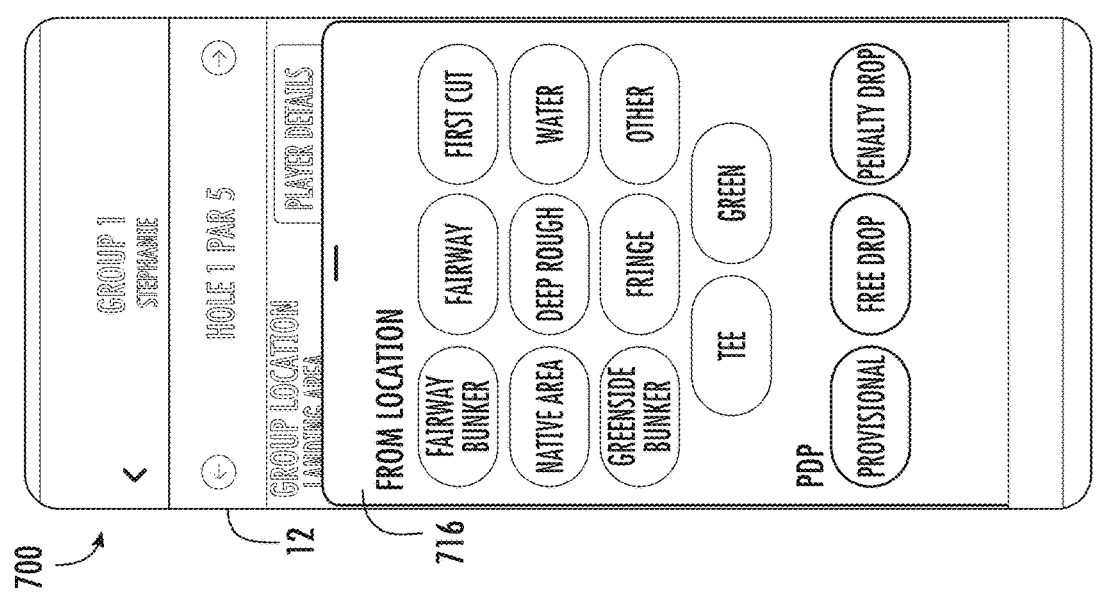
FIG. 7L illustrates a selection of available descriptive characteristics for selection in the "from location" screen of the ST application according to various embodiments described herein.
Figure 7T:
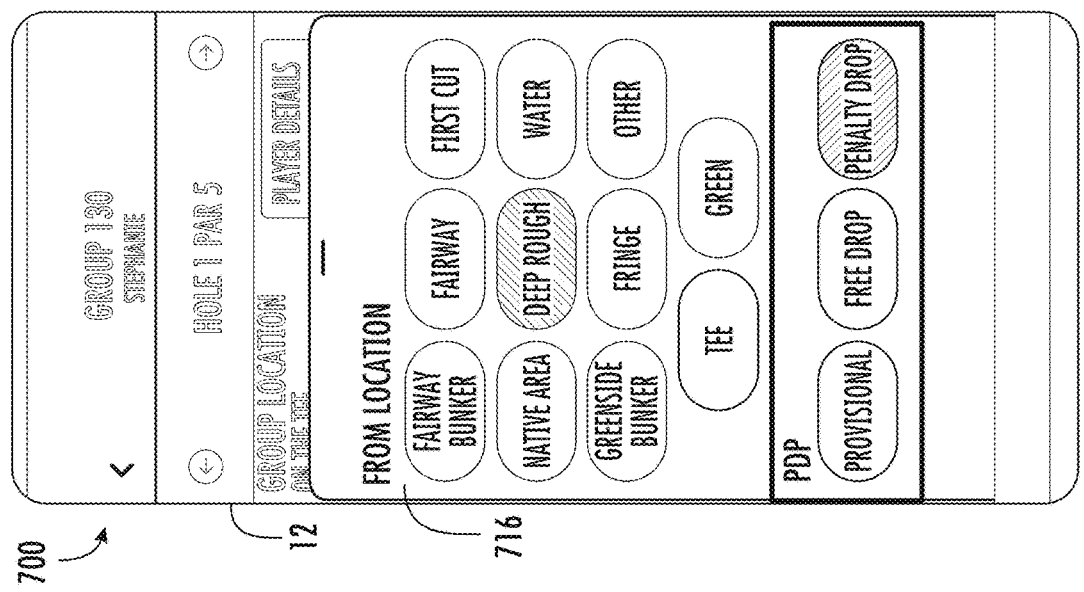
FIGS. 7T-7V illustrate user interfaces of the ST application depicting the work flow for recording a penalty drop and indicating that the dropped ball is in play according to various embodiments described herein.
Figure 7S:
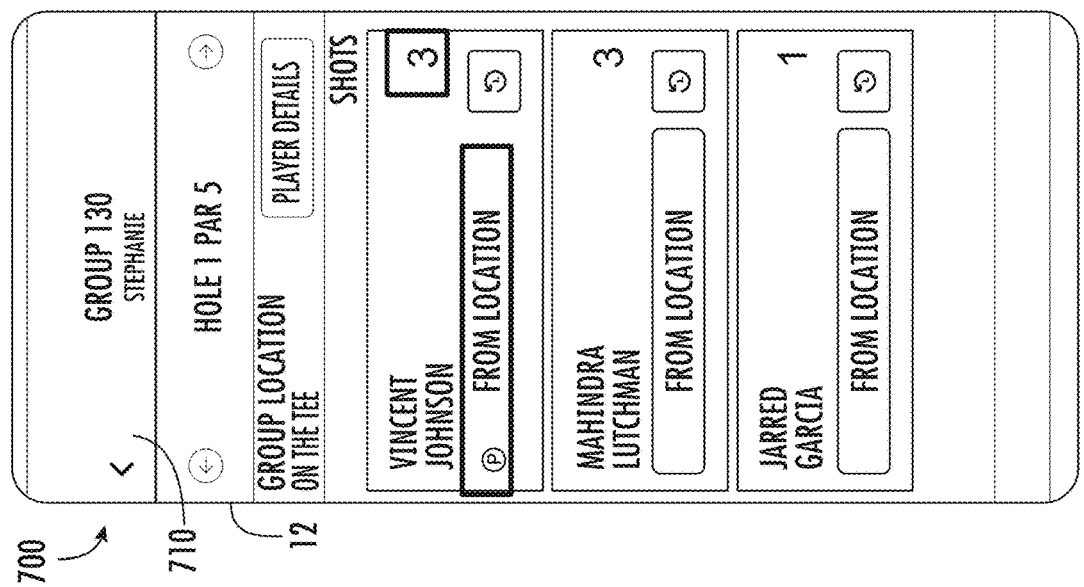
Figure 7R:
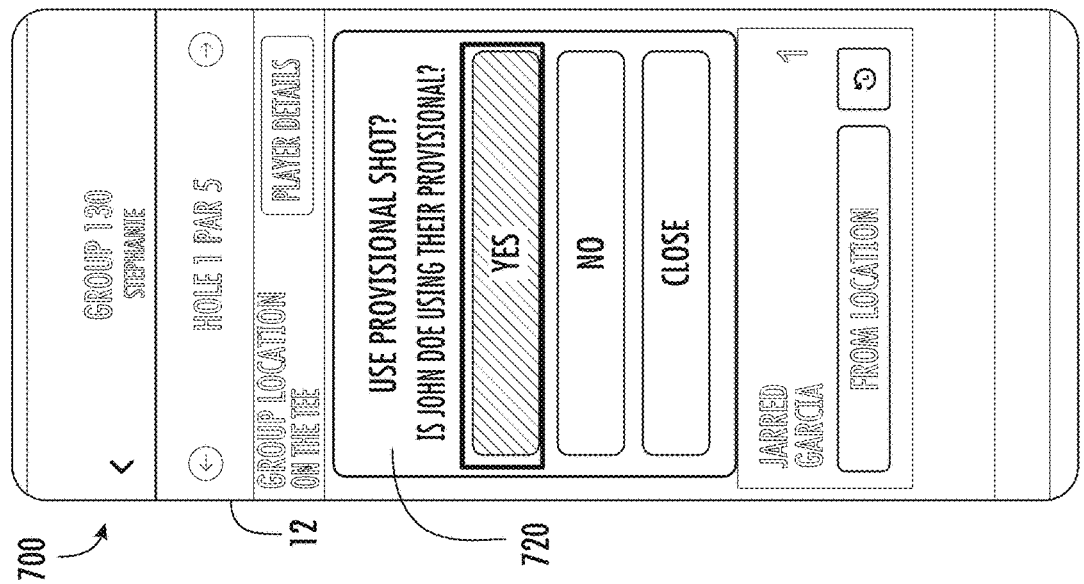
Figure 7V:
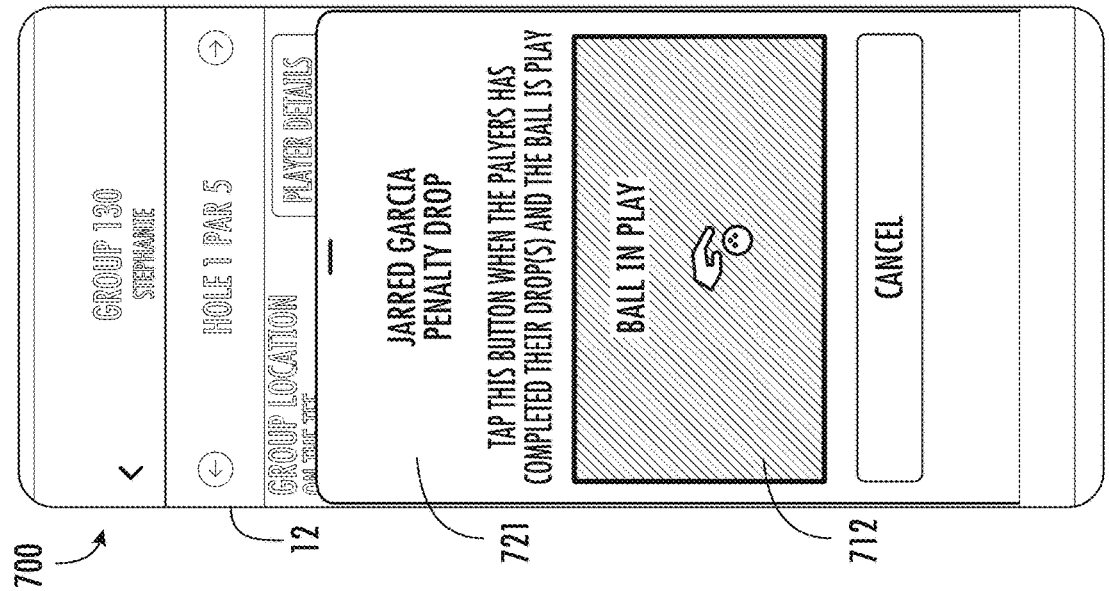
Figure 7U:
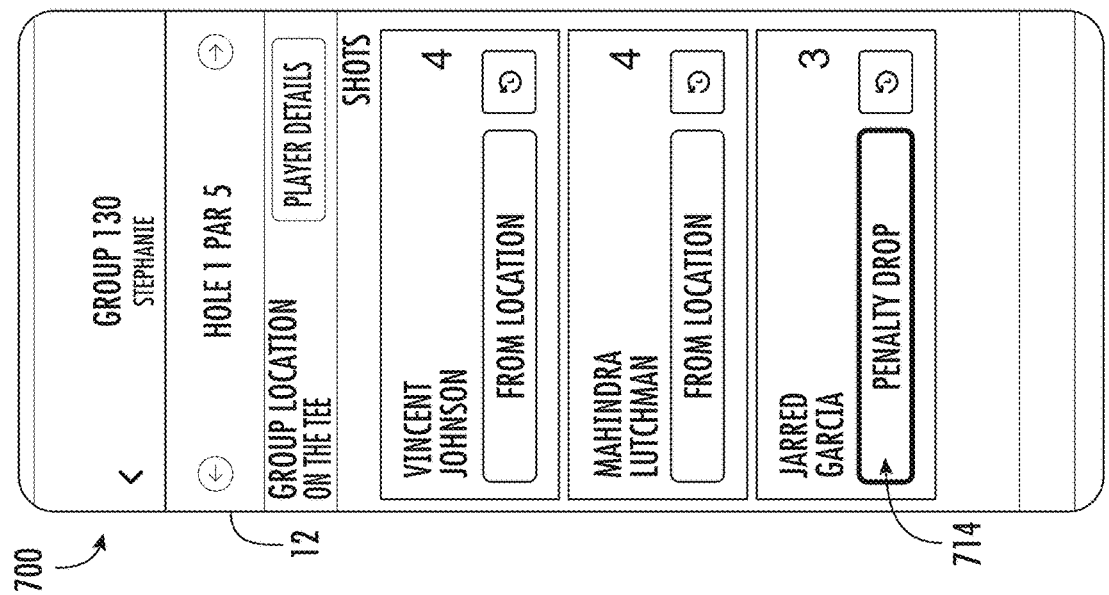

With reference to FIGS. 7A-7V illustrating various user interfaces of an ST application 700 according to various embodiments, a scorer may interface with the companion device to provide player descriptions. The interface may include various data input screens into which scorers may input data. The screens may include pre-defined selectable options, e.g., presented in listboxes, checkboxes, dropdown, input steppers, text entry fields, and the like. The ST application 700 may be pre-programmed to present one or more descriptive categories, each including a plurality of descriptive choices the scorer may select with respect to a selected or identified player. In some embodiments, the ST application 700 may include a field into which a scorer may enter text descriptions. The descriptions may be entered into one or more predefine descriptive categories selected by the scorer. In some configurations, the scorer may enter descriptive information or define a descriptive category by voice or text. Provision of fields for descriptive inputs may be in addition to or alternative to one or more predefined descriptive categories and/or plurality of options within such descriptive categories. In one embodiment, the ST application 700 may include or incorporate a photo application or otherwise be configured to input an image of a player. The ST application 700 may associate the image with the player. In a further or another embodiment, the ST application 700 is configured to analyze an image of a player and perform image analysis to extract descriptive attributes, such as color of an article of clothing worn by the player. In this or another example, the ST application 700 may display the picture of the player captured by the companion device or another device that transmits the picture, either directly or indirectly, to the companion device.

FIG. 7A depicts a user interface of the ST application 700 providing a menu 701 of selectable options according to one embodiment. Using the user interface, the scorer may select player descriptions button 702 from the menu 701. Upon selection of the player descriptions button 702, the user interface may display a player description screen 703 providing options for entering one or more player descriptions, e.g., as shown in FIG. 7B. In one configuration, the ST application 700 may pre-populate player names, such as those in a group the scorer is to track. In these or other configurations the ST application 700 may provide a field into which the scorer may manually enter a player name or a selectable list of groups or players may be provided from which the scorer may select to populate players to provide further description.

With reference again to FIG. 7B, the scorer may select a description button 704 to provide a description for the player named Vincent Johnson.

Selecting the description button may cause the ST application 700 to display one or more descriptive categories 705. In the example shown in FIG. 7C, the user interface displays a context box including a plurality of descriptive categories 705 for selection by the scorer. The scorer may select a descriptive category from the available options and be presented with a plurality of selectable descriptions. For example, in FIG. 7C, the scorer is presented with three descriptive categories 705 related to articles of clothing: "player shirt", "player pants", and "player cap". Selecting "player shirt" displays a plurality of descriptive characteristics 706 for a player shirt from which the scorer may select. The scorer may select a descriptive category that allows the players to be easily distinguished. For example, the scorer may select one or more articles of clothing worn by a player that are distinct from other players, to enable the scorer to distinguish which player is hitting a shot, even from a distance. Optimal descriptions may be provided for instances where there may be a need to provide additional clarity. In FIG. 7D, the descriptive characteristics relate to color. In this example, the descriptive characteristics also include additional characteristics, identified as optional in this example, from which the scorer may further define the player shirt. In the illustrated interface, the scorer has selected green for the color of the player shirt and light as an optional description. In some embodiments, such as that illustration in FIG. 7D, the user interface may request that the scorer confirm the selections with a confirm button 707. The selectable descriptive characteristics within the "Player pants" and/or "Player cap" may be similar or different than those within the "Player Shirt" descriptive category. While the descriptive categories relate to article of clothing in the illustrated embodiment, in some examples different descriptive categories or descriptive characteristics may be provided, which may be in addition to or alternative to articles of clothing, such as shoes, clubs, bag, brand of article, or the like.

In various embodiments, the ST application 700 may be configured to receive the descriptive input with respect to one or more descriptive categories. The number of descriptive categories to be defined by the scorer may be predetermined or specified in the ST application 700 or may be left up to the scorer. As shown in the summary player details view 708 depicted in FIG. 7E, the scorer has also entered "black" for a second descriptive category (player pants) for Vincent Johnson in the same manner as described above with respect to FIGS. 7B-7D. FIG. 7E also illustrates that the scorer has entered descriptive characteristics for two descriptive categories (Player pants, Player cap) for player Mahindra Lutchman and one descriptive category (Player Shirt) for player Jarred Garcia.

The ST application 700 may be equipped with scoring features that enable scorers to enter a plurality of details with respect to play, including club type, shot location, strokes, penalties, scoring, lie, and the like.

With reference to FIG. 7F, in some embodiments, the ST application 700 may be configured to generate a club selection feature on the user interface that a scorer may use to identify a club a player is currently using to set up for and/or to strike a golf ball during play. For example, on the group screen 710, the scorer may select a "select club" button 709 associated with a player. At the tee, for instance, the scorer may select the "select club" button 709 and be presented with a selection of clubs 711, as depicted in FIG. 7G. The selection of clubs may include any number of clubs, such as a player's full bag or an exhaustive list of potential clubs. In one embodiment, the selection of clubs is programmed to correspond to those likely to be used by the player at the particular location of the course. For example, using the location of the companion device and/or the tracking module carried by the player, the ST application 700 may determine a selection of clubs to present that corresponds to those that players use in that or similar situations and/or location on the course. In some embodiments, the location and/or situation may include zone determination, e.g., as described with respect to FIG. 3. For example, the location system may determine a location of the tracking module from location data provided to the location system wherein the location coordinates are applied to predefined coordinate ranges corresponding to defined zones to determine which zone the tracking module is currently located. In FIG. 7G, the scorer selects the "iron" button to indicate that the player is teeing off with an iron on the par 3, second hole. In one embodiment, the companion device 12 will not respond to selection of a player name without the scorer first inputting a club. The club selection may be made prior to the player arriving at the ball and/or before the player strikes the ball. While it is preferable that the scorer enters the club prior to the player striking the ball, in some embodiments, the club selection may be entered after the player strikes the ball.

The companion device 12 executing the ST application 700 may be configured to receive precise input of the player striking the ball. In some embodiments, a "shot hit" button 712 may be provided that a scorer may tap the moment a player strikes the ball. To display the "shot hit" button 712 the scorer may select the name of the player from the group screen 710 (FIG. 7F) for which they will indicate the "shot hit". With reference to FIG. 7H, the user interface includes a "shot hit" button 712 that the scorer will use to indicate a shot hit by pressing and holding their finger on the button prior to the ball being struck and then removing their finger the moment the ball is stuck to indicate the shot. For example, when the player is addressing the ball, ready to make a shot, the scorer presses and holds the "shot hit" button 712. Then, at the exact moment the player hits the shot, the scorer releases the button to indicate the shot has been hit. This action signals the system to record the location of the tracking module at that moment, which corresponds to the location of the player. This location information may be further associated with the club selection of the player. This data may be saved in the tracking module, companion device or associated memory, or may be transmitted to a management device at that time, when the scorer indicates that the player or group has completed the hole, periodically, at scheduled intervals, based on proximity of the tracking module or companion device to a management device, or based on storage capacity thereof. As described in more detail elsewhere herein, the location information may be input into an application configured to render graphical displays of digital stroke trails, detailing shots of a round.

In some embodiments, when the scorer releases the "shot hit" button 712, the scorer is to subsequently input whether the landing location of the ball relative to the golf course (e.g., fairway, rough, green, out-of-bounds, sand, hazard, area under repair, cart path, holed). The companion device 12 may be configured to automatically display location choices when the scorer releases the "shot hit" button 712 or the user interface may be provided with a location button the scorer may use to select from a plurality of locations or enter a location into a provided field. In the embodiment illustrated in FIG. 7I, upon release of the "shot hit" button 712 the user interface displays an "in the hole" prompt 713 whereby the scorer may indicate whether the ball is in the hole. As shown, the interface for the hole prompt 713 requires a direction swipe, left for no, right for yes. However, other interface buttons and methods may be used. After the scorer indicates whether the ball went in the hole, with reference to FIG. 7J, the user interface may return to the group screen 710 that now displays the recorded shot. The group screen 710 may also include a notification or indicator 714 that the player is currently in play on the hole. As shown, text below the player name has changed to "from location" indicating that the player is between shots on a hole. This indicator 714 may also operate as a button for triggering collection of location information of the tracking module when the player hits their next shot in a manner similar to that described with respect to the first shot.

With reference to FIGS. 7K & 7L, to record the player's second shot, the scorer may select the "From Location button" 715 in the indicator 714 from the group screen 710. This selection may cause a "From Location" screen 716 to be presented that includes a plurality of locations the scorer may select to indicate the location a player is hitting the shot. As shown, the scorer may select fairway bunker, fairway, first cut, native area, deep rough, water, greenside bunker, fringe, other, or green. As the player was not hitting their first shot, an option to select "tee" is not available in this embodiment. However, selection of "provisional" or "penalty drop" will cause "tee" to be available.

In some embodiments, the course may be mapped prior to or after play and the location of the recorded position of the tracking module, corresponding to the player and ball, may be overlayed on the map or the STTM system may otherwise determine the location relative to the golf course based on the recorded location relative to the map. The course may be mapped using any coordinate or grid system and may utilize survey techniques, global satellite constellation systems (GPS, GLONASS, BEIDOU, GALILEO & QZSS), LIDAR, or other suitable methodologies. The recorded location information may be collected or converted directly or indirectly to such coordinate or grid systems and/or utilizing overlay techniques.

After entering the from location on the "from location" screen 716, the user interface may display the group screen 710. As shown in FIGS. 7M & 7N, the location indicator 714 may change to that which the scorer selected, e.g., fairway. The scorer may then select the player name and to reveal the "shot hit" button whereby the scorer may indicate the moment the ball is hit by the player and then indicate if the ball went in the hole, e.g., in a manner similar to that described above.

Recording the time and location of each player's putt may be performed in a similar manner to that described above with respect to other shots. In various embodiments, when the ball reaches the green, and the scorer selects "green" from the "From Location" screen, the location indicator 714 on the group screen 710 may remain "green" until the ball is in the hole. In another embodiment, the user interface may allow a user to select another location after subsequent shots that do not go in the hole, e.g., that may roll off the green. FIG. 7O illustrates a group page 710 wherein the first two players have finished the hole and the third player is on the green. When it is the third player's turn to putt, the scorer may select the player's name, hold down the displayed "shot hit" button when the player is about to putt, and release when the player putts the ball to record the time and location of the putt via location of the tracking module as described with respect to FIG. 7H. The user interface may then display an "in the hole" prompt that the scorer may use to record whether the ball went in the hole, which may be similar to that described with respect to FIG. 7I. If the ball did not go in the hole, the scorer records the next putt as previously. If the ball does go in the hole, the ST application 700 records the player as finishing the hole and the scoring process starts again from the next tee box. In one example, after the scorer records all the players in the group getting the ball in the hole. The location indicator 714 on the group page 710 may automatically revert to "select club". In another example, the user interface may prompt the scorer to indicate the hole is finished and to move to the next hole.

FIGS. 7P-7V Illustrate PDP scoring according to various embodiments. In these examples, the scorer records the "from location" on the "from location" screen 716 where the next shot will be hit from, not where the original shot landed. However, in some embodiments, the ST application 700 or system may additionally provide an entry for landing location of a previous shot by entry into a text field, selection from a list of areas around the hole, such as "water" provided on the "from location" screen 716, or a map may be displayed and the scorer may indicate a landing location of the ball on the screen.

FIG. 7P illustrates recording a second shot off the tee recorded as a provisional. Using the "From Location" screen 716, the scorer selects "Provisional" and then the from location, which is "tee" in this example. The display may then return to the group screen 710 and "Provisional" may appear as the location indicator. The scorer may then select the player's name and score the shot as described above.

With reference to FIG. 7Q, once the provisional shot is recorded, "Provisional" may remain in the location indicator 714 position under the player's name until the scorer selects the player's name to record the location of the next shot. FIG. 7R illustrates a display prompt 720 presented after selecting the player's name, requesting the scorer to indicate if the player is or is not using the provisional shot. If the scorer indicates that the player is not using the provisional shot, scoring will proceed as normal. If the scorer indicates that the player is using the provisional shot, a penalty stroke is awarded, which may be indicated on the Group screen 710 as shown in FIG. 7S.

FIG. 7T illustrates recording a penalty drop. In some embodiments, when recording a penalty drop, the ST application 700 prompts the scorer to indicate the penalty drop ball is in play. For example, from the "From Location" screen 716, the scorer selects "Penalty Drop" and then the from location, which is "deep rough" in this example. The display may then return to the group screen 710 and "Penalty Drop" may appear as the location indicator 714 under the player's name, FIG. 7U. The scorer may then select the player's name before the player drops the ball. For example, with reference to FIG. 7V, the scorer is presented with a penalty drop prompt 721 providing a "ball in play" button 722 that the scorer uses to indicate when the player drops or re-tees the ball. This assesses a penalty stroke and further shot location and time may continue to be recorded as described above.

A free drop may be recorded in a manner similar to that of recording a penalty drop, except "penalty drop" is selected from the "From Location" screen and a penalty is not accessed.

With reference to FIGS. 8A-8G, in various embodiments, the STTM system includes a data management system 50 configured to review and edit scoring data recorded by the score tracking system. The data management system 50 may provide data managers data access to management operations locally, remotely, and/or from any location via management devices.

Figure 8A:
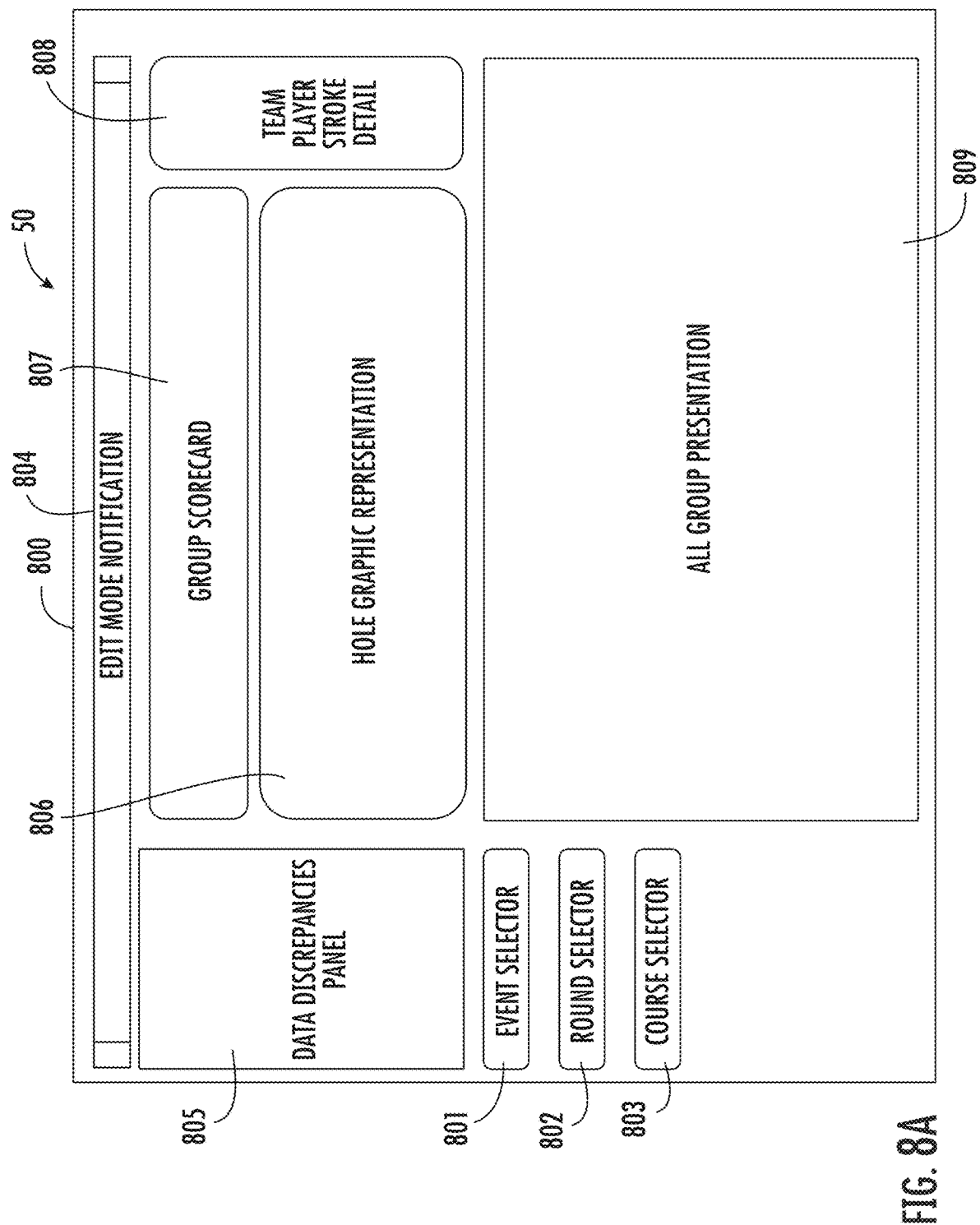
FIG. 8A illustrates a presentation block user interface of a data management tool of data management system including tool components in presentation blocks according to various embodiments described herein.

The data management system 50 may include a data management tool 800 including one or more elements, e.g., interface elements, display elements, or associated operational elements, selected from an (a) event selector 801, (b) a round selector 802, (c) a course selector 803, (d) an edit mode notification 804, (e) a data discrepancy panel 805, (f) hole graphic representation 806, (g) a group scorecard 807, (h) a team player stroke detail 808, or (i) an all group presentation 809. FIG. 8A depicts an example user interface of the data management tool 800 for use with the data management system 50 providing the elements listed above in presentation blocks. In various embodiments, the page layout of the elements is configured to enable connections to be created between blocks and/or data elements therein. For example, when selecting an element in one block, connections may be established for other blocks. In a further example, the other blocks in which connections are established may be updated with an appropriate presentation, as described in more detail below. However, it will be appreciated that the elements and the associated components and data thereof operable to provide the operations of the data management system 50 may be provided in many formats and the present disclosure is not limited to the particular arrangements and combination of elements and user interface components depicted herein.

The event selector 801 may include a selectable listing of one or more events available for viewing and management of the associated data. In one example, the event selector 801 comprises a drop down list of all events that are available for viewing. Selection of an event may cause the presentation blocks to present or be operable to present the associated data for that event.

The round selector 802 may include a selectable listing of one or more rounds of an event available for viewing and management of the associated data. In one example, the round selector 802 comprises a drop down list of all available rounds for the event selected with respect to the event selector component. In a further example, selection of a round may cause the presentation blocks to present or be operable to present the data for the round of the event selected. In a further example, the round selector 802 and/or presentation blocks may default to the most recent round in progress. If no rounds are in progress, the default may be the earliest round having a "grouping official" round status, as described in more detail with respect to the round management system 60.

The course selector 803 may include a selectable listing of one or more courses for the event and round selected that are available for viewing and management of the associated data. In one example, the course selector 803 comprises a drop down list of all courses that are available for the selected event and round. Selection of a course may cause the presentation blocks to present or be operable to present the data for the course of the event and round selected. In one example, a default course may be set to a host course when multiple courses are being played for an event and round. In another or a further example, the course selector 803 may include a selectable option to select all courses. In one such example, selection of all courses cause presentation of the data for all courses in the presentation blocks in one combined presentation.

The edit mode notification 804 may include a display element comprising a notification that is presented when an edit has been made in any of the presentation blocks that scoring data has been edited. The edit mode notification 804 may be selectively programmable to provide notifications with respect to any desired edit. For example, in some embodiments, the notification is not displayed when changes are made only to play management blocks, described below. In one example, notifications are output when data element values are above or below a predefined threshold or within or outside a predefined range. The notification may be interactive such that a user may interact with the notification, such as select all or a portion of the notification, to accept the changes. In one embodiment, a separate interface element is provided that a user may interact with to accept the changes. In some configurations, the notification may display or be operable to present a summary or identification of the changes causing the notification.

In various embodiments, when a user changes or enters data into the presentation blocks, the data management tool 800 may be automatically placed in an edit mode. While in edit mode, the data may not be transmitted to downstream clients or data viewing platforms thereof. However, when a user accepts all the current edits, edit mode may be turned off and the data, including any changes made while in edit mode may be sent to downstream clients, including data viewing platforms thereof.

The hole graphic representation 806 may be provided in a 2D graphic (although more advanced graphics such as 3D may also be used). The hole graphic representation 806 may include various navigation functionalities. For example, the hole graphic representation 806 may include one or more of a zoom functionality allowing a user to selectively zoom in and out of the graphic; a graphic rotation functionality allowing a user to selectively rotate the graphics on a horizontal axis, vertical axis, and/or other axes; and/or a variable centering functionality allowing a user to move the center of the graphic in the presentation panel. In one example of a zoom functionality, a quick zoom may be provided to zoom into the green, zoom out to display an entire hole, and/or zoom out to display the entire course. In one example, the graphic is oriented in a method that allows maximum viewing from tee to green, such as an overhead view, tee view, or green view. The hole graphic representation may include various displayed distances with respect to the hole. For example, one or both of a scorecard yardage distance or an actual yardage distance between the tees and pins as set for the round may be displayed. In one configuration, hole setup information may be displayed on the hole graphic. For example, current hole information may be displayed for each round, such as one or more of tee locations, pin locations, and/or center of fairway points for the holes of the course. In one embodiment, the graphic presentation may be configured to show all players of a group at one time upon request from the user, e.g., via interaction with a "show all group players" element.

Stroke or ball position coordinates, such as those collected via the operations of the tracking module and companion device, may be plotted on the hole graphic representation 806. For example, the hole graphic representation 806 may include plots of ball positions relative to the hole. For example, ball position may be plotted in the graphic presentation to show the ending position of a team player's stroke. For a consecutive stroke containing location coordinates, a line may be displayed between the plotted points to depict a stroke trail. As the starting point is the tee and the ending point is the pin, the data management tool 800 may generate lines from these points to strokes with the coordinates or ending positions of the player's strokes on the hole. In one example, distance of plotted ball positions from the tee, distance from the last stroke, and/or distance to the pin may be displayed or provided as a defined selectable format option.

Additional functionalities may be provided for managing coordinates for a stroke, such as enabling a user to enter a location for a stroke received; move an existing location assigned to a stroke; create a stroke along with a location for the stroke; displaying all GPS or other location coordinates collected for a team player, and/or delete a stroke along with its location. In an example of the above functionalities, where breadcrumbs are present, the hole graphic representation 806 may be configured to enable a user to "lock" a stroke to a breadcrumb.

In one embodiment, the functionalities include displaying all GPS and/or other coordinates collected for a team player including ones not associated with a stroke, e.g., breadcrumbs. With the presentation of all coordinates, the hole graphic representation 806 may be configured to associate one location to a stroke of a player.

In various embodiments, selecting a group from the all group presentation 809 may cause the group scorecard 807 to populate with the data associated with the group. In one example, the hole graphic representation 806 may similarly populate with shot and/or ball position data related to the group. In one example, selecting specific holes of a group via the group scorecard 807 causes the hole graphic representation 806 to zoom to the selected hole and display plotted ball positions and shot trails of the team players in the group.

Figure 8B:
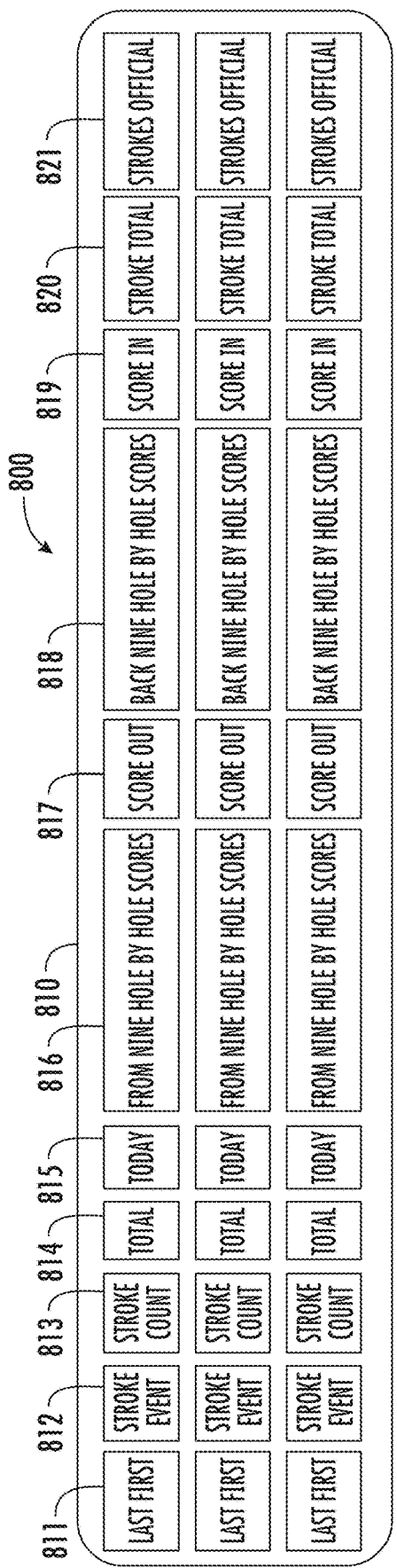
FIG. 8B illustrates a group scorecard interface of the data management tool according to various embodiments described herein.

FIG. 8B illustrates an example interface 810 of the group scorecard 807 that may be presented by or accessible via interaction with the group scorecard data management tool 800, all or a portion of which may be available in the respective presentation block view. Various elements of the group scorecard 807 may be displayed and/or editable via operation and functionalities of the group scorecard 807, as described in more detail below with respect to the respective elements. The group scorecard 807 may include various data elements such as one or more of (a) team player name 811, (b) stroke event 812, (c) stroke count 813, (d) total 814, (e) total 815, (f) today 816, (g) front nine hole by hole scores 817, (h) score out 818, (i) back nine hole by hole scores 819, (j) score in 820, (k) stroke total, or (l) strokes official 821.

Team player name 811 may list the team players in a group. For example, the players may be presented by last name, first name. In one configuration, team player name 811 may not be edited via the group scorecard component of the data management tool 800.

Stroke event 812 may present the last stroke event that has been received from the score tracking system or, in one example, the validation system if flagged. Various stroke events may be presented, such as club selection, addressing the ball, shot hit, provisional, preliminary, final, and in the hole. In one configuration, stroke event 812 may not be edited via the group scorecard component of the data management tool 800.

Stroke count 813 may be a representation of strokes currently recorded for the hole that the player is on. If a team player has not started their round, the stroke count may default to show the starting tee time. In one configuration, stroke count 813 may not be edited via the group scorecard component of the data management tool 800.

Total 814 may present the total par relative score for the event. In one configuration, total 814 may not be directly edited via the group scorecard component of the data management tool 800.

Today 815 may present the par relative score for the round. In one configuration, today 815 may not be edited via the group scorecard component of the data management tool.

Front nine hole by hole scores 816 may present a list of scores by hole for the first nine holes. In some embodiments, a column or row header, dependent on configuration, may be provided to show the hole numbers for improved clarity. In one configuration, front nine hole by hole score 816 may be edited via the group scorecard component of the management tool 800 by entering an integer or removing a score from a hole score field.

Score out 817 may present a stroke total for the scores entered on the front nine. In one configuration, score out 817 may not be directly edited via the group scorecard component of the data management tool 800.

Back nine hole by hole scores 818 may present a list of scores by hole for the back nine holes. In some embodiments, a column or row header, dependent on configuration, may be provided to show the hole numbers for improved clarity. In one configuration, back nine hole by hole score 818 may be configured to be edited via the group scorecard component of the management tool 800 by entering an integer or removing a score from a hole score field.

Score in 819 may present a stroke total for the scores entered on the back nine. In one configuration, score in 819 may not be directly edited via the group scorecard component of the data management tool 800.

Stroke total 820 may present a stroke total for the round. In one example, the stroke total 820 may be displayed only when score out 817 and score in 819 have been populated with data. In one configuration, score total 820 may not be directly edited via the group scorecard component of the data management tool 800.

Strokes official 821 may present the strokes received for the team player on all holes that are flagged as official. In one configuration, this element can be edited by the user to signify that no more edits will be conducted for any strokes on any holes for the player.

Figure 8C:
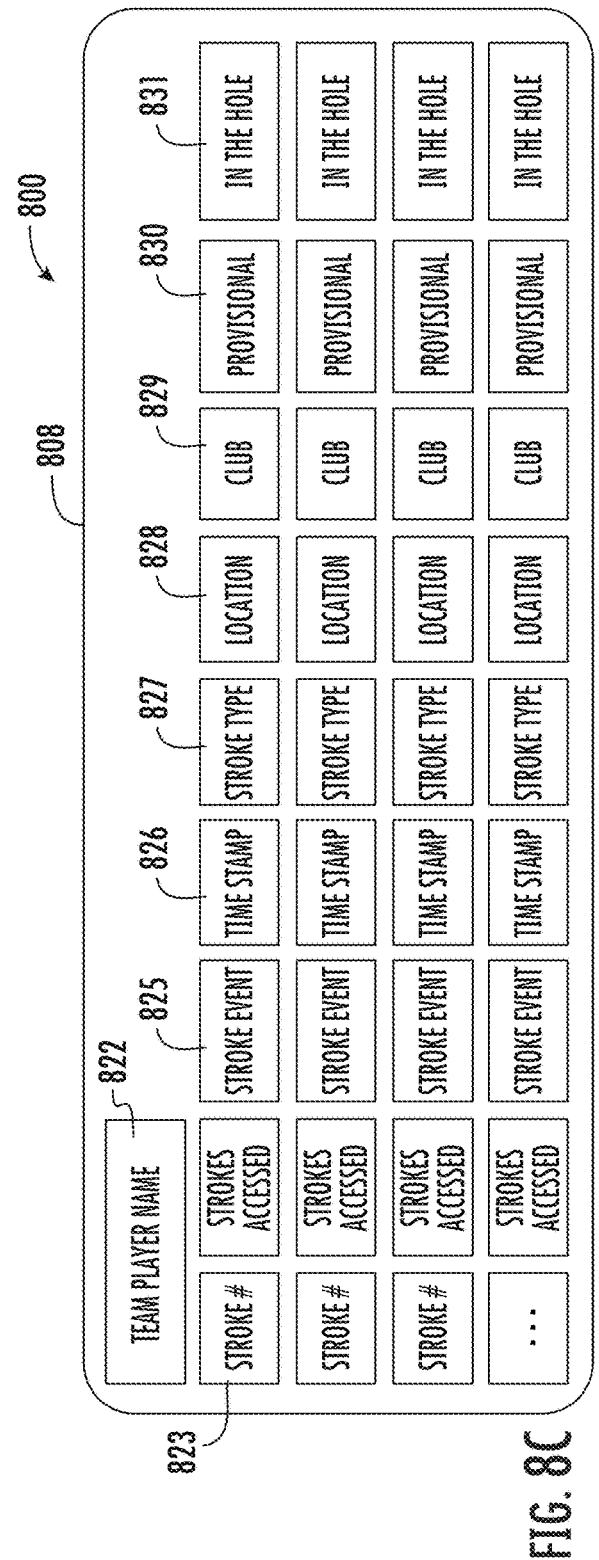
FIG. 8C illustrates a team player stroke detail component of the data management tool according to various embodiments described herein.

FIG. 8C illustrates an example interface of the team player stroke detail 808 of the data management tool 800 configured to interface a user with the operations thereof. The interface may be presented in or accessible via interaction with the team player stroke detail 808 element of the respective presentation block view of FIG. 8A. Elements of the team player stroke detail 808 may be displayed. In operation of the team player stroke detail 808 a user may be enabled to edit various elements. In some embodiments, selecting a player in the group scorecard 807 or all group presentation 809 populates the interface of the team player stroke detail 808 with the respective data elements of the selected group.

When selecting a team player for presentation and/or stroke editing with the team player stroke detail 808, the hole graphic representation 806 may default to display a course view, a current hole, next hole, first hole completed, last hole completed, or full course view. In one embodiment, selection of a particular hole from the group scorecard 807, e.g., by selecting a hole from the front nine hole by hole 816 or front nine hole by hole 818 (FIG. 8B) data element views, causes the team player stroke detail 808 to present the stroke detail for the player for the particular hole. Thus, the data management tool 800 may be configured to enable a user to selectively view strokes by hole with the group scorecard 807 or stroke detail for a hole via interaction with the team player stroke detail 808.

In one example, viewing stroke detail for a team player with respect to a hole via the team player stroke detail 808 causes the hole graphic representation 806 to present a representation of the hole. The graphic may be oriented from left to right with the tee location being on the left side and the green on the right side. As noted above, functionalities such as zooming into and out of the graphic may be provided. In one example, a quick zoom operator may be provided to allow a user to quickly zoom to various areas of the hole, such as tee box, fairway, hazards, green area, or to a particular selected shot. The functionalities may also include moving the graphic to change the longitude and latitude of the view within a static viewing area, e.g., within any zoom value. Yardage distances may also be displayed with respect to the set positions of the tees and pins. Other yardages may be selectably presented in or relative to the graphic as described above.

The data elements of the team player stroke detail 808 may include various informationals and scoring data elements such as one or more of (a) team player name 822, (b) stroke number 823, (c) strokes accessed 824, (d) stroke event 825, (e) time stamp 826, (f) stroke type 827, (g) location 828, (h) club 829, (i) provisional 830, or (j) in the hole 831. The data elements may correspond to those collected by the ST application via operation of the companion device described herein. Such data elements may be received by the data management system 50 for viewing and/or editing.

Team player name 822 may include a list of all team players in a group. For example, selecting a group from the all group presentation 809 or the group scorecard 807 may cause the team player name 822 to populate with the team players of the group. The presentation may display data with respect to a single player, which may be defaulted to any player, such as the last player with a recorded stroke event or to have completed a hole, the first player in the predefined order of teeing off, or the like. In one configuration, the team player name 822 may not be edited via the team player stroke detail 808.

Stroke number 823 may correspond to a stroke received. In one configuration, the stroke number 823 is editable via the team player stroke detail 808, allowing a user to enter an integer.

Strokes accessed 824 may correspond to a number of strokes that will count towards the hole score for a team player on that stroke received. In one configuration, the stroke accessed 824 is editable via the team player stroke detail 808, e.g., allowing a user to enter an integer.

In one embodiment, a user may create a stroke before or after any other stroke. If a stroke is created, the data management tool 800 may be configured to automatically set the stroke number as the number after the previous stroke. If a stroke is created between two other strokes, the other strokes following the created stroke may be automatically renumbered, starting from the stroke created. The data management tool 800 may edit the timestamp 826 to be set to a time either after the previous stroke or a time before the proceeding stroke. In one example, when a stroke is created, the default strokes accessed are one.

In one embodiment a user may delete a stroke. If a stroke is deleted, the data management tool 800 may be configured to automatically renumber the remaining strokes in sequential order. If a stroke is deleted and it is not the stroke within the hole 831 being flagged but rather a stroke where the "in the hole" flag is available, the data management tool 800 may recalculate the score with the new sum of strokes accessed. If the stroke with the "in the hole" flag is deleted, the data management tool 800 may be configured to clear the score calculated. As described below, the "in the hole" flag may be set or removed by the user. Following deletion of a stroke including the "in the hole" flag, the user may set the "in the hole" flag for another stroke from which a revised score is calculated by the data management tool 800. In one example, the user may be prompted to flag a stroke with the "in the hole" flag upon deletion of a stroke flagged as "in the hole".

Stroke event 825 may correspond to the latest stroke event received. Stroke event 825 may enable a user to identify a stroke event. Thus, in one configuration, the stroke event 825 is editable via the team player stroke detail 808. Editable options may be provided and may include one or more event types selected from club selection, addressing the ball, shot hit, preliminary, final or in the hole, corresponding to such events collected by the ST application via the companion device and tracking module.

Time stamp 826 may correspond to that of a stroke event 825, such as the latest stroke event 825. In one configuration, the time stamp is editable via the team player stroke detail 808, allowing a user to edit the field in a format of a time and day entry.

Stroke type 827 may correspond to a stroke type identifier, such as stroke, penalty, or drop, corresponding to such stroke types collected by the ST application via the companion device. In one configuration, stroke type 827 is editable by the data management tool 800 to change or add a stroke type from a list. In one example, interacting with stroke type 827 causes a dropdown to appear including a list of available stroke types enabling the user to select one of the stroke types to set. In various embodiments, the data management tool 800 may automatically apply various rules to edits of stroke type. For example, if a stroke type created is "drop", the strokes accessed 824 may be zero. If a stroke type created is "drop", the stroke number 823 may be the same as the previous stroke or penalty type. If a stroke type created is "penalty", the strokes accessed 824 may be defaulted to one. If a stroke type created is "penalty", the stroke number 823 may increment to an amount identified for strokes accessed 824.

Location 828 may correspond to a graphic location of the stroke as determined by location methodologies described herein, e.g., via operation of the tracking module, location system, rangefinder, manual entry via indicating a location of ball positions relative to a displayed map, or other location methodology used by the STTM scoring system. In one configuration, location 828 is editable to change a location from an available list of location descriptions for the golf course being played, e.g., tee box, fairway, rough, first cut, hazard, water, out of bounds, green, or the like. In one example, interacting with the location data element may cause a dropdown to appear including a list of available locations for the golf course that may be set for location.

Provisional 830 may be used to identify if a stroke is a provisional or not. In one configuration, the provisional field is editable with value options of "yes" or "no" with respect to if the stroke is a provisional stroke.

In the hole 831 may be used to identify if the specified stroke resulted with the ball in the hole or not. In one configuration, a user may set or remove a flag if the stroke is considered to be in the hole. The data management tool 800 may automatically apply various rules to "in the hole" flags. For example, if the last stroke with the highest stroke number is flagged "in the hole", a score may be calculated and stored based on the sum of all strokes accessed. If a stroke that is not the last stroke with the highest stroke number is flagged "in the hole", that stroke is set as the highest stroke number and all other strokes may be renumbered in sequential order.

With reference to FIG. 8D, in various embodiments, a stroke event review viewer 832 may be provided. For example, each stroke in the player stroke detail 808 may be operable to be optionally expanded out to show additional associated stroke events. In the illustrated viewer, stroke events for a stroke are populated in the stroke event 823 element. As shown, the stroke events for the stroke number include club selection, addressing, shot hit, preliminary, and final. Thus, the stroke did not result in the player holing the ball. In various embodiments, stroke details received from companion devices may be marked "preliminary" and be subject to review via operation of the data management tool 800 or validation system described below, successful review of which may set the stroke detail to "final". In one configuration, the fields of the stroke event review viewer 832 cannot be edited except for the time stamp field. The stroke event review viewer 832 may be configured to enable a user to reorder or sort stroke events in the sequence of events. The stroke event review viewer 832 may be configured to enable a user to collapse the review of stroke events, such as to just presenting the latest stroke event.

Figure 8E:
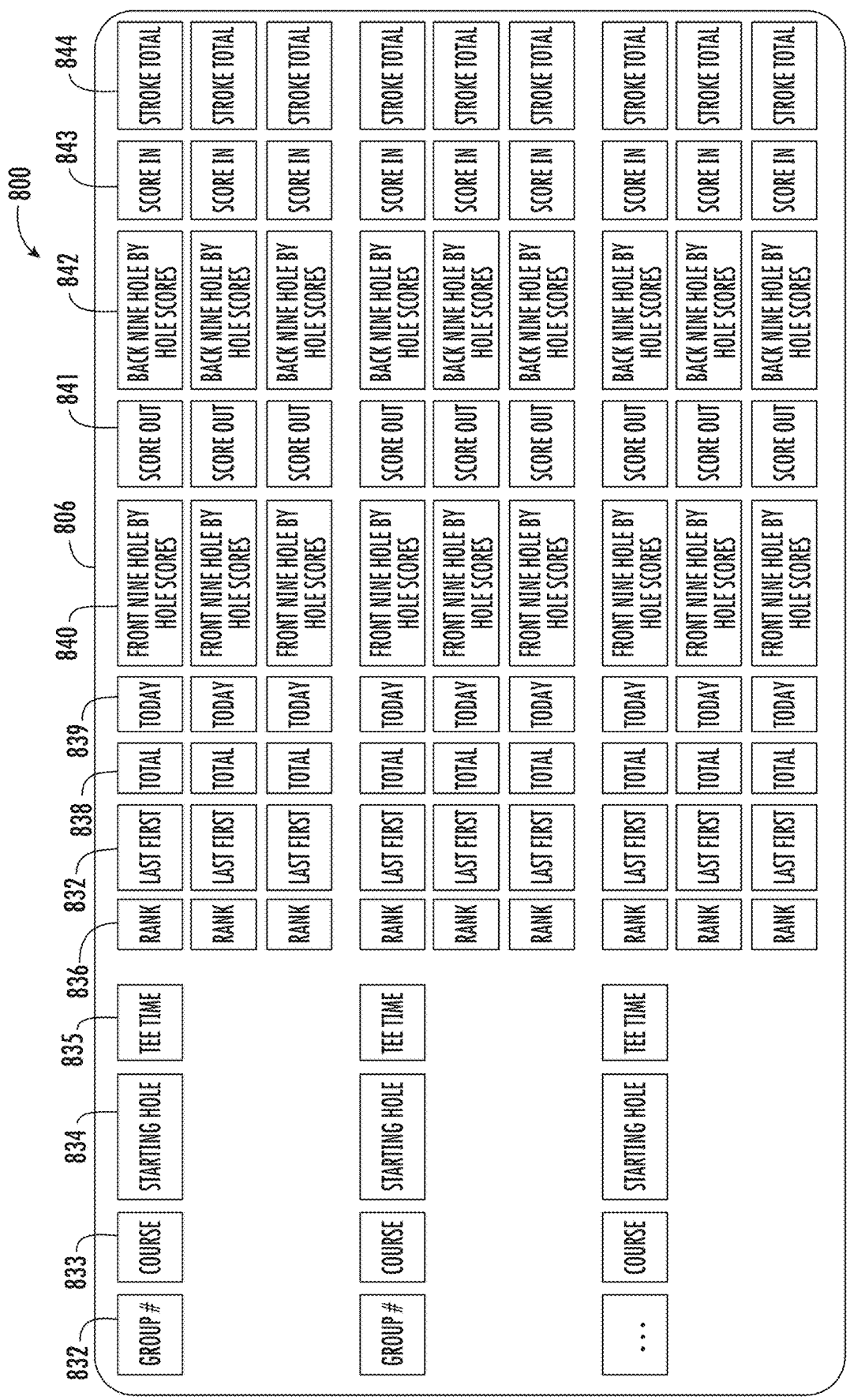
FIG. 8E illustrates an all group presentation component of the data management tool according to various embodiments described herein.

FIG. 8E illustrates an example interface of the all group presentation 806 of the data management tool 800 configured to interface a user with the operations thereof. All or a portion of the interface may be presented in the respective presentation block view of FIG. 8A or may be accessible via interaction with the all group presentation 806 therein provided. Various elements of the interface may be displayed and/or editable via operation of the all group presentation 806.

The all group presentation 809 may be configured to display a selected round, which may include displaying only the selected round. In one example, the all group presentation 809 is configured to display a course selected or information for all courses of a tournament, if selected. In some configurations, the display may be scrollable and/or each column of data may be sorted in either ascending or descending order based on the information available in the column. In one configuration, none of the fields in the all group presentation 809 may be directly edited via the all group presentation 809. In one embodiment, the presentation of the all group presentation 809 may include a notification with respect to a team player's name if the team player's scorecard has been flagged as "official", e.g., via a validation system described in more detail elsewhere herein.

The all group presentation 809 may include various data elements, such as one or more of (a) group number 832—corresponding to a number assigned to the group; (b) course 833—corresponding to course the group number is playing; (c) starting hole 834—corresponding to first hole that the group started on, based the groupings for the round; (d) tee time 835—corresponding to the starting tee time of the group; (e) rank 836—corresponding to the projected rank of the player during the progress of play during rounds in progress; (f) team player name 837—corresponding to identification of the player; (g) total 838—corresponding to the current total par relative score for the event. (h) today 839—corresponding to the par relative score for the round; (i) front nine hole by hole scores 840— corresponding to a list of scores by hole for the first nine holes; (j) score out 841—corresponding to a stroke total for the scores entered on the front nine; (k) back nine hole by hole scores 842—corresponding to a list of scores by hole for the back nine holes; (l) score in 843—corresponding to a stroke total for the scores entered on the back nine; or (m) stroke total 844—corresponding to a stroke total for the round, which display when the score out 841 and the score in 843 have data.

Figure 8F:
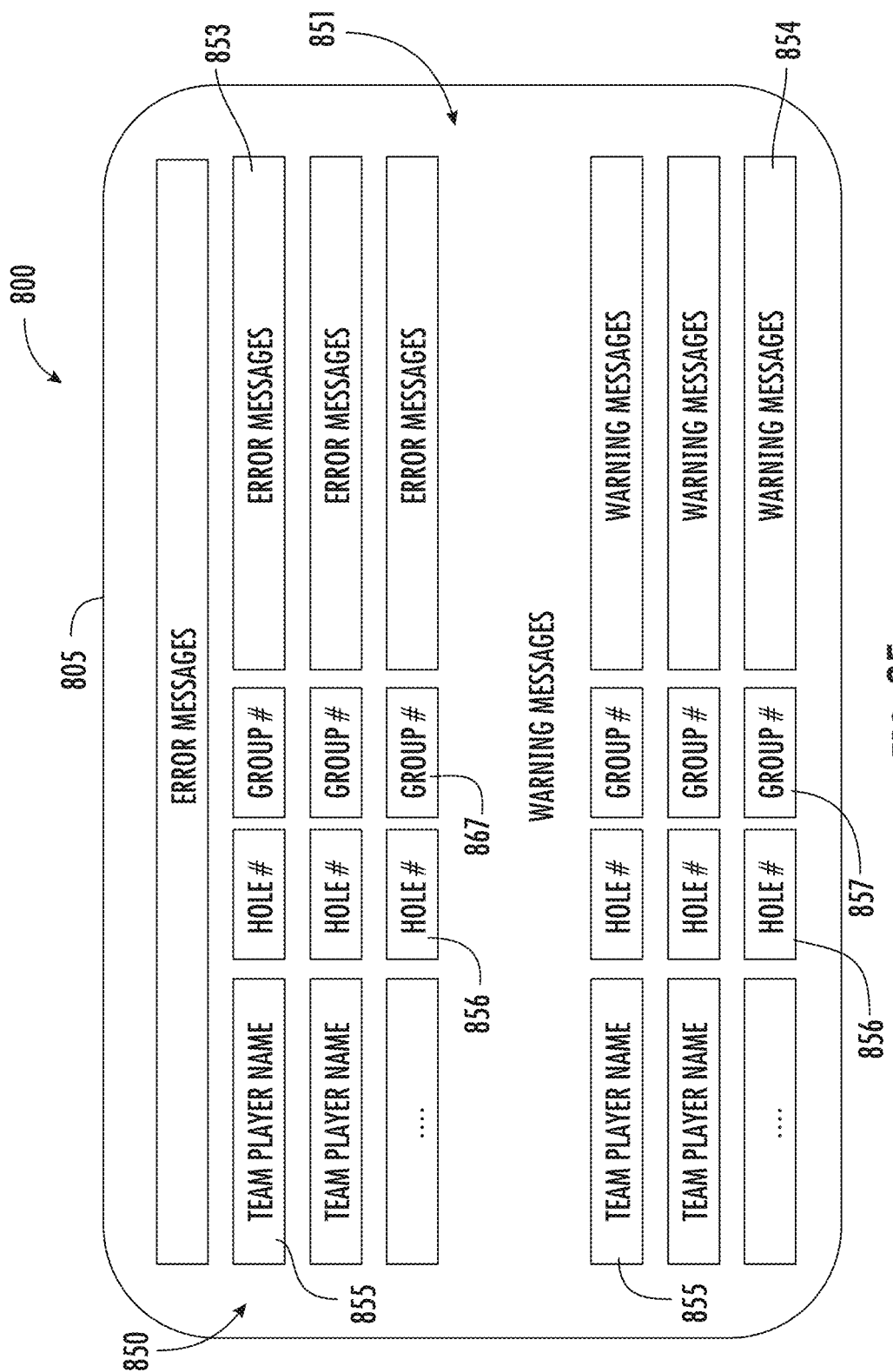
FIG. 8F illustrates an example interface of the data discrepancies panel component of the data management tool according to various embodiments described herein.

FIG. 8F illustrates an example interface of the data discrepancies panel 805 of the data management tool 800 configured to interface a user with the operations thereof. All or a portion of the interface may be presented in the respective presentation block view of FIG. 8A or may be accessible via interaction with the data discrepancies panel component therein provided. Various elements of the interface may be displayed and/or editable via operation of the data discrepancies panel 805.

The data discrepancies panel 805 may include two sub-elements comprising an error message panel 850 and warning message panel 851. In one embodiment the sub-elements may be configured to function independently.

In various embodiments, the data discrepancies panel 805 may be manipulated to enhance user experience and efficiencies. For example, the rows of data may be scrollable. The columns of data may also be sortable in either ascending or descending based on the information available in the column. In one configuration, the data discrepancy panel 805 may provide an interface element operable to flag a warning as reviewed and to remove the warning from the presentation. In one example, the data discrepancy panel 805 may enable a user to review all warnings that have been flagged as reviewed; review errors and warning either by group, hole, or team player; reset and display all errors and warnings if anything has been set as reviewed and removed; scroll through all messages by panel if they are not viewable in the initial display; or to turn on or off the rules for all or select error and/or warning message rules. In one example, none of the fields may be edited.

In various embodiments, error message 853 and warning message 854 may identify various identification elements with respect to the player, time, and/or location to which the message relates. In the illustrated embodiment a team player name 855, hole number 856, and group number 857 data elements are presented. The data management tool 800 may be configured to analyze scoring and/or location data and associated procedures and automatically generate error and/or warning messages 853, 854 when anomalies are identified.

Error messages 853 may relate to missing data and/or procedural anomalies with respect to recorded score and/or location data, which may be displayed in the error message 853 element associated with the identifying information. Various error messages may be included, such as one or more of missing location description; missing coordinates on a stroke; missing scores, which may be displayed, for example, if there are scoring gaps between holes; strokes accessed does not sum up to the score recorded; score recorded but there are no strokes; no penalty recorded for a stroke flagged as provisional with strokes accessed of one; non-sequential timestamps for stroke trails from hole to hole; first stroke is not from the tee location; a stroke is not flagged as final after receiving the next stroke; or a team player is not marked strokes official after the team player has completed the round.

Warning messages 854 may relate to events or lack thereof detected by the data management tool 800 that may not yet be errors or that cannot yet be confirmed to be errors based on the available data but that are anomalous compared to expected operation of the scoring system, which may include the location system. Warning messages 854 may be displayed with associated identifying information. Various warning messages 854 may be included, such as one or more of players being tracked is out of sync with strokes of the other team players in a group; multiple consecutive drops for a team player; drop without a penalty in a team player's stroke trail; stroke's coordinates are not closer to the pin location than the previous stroke's coordinates; more than 10 minutes between strokes for a team player; multiple strokes contain a location from the tee; non-typical score for a team player, such as double bogies or worst and eagles and better; 5 minutes have elapsed and a stroke has not received coordinates; team player was on the green then appears to be off the green; driving distance is out of range of a normal distance on a par 4 and 5, such as less than 180 yards and longer than 380 yards; a stroke was flagged as in the hole that had a distance greater than 30 yards; pin has not been set and a stroke for a team player has been received on that hole; or tee has not been set and a stroke for a team player has been received on that hole.

Figure 8G:
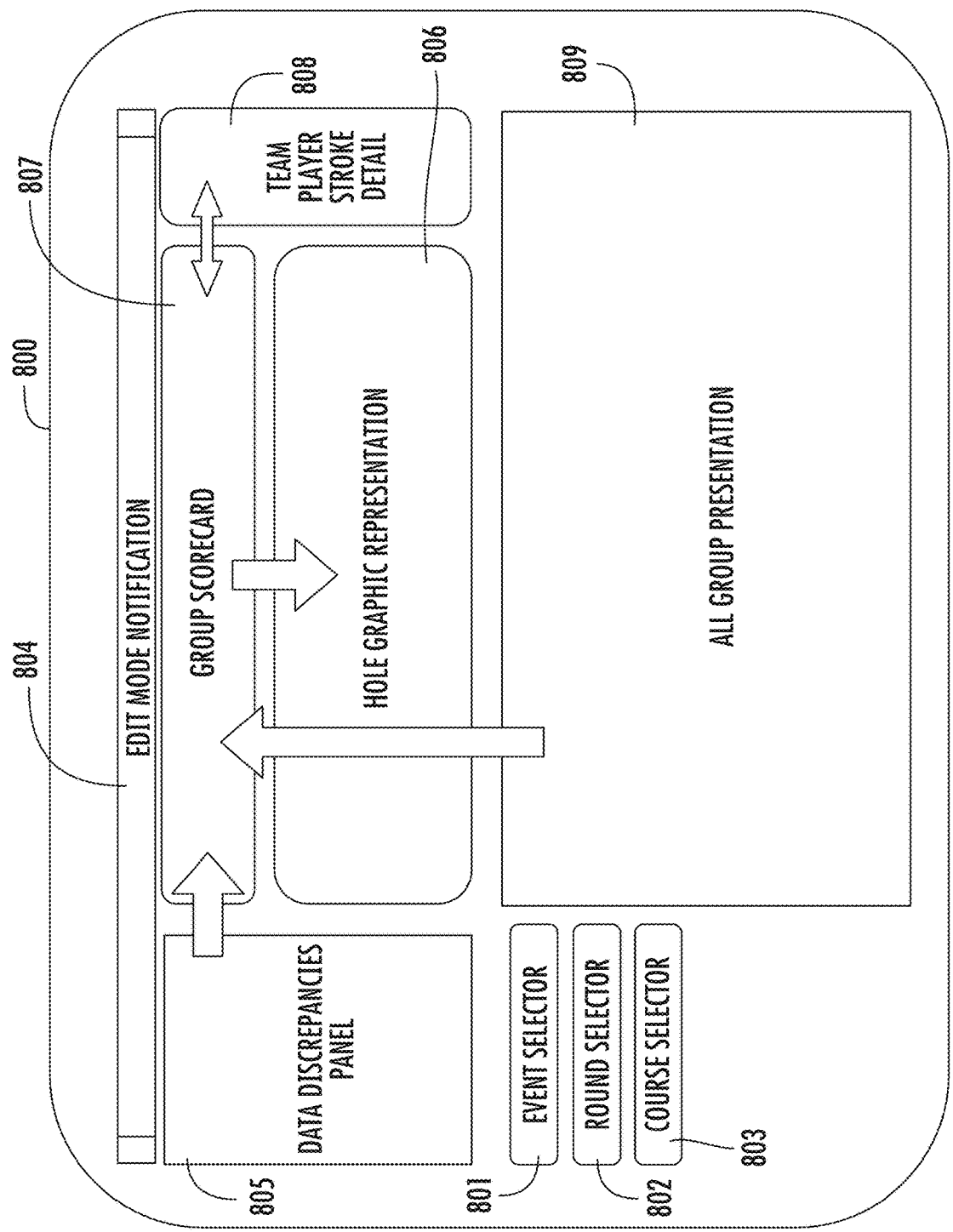
FIG. 8G illustrates the presentation block user interface depicting connections between presentation blocks of the tool components according to various embodiments described herein.

With reference to FIG. 8G, in various embodiments, the presentation block of the data management tool 800 and/or one or more associated components thereof described above with respect to FIGS. 8A-8F, may be configured to create connections therebetween. For example, the presentation block layout may be configured to create a connection between blocks views of the component elements. For instance, when selecting an element or otherwise interacting, e.g., making a selection, in one block view or otherwise with respect to an associated element, a connection is established for one or more other blocks to thereby update the appropriate presentation in the respective blocks.

The presentation block may be configured to apply connection rules with respect to the all group presentation 809. In one example, selecting a team player's name causes one or more of the group scorecard 807 to present the group the team player is in; the hole graphic representation 807 to present the current hole the team player has not completed; the team player stroke detail 808 to present the strokes received on the current hole the team player has not completed; the data discrepancies panel 805 to present all the errors and warnings for the team player selected on all holes. In the above or another example, selecting a group number may cause one or more of the group scorecard 807 to present the group selected; the hole graphic representation 806 to present the current hole and defaults to the top team player in the group and the current hole the team player has not completed; the team player stroke detail 808 to display the strokes received on the current hole the top team player in the group has not completed; or the data discrepancies panel 805 to present all the errors and warnings for the group selected. In any of the above examples or another example, selecting a hole of a team player may cause the group scorecard 807 to present the group the team player is in; the hole graphic representation 806 to present the team player selected and the hole selected the team player stroke detail 808 to present the strokes received on the hole and team player selected; or the data discrepancies panel 805 to present all the errors and warnings for that hole and team player, which may include any warnings that have been flagged as reviewed.

In any one of the above embodiments or another embodiment, interaction with the group scorecard 807 may cause connections with one or more other components of the data management system 50. For example, selecting a team player's name may cause one or more of the hole graphic representation 806 to present the current hole the team player has not completed; the team player stroke detail 808 to present s the strokes received on the current hole the team player has not completed; the data discrepancies panel 805 to present all the errors and warnings for the team player selected on all holes; or the all group presentation 809 to present the group or team player at the top of the presentation. In a further or another example, selecting a hole of a team player may cause one or more of the hole graphic representation 806 to present the team player selected and the hole selected; the team player stroke detail 808 to present the strokes received on the hole and team player selected; the data discrepancies panel 805 to present all the errors and warnings for that hole and team player, which may include any warnings that have been flagged as reviewed; or the all group presentation 809 to present the group or team player at the top of the presentation.

In any one of the above embodiments or another embodiment, interaction with the team player stroke detail 808 may cause connections with one or more other components of the data management system 50. For example, selecting a stroke may cause a location coordinate in the hole graphics representation 806 to be presented if a coordinate for the stroke is present.

In any one of the above embodiments or another embodiment, interaction with the hole graphic representation 806 may cause connections with one or more other components of the data management system 50. For example, selecting a location coordinate that is assigned to a stroke may cause the stroke selected in the team player stroke detail component to be highlighted.

In any one of the above embodiments or another embodiment, interaction with the data discrepancies panel 805 may cause connections with one or more other elements of the data management system 50. For example, selecting an error or warning to be reviewed may cause the presentation of the group scorecard 807 to be updated based on the team player and the group identified in the error or warning message. In another or a further example, selecting an error or warning to be reviewed may cause the presentations of the hole graphic representation 806 and/or team player stroke detail 808 to update based on the team player identified in the error or warning message.

In various embodiments, STTM system includes a validation system 70 configured to provide streamlined validation of a player's official scorecard against scores collected by the score tracking system. The validation system 70 may be configured to allow users to make changes to the scores obtained from the operation of the score tracking system, if necessary. Using the validation system 70, users may also quickly identify a scorecard as reviewed and flagged as official. In some embodiments, this official designation may be transmitted or otherwise immediately available on one or more data platforms to communicate to users of the scoring data that no more score edits will be received for the respective player. In one example, the validation flagging of a scorecard as official is retained for archiving in a database, later dissemination, internal verification, compiling with additional validated scorecards, analysis, or combination thereof.

The validation system 70 may be configured for operation in various network environments, such as those identified herein with respect to the various STTM systems/subsystems thereof. For example, the validation system 70 may be configured for operation in local, remote, or distributed network based environment. The validation system 70 may be configured for operation in a web-based, cloud-based, or other suitable network environment. In one embodiment, the validation system 70 may operate within a browser or browser-like environment. For example, the validation system 70 may include a validation application that has the ability to run on multiple browser tabs with different settings. In a further example, the validation system 70 includes an edit tracking feature wherein the validation system 70 tracks edits by user. These user edits are tracked as being associated with the particular user making the edits. The tracking feature of the validation system may be configured to store the tracked edits by user and make the tracked edits reviewable. For example, a reviewing user may access the validation system 70 and view a list of users and review details regarding edits each user made to which scorecards. In some configurations, the validation system 70 may allow a reviewing user to view edits of a user by type, such as score, stroke, location, stroke type (drop, shot, penalty), etc. In this or another configuration, the validation system 70 may be configured to allow a reviewing user to view edits by one or more types by one or more or all users within a particular time period or event.

Figure 9A:
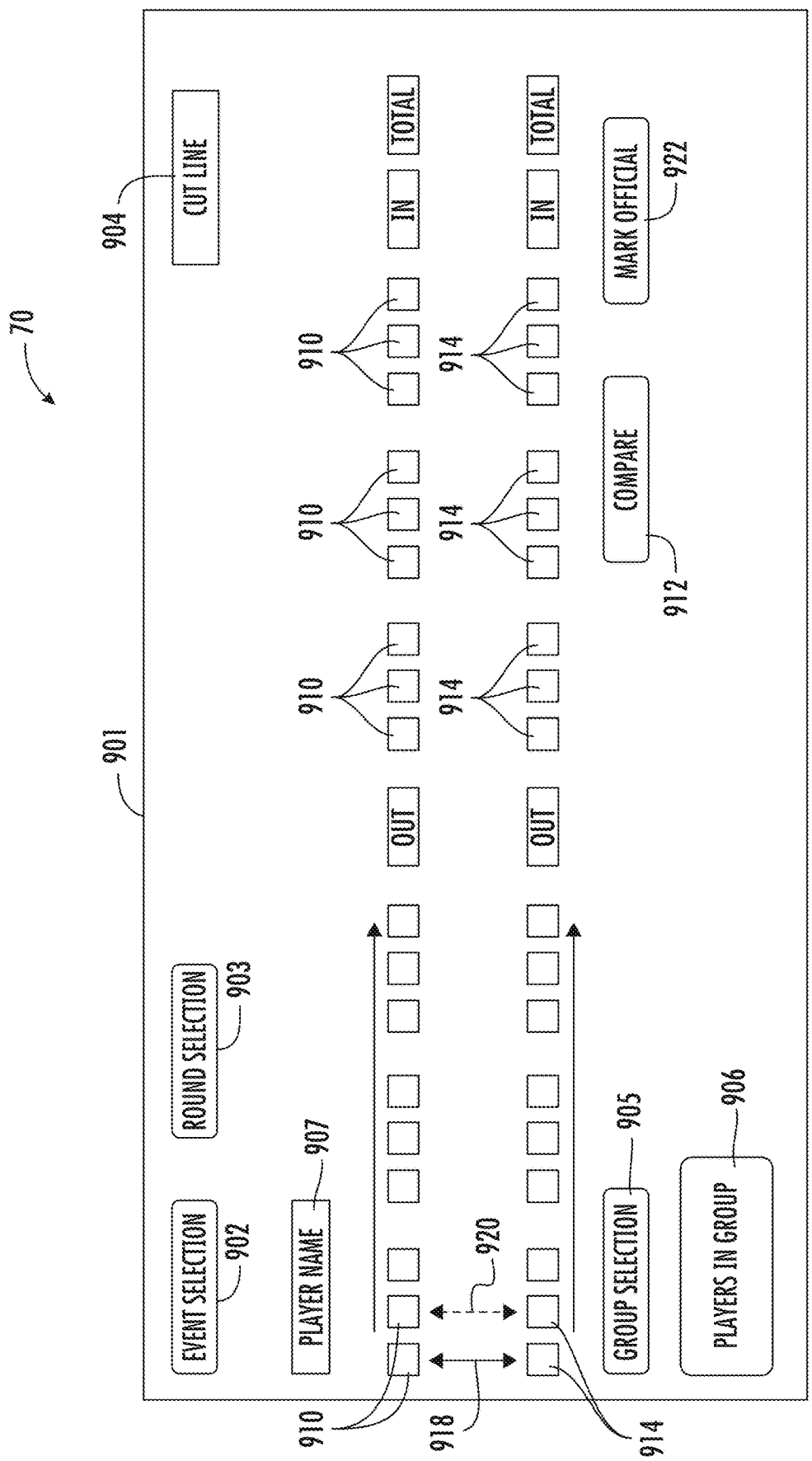
FIG. 9A illustrates a first validation user interface of the validation system configured for blind validation according to various embodiments described herein.
Figure 9B:
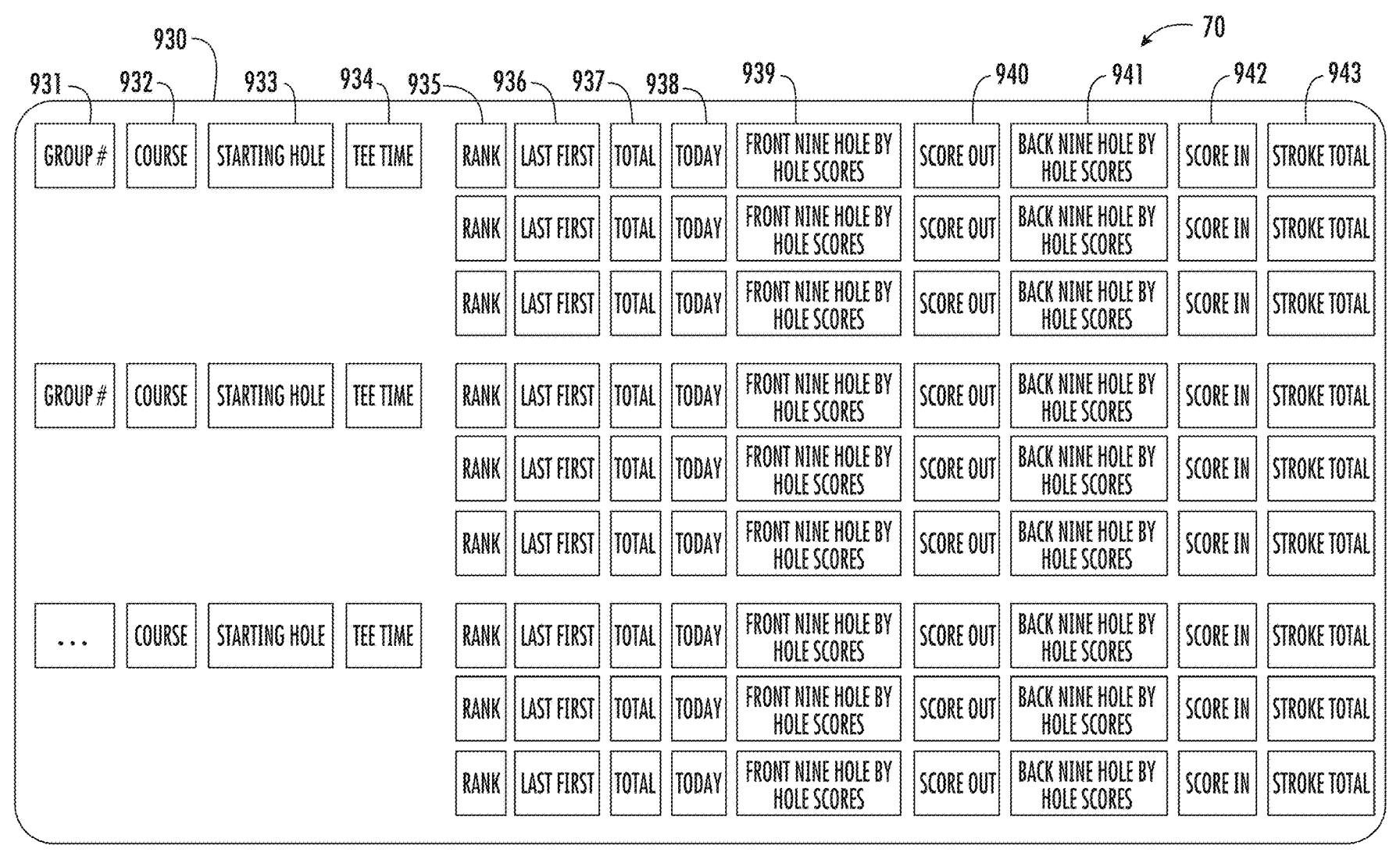

With reference to FIG. 9A-9B, in one embodiment, the validation system 70 may be configured to generate two functional validation tools for scorecard validation. Each validation tool may be provided in one or more tabs, screens, pages, windows, or any suitable displayable arrangement having the functionality described herein. The validation tools may be separately displayed or displayed together, in whole or in part. In one example, a first tool panel may be configured for entry of player scorecard scoring data and comparison with a second score collection methodology, such as an automated or semi-automated scoring methodology. The operations of the first tool may be referred to herein as blind validation. A second score collection methodology according to various embodiments is described below with respect to the tracking system methodology, but it is to be appreciated that variations of this score collection methodology or other score collection methodologies may be similarly applicable to the operations of the validation system. Thus, the first validation tool may be configured for blind validation that allows a user to enter scores for a player's scorecard, wherein the entered scores are automatically compared against the scoring data recorded by the score tracking system. The second validation tool may generate an output of all scores of players of a particular group, all groups, all players, or desired combinations thereof together with the player rankings. In various embodiments, the validation tools may be arranged in selectable tabs, wherein each tab includes a validation tool within a panel.

FIG. 9A illustrates an example first validation tool 901 configured for blind validation.

An event selector 902 may be provided to allow users to select the event that the validation system 50 will use for player scorecard validation. The event selector 902 may include a listing of selectable events. Interfacing with the event selector 902 may cause a dropdown, listing, or other selectable format of events for selection.

A round selector 903 may be provided to allow a user to select a round that the validation system will use for player scorecard validation. In some embodiments, event selection may be a prerequisite to round selection. For example, if the event is not static, known, or otherwise entered, the validation tool 901 may not allow the user to interact with the round selector 903. Interaction with the round selector 903 may cause the available rounds for the event to be presented for selection, which may be in a manner similar to that described with respect to the event selector 902. In one example, after a user selects the event, the validation tool 901 generates a selectable list of the available rounds for the event in the event selector 902.

A cut line 904 may be provided to allow a user to view a display of the current, real time cut data. In some embodiments, the cut line 904 is only presented when the selected round is a cut round. Viewing the cut line 904 may provide a user insight with respect to what a modification may do relative to the cut. For example, changing one player's score could result in several other players making/missing the cut.

A group selector 905 may be provided to allow a user to select a group including players for scorecard validation.

A player selector 906 may be provided that includes a list of selectable players in the selected group. In one embodiment, a player selector 906 is provided without a group selector 905 wherein a list of participating players is provided from which a user may select.

The name of the player that is currently being reviewed for scorecard validation may be displayed in a player name 907 field. In some configurations, an image, such as a headshot, of the player may be displayed.

A score entry may be provided for entering the player's score from the player's scorecard. The score entry may include hole fields 910 for entry of scores from all holes of the round, e.g., 18 hole fields. The hole fields 910 may be configured for manual entry. In one example, the hole fields 910 include dropdowns for each hole with selectable scores, toggle fields, or other suitable entry methodology. In the illustrated embodiment, the score entry includes hole fields 910 that require a user to cause each field to be available for entry, e.g., using the enter key or tab to select a hole field 910, along with a mouse navigation. As noted below, scores received by the validation system 70 that were recorded by the score tracking system may be absent or otherwise obscured from view such that the manual score entry and subsequent comparison with the score tracking system score is blind from the user's perspective.

System received scores, such as those received from score tracking system, may be imported into the validation system 70. In some embodiments, the importation of score tracking system scores may be automatic upon receipt of the scores or may be delayed. The score data and associated player data may be imported into the validation system after each hole is completed, periodically, when received, after a predetermined number of holes, or when the player or group has finished the round, which may be indicated by the scorer via the companion device. For example, when a scorer indicates a player or group has completed a hole or round, the calculated score and player name or number associated with the data may be sent directly or indirectly to the validation system. In the illustrated embodiment, if the scorecard has not been flagged official on a player that is selected, the system received scores will not be visible or will be blank while the user enters the scores for purposes of blind validation.

In the illustrated example, the first validation tool 901 includes a compare trigger 912 to cause comparison between the scores. For example, with respect to blind validation, a user may interact with the compare trigger 912 to initiate the comparison between the player scorecard and system received scores to be validated. Prior to triggering the comparison, the first validation tool 901 may not display the system received scores. In some embodiments, comparison may be initiated upon entry of one or all scores or upon population of the system received scores, which may be provided as a button or other interactive trigger.

As a result of the compare operation, system received scores may populate in hole fields 914 juxtaposed to corresponding hole fields 910. Validity notifications may be displayed with respect to a hole or associated score to indicate score matches, score discrepancies, or both. For example, when the option to compare blind entry scores versus system scores is triggered, the system scores may appear and valid notifications of what matches and what does not match may be displayed. In the illustrated embodiment, solid arrows 918 between the blind score hole fields 910 and the system received score hole fields 914 indicate that the scores match while broken arrows 920 indicate discrepancies. The validity notifications may be provided by any suitable indicia. For example, matches and/or discrepancies may be indicated by different colors, shading, text, outlines, boxes, symbols, or other suitable perceivable indicia.

The first validation tool 901 may include an official marker 922 that allows a user to flag the scorecard as official. For example, if the blind validation indicates that all the scores match, the user may interact with the official marker 922 and mark the scorecard as official. In another example, the validation system 70 may automatically flag the score as official if all the scores match.

In some embodiments, scores may be editable by users to resolve discrepancies. In one configuration, scores with discrepancies or edited scores are sent or saved for additional review. As noted above, marking the scorecard as official may transmit the scorecard, score, or official flag to a database for storage and/or dissemination to one or more data platforms with an indication that the score is official. In some embodiments, scores recorded by the score tracking system may be transmitted to one or more data platforms as an unofficial score, and flagging the score as official via the validation system causes the validation to be transmitted to the data platforms to indicate the score is now official.

In one embodiment, after a blind comparison has been triggered, the user is given the ability to edit any score in the system scores scorecard. In this or another example, the ability to mark a player's scorecard as official is prevented until all score discrepancies have been resolved. In the above or another example, a notification may be displayed for the player's scorecard associated with the validation system 70 when it has been marked official, and the notification remains on the player's scorecard if the user navigates off and back to the player.

With reference to FIG. 9B, the second validation tool 830 may present scoring data for one or more groups. The presentation may be configured to display the scores from the event and/or round selected, such as that selected with respect to the first validation tool 901. The scores presented may include unofficial tracking scores and official scores. As described elsewhere herein, various score transmission timing schemes may be used. In various embodiments, tracked scores may be populated when transmitted companion devices 12, such as after each shot hit entry or when a player or group completes a hole.

The scoring data may be arranged in various formats. In the illustrated embodiment, the scoring data is arranged such that each column of data is sorted either in ascending or descending order based on the information available in the respective column. The fields will typically not be editable from a basic user standpoint. The display may be scrollable to view groups other than those initially displayed. In one example, selecting a player or group will populate that player or group with respect to the second validation tool. Thus, a user may select a player or group and view additional details regarding the player's or group's scores. In one example, if the manual score entry has not been entered or processed through validation, selecting the player or group will populate the group selector and/or player selector fields to the selected player or group. In one embodiment, players having scores marked as official are marked with visual indicia as a notification of the same.

The presented scoring data may include various data points with respect to the players and scores such as one or more of (a) group number 931—corresponding to the group number assigned to the group of players; (b) course of play 932—corresponding to the course the scoring data was collected; (c) starting hole 933—corresponding to the first hole that the group started on based the groupings for the round; (d) tee time 934—corresponding to the starting tee time for the group; (e) rank 935—projected rank of the player during the progress of play during rounds in progress, (f) team player name 936—corresponding to the last name and first name of each team player in the group; (g) total 937—corresponding to the current total par relative score for the event; (h) today 938—corresponding to par relative score for the round; (i) front nine hole by hole scores 939—corresponding to a list of scores by hole for the first nine holes; (j) score out 940—corresponding to stroke total for the scores entered on the front nine; (k) back nine hole by hole scores 941—corresponding to a list of scores by hole for the back nine holes; (l) score in 942—corresponding to stroke total for the scores entered on the back nine; (m) stroke total 943—corresponding to a stroke total for the round; or (n) combination thereof. In various embodiments, the stroke total 943 will only be displayed when score out 940 and score in 942 have data.

According to various embodiments, the round management system may be utilized to manage rounds and groupings for players competing in a golf tournament. For example, the groupings engine may create player groupings for the competing players. The round management system may also populate the ST application with the groupings from which scorers using companion devices may identify groups and/or players for which they are assigned and will track scoring during the competition.

The grouped players may automatically populate a device assignment element of the device management system. Having the groups defined, the device management system may assign tracking modules from a device list to the various groups and players. In one example, companion devices or ST application executed thereon are assigned or programmed to a specific group and the tracking modules assigned to the group may populate the companion device via the ST application for specific identification by the scorer that links the scoring data to the tracking module. In one variation, the scorer assigned to a group may enter their credentials or otherwise log onto the ST application whereby the group information of the group assigned to the scorer populates the ST application. In another configuration, entry of the player's name in the ST application identifies the player for scoring data transmissions and one or more of the location system, data management system, or validation system is configured to access the tracking module assignments to pair the scoring data with the tracking module data.

During the round, the scorer may collect scoring data by entering various stroke events and other data into the companion device as described herein. Stroke events may be associated with a time stamp. The companion device may transmit the scoring data to the management system. The tracking module may automatically collect location data or locating data continuously, at defined intervals, or upon occurrence of defined events. In one example, the tracking module is configured to obtain GPS coordinates corresponding to its location continuously, e.g., every second. The tracking module may automatically transmit the obtained coordinates to the management system continuously, at defined intervals, or upon occurrence of defined events. In one example, the tracking module transmits collected location data or locating data to the management system every five seconds. As noted above, other location methodologies may be used instead of, in addition to, or in combination with, e.g., a hybrid methodology, GPS. For instance, the STTM system may include or incorporate a location network comprising an UWB location network. The location data or locating data may be transmitted to the management system directly or indirectly from the tracking module, location network, or other device.

The location system may access tracking module assignments and pair time stamps to locations of assigned tracking modules. The data management system may access the scoring data where it may be reviewed and edited as necessary with the data management tool. The validation system may then compare the score tracking system scores with scorecards of the respective players. For example, the validation system may apply blind validation. The validation system may then reconcile the score tracking system scores with the player scorecards. The validation system may then mark the reconciled system obtained score as "official". The "official" designation may then populate the data management tool interfaces to indicate that no additional scores or score modifications will be entered for the player. The official score and related data collected by the companion device and tracking module during play may then be stored in a database and/or disseminated to data platforms for viewing, analysis, or the like.

In various embodiments, the score tracking system may utilize additional location tracking techniques. Such techniques may operate as a primary, secondary, backup, or replacement location determination methodology with respect to utilization of the tracking module.

In one embodiment, the companion device or another electronic device is equipped with a laser rangefinder is operated by a scorer, e.g., human or robot. The rangefinder is used to determine distance of objects, such as players or balls, from the device. The device may also include a direction sensors, such as magnetic and/or gravitational field sensors, to combine distance and direction relative to a map of the course. To further enhance location determination, the location of the device may be known due to the device being located at a known location or the location of the device being determined by the device or another device whereby the location of the device, e.g., coordinates, are combined with the angle and distance of the object from the device. For example, a device in a mobile use case may obtain its GPS (or other global constellation coordinates), which may be augmented as described herein, e.g., with WAAS (Wide Area Augmentation System), Differential GPS (DGPS), e.g., Global Differential GPS (GDGPS), Continuously Operating Reference Stations (CORS), Signals of Opportunity (SOP)-based or augmented navigation, UWB, LTE, cellular, radio, television, Wi-Fi, other satellite signals, or the like. Location of the device may also be determined using any location network technology, such as those described herein, e.g., utilizing UHF, NFC, Wi-Fi, Bluetooth Low-Energy, or UWB. Determining the coordinates of the object, the coordinates may be overlaid or mapped to the golf course to determine the location of the object relative to the golf course. In one embodiment, the device is a real time kinematic (RTK) enabled device and utilizes RTK to determine its coordinates. For example, an RTK base station or network may be utilized to determine the location of the device for combining with direction and distance of an object targeted with the laser rangefinder to determine object locations. Notably, as described elsewhere herein, the tracking module may similarly be an RTK enabled device and the location network may include an RTK base station or RTK network.

In one embodiment, a camera system is positioned around a golf course. One or more cameras may track movement and identify distance using an associated laser or rangefinder or via optical calculations. For example, each camera may calculate the distance a ball or other object of known size by comparing the optically captured size of the object to that of the known size of the object. Further determination of the angle of the camera may be used to plot the location of the object at the distance and angle from the camera relative to a map of the region around the camera. Location determination may be enhanced utilizing multiple cameras, e.g., to triangulate or otherwise determine location of a ball or other object. In one example, an optical map of a region of the course from a view of a fixed camera may be utilized by a camera to determine location of objects relative to known locations within the mapped region. For example, by comparing an image captured of an object to surrounding features in the image of known location, the approximate location of the object may be determined. Optical calculations such as those described above may be used to determine distance to enhance the accuracy of the location determination. In an above or another example, radar may be implemented to track objects, which may include location, velocity, trajectory, acceleration, or other parameters. In an above or another example, cameras may be configured for optical recognition. For instance, cameras may utilize facial recognition, body recognition, gait recognition, clothing recognition, ball/shape recognition, or the like that is used to identify participants and/or balls to thereby pair location with player and/or player ball. In one embodiment, a players carry or wear an optical, electromagnetic, or reflective maker identifiable by a camera or associated receiver that uniquely identifies the player. In one embodiment, cameras may utilize optical recognition/augmented reality (AR) to locate players and/or balls. Cameras may typically be located at known locations, but in some instances one or more cameras may be utilized in a mobile environment, e.g., utilizing real time kinematic base stations or location methodologies with respect to the camera, such as those described herein with respect to location determination of the tracking module. In some embodiments, cameras may be used to identify motion and objects and a laser or rangefinder associated with a camera may target such objects to determine distance of the object from the camera. Combining camera view angle with distance, the location of the object may be determined. In some embodiments, topology of the region may be mapped or determined and added to the distance calculations. In some embodiments, such camera systems are operated by a human, robot, or fully autonomous. Cameras may operate in the visual spectrum and/or optical spectrum to include one or more of the visual spectrum, ultraviolet spectrum, or infrared spectrum.

The systems and methods disclosed herein may include still further functionalities and features. For example, the operative functions of the system and method may be configured to execute on a special-purpose processor specifically configured to carry out the operations provided by the system and method. Notably, the operative features and functionality provided by the system and method may increase the efficiency of computing devices that are being utilized to facilitate the functionality provided by the system and the various methods disclosed herein. For example, by training the system over time based on data and/or other information provided and/or generated in the system, a reduced amount of computer operations may need to be performed by the devices and elements in the system using the processors and memories of the system than compared to traditional methodologies. In such a context, less processing power needs to be utilized because the processors and memories do not need to be dedicated for processing. As a result, there are substantial savings in the usage of computer resources by utilizing the software, techniques, and algorithms provided in the present disclosure. In certain embodiments, various operative functionality of the system may be configured to execute on one or more graphics processors and/or application specific integrated processors. In some embodiments, various functions and features of the system and methods may operate without any human intervention and may be conducted entirely by computing devices. In certain embodiments, for example, numerous computing devices may interact with devices of the system to provide the functionality supported by the system. Additionally, in certain embodiments, the computing devices of the system may operate continuously and without human intervention to reduce the possibility of errors being introduced into the system.

At least a portion of the methodologies and techniques described with respect to the exemplary embodiments may incorporate a machine, such as, but not limited to a computer system or other computing device within which a set of instructions, when executed, may cause the machine to perform any one or more of the methodologies or functions discussed above. The machine may be configured to facilitate various operations conducted by the systems. For example, the machine may be configured to, but is not limited to, assist the systems by providing processing power to assist with processing loads experienced in the systems, by providing storage capacity for storing instructions or data traversing the systems, or by assisting with any other operations conducted by or within the systems. As another example, the computer system may assist with enhancing accuracy of collected scoring data collected in a reduced infrastructure environment by incorporating rules such as error and/or warning rules that automatically identify potential discrepancies. As another example, utilizing a tracking module that does not interfere with performance of a player or require player interaction to track location provides accurate tracking that greatly reduces infrastructure and human intervention compared to current methodologies.

In some embodiments, the machine may operate as a standalone device. In some embodiments, the machine may be connected (e.g., using communications network, another network, or a combination thereof) to and assist with operations performed by other machines and systems, such as, but not limited to, the tracking module, companion device, management device and associated system servers, database, any other system, program, and/or device, or any combination thereof. The machine may be connected with any component in the systems. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system may include a processor (e.g., a central processing unit (CPU), a graphics processing unit (GPU), or both), a main memory and a static memory, which communicate with each other via a bus. The computer system may further include a video display unit, which may be, but is not limited to, a liquid crystal display (LCD), a flat panel, a solid state display, or a cathode ray tube (CRT). The computer system may include an input device, such as, but not limited to, a keyboard, a cursor control device, such as, but not limited to, a mouse, a disk drive unit, a signal generation device, such as, but not limited to, a speaker or remote control, and a network interface device. The disk drive unit may include a machine-readable medium on which is stored one or more sets of instructions, such as, but not limited to, software embodying any one or more of the methodologies or functions described herein, including those methods illustrated above. The instructions may also reside, completely or at least partially, within the main memory, the static memory, or within the processor, or a combination thereof, during execution thereof by the computer system. The main memory and the processor also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium containing instructions so that a device connected to the communications network, another network, or a combination thereof, can send or receive voice, video or data, and communicate over the communications network, another network, or a combination thereof, using the instructions. The instructions may further be transmitted or received over the communications network, another network, or a combination thereof, via the network interface device. The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure. The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A score tracking system, the system comprising:
a tracking module configured to be carried by a player competing in a golf tournament, an application configured to interface a user with scoring operations via a user interface of a companion device, the companion device separate from the tracking module and configured to receive an input via the user interface indicating occurrence of a stroke event, wherein the input causes the application to set a time stamp that corresponds to the occurrence of the stroke event, wherein the stroke event comprises address and ball hit, and wherein the interface includes an indicator configured to be pressed to indicate that the player is addressing the ball and held until the player hits the ball to indicate that the ball has been hit; and
a location system configured to collect or receive location data, wherein the location data comprises or is used by the location system to generate a plurality of sets of location coordinates, wherein each set of location coordinates corresponds to a location of the tracking module at a specified time, wherein the location system is configured to pair the time stamp with a set of the location coordinates corresponding to the location of the tracking module at the occurrence of the stroke event.

2. The system of claim 1, wherein the location of the tracking module at the occurrence of the stroke event is used as a proxy for location of a ball of the player carrying the tracking module resulting from a previous stroke.

3. The system of claim 1, wherein the tracking module operates as a beacon in a location network.

4. The system of claim 3, wherein the location network utilizes ultra-wide band positioning.

5. The system of claim 1, wherein the tracking module is configured to transmit the location data to the location system.

6. The system of claim 1, wherein the location system is configured to receive the location data from a location network, and wherein the location network is configured to calculate the plurality of sets of location coordinates.

7. The system of claim 1, wherein the location data collected or received by the location system comprises locating data that the location system uses to calculate the location coordinates.

8. The system of claim 1, wherein the plurality of sets of location coordinates comprise sets of GPS coordinates.

9. The system of claim 1, wherein the plurality of sets of location coordinates comprise sets of ultra-wide band positioning coordinates.

10. The system of claim 1, wherein the tracking module is configured to collect location data at predefined first intervals and transmit the collected location data to the location system at predefined second intervals, wherein the second intervals are greater than the first intervals.

11. The system of claim 1, wherein the location system is configured to segment holes of a golf course into zones, each zone corresponding to a range of location coordinates, and wherein the location system is configured to determine a current zone the tracking module is located from the plurality of sets of location coordinates.

12. The system of claim 1, wherein the companion device is configured to be carried by a scorer that accompanies a group of players including the player, and wherein the companion device is configured to receive inputs corresponding to stroke events for all players in the group.

13. A score tracking method, the method comprising:
receiving, from a companion device, an input corresponding to a stroke event of a player competing in a golf tournament, wherein the input includes a time stamp corresponding to an occurrence of the stroke event;
collecting or receiving, by a location system, location data, wherein the location data corresponds to a location of a tracking module carried by the player, and wherein the location data comprises or is used to generate a plurality of sets of location coordinates, each set of location coordinates corresponding to a location of the tracking module at a specified time; and
pairing the time stamp with a set of the location coordinates corresponding to the location of the tracking module at the occurrence of the stroke event, wherein the companion device includes an interface configured to receive the input corresponding to the stroke event, wherein the stroke event comprises address and ball hit, and wherein the interface includes an indicator configured to be pressed to indicate that the player is addressing the ball and held until the player hits the ball to indicate that the ball has been hit.

14. The method of claim 13, wherein the companion device is carried by a scorer that accompanies a group of players including the player, and wherein the companion device receives inputs corresponding to stroke events for all players in the group.

15. A score tracking method, the method comprising:
receiving, from a companion device, an input corresponding to a stroke event of a player competing in a golf tournament, wherein the input includes a time stamp corresponding to an occurrence of the stroke event;
collecting or receiving, by a location system, location data, wherein the location data corresponds to a location of a tracking module carried by the player, and wherein the location data comprises or is used to generate a plurality of sets of location coordinates, each set of location coordinates corresponding to a location of the tracking module at a specified time; and
pairing the time stamp with a set of the location coordinates corresponding to the location of the tracking module at the occurrence of the stroke event, wherein the stroke event is input into the companion device by a scorer viewing a live video of the golf tournament.

16. The method of claim 15, wherein the stroke event includes ball hit, and wherein the location of the tracking module at the occurrence of the stroke event is used as a proxy for location of a ball of the player carrying the tracking module resulting from a previous stroke.

17. The method of claim 15, wherein the tracking module operates as a beacon in a location network.

18. The method of claim 17, wherein the location network utilizes ultra-wide band positioning.

19. The method of claim 15, wherein the tracking module is configured to transmit the location data to the location system.

20. The method of claim 15, wherein the location tracking system is configured to receive the location data from a location network, and wherein the location network is configured to calculate the plurality of sets of location coordinates.

21. The method of claim 15, wherein the location data collected or received by the location system comprises locating data that the location system uses to calculate the location coordinates.

22. The method of claim 15, wherein the plurality of sets of location coordinates comprise sets of GPS coordinates.

23. The method of claim 15, wherein the plurality of sets of location coordinates comprise sets of ultra-wide band positioning coordinates.

24. The method of claim 15, wherein the tracking module is configured to collect location data at predefined first intervals and transmit the collected location data to the location system at predefined second intervals, wherein the second intervals are greater than the first intervals.

25. The method of claim 15, further comprising segmenting holes of a golf course into zones, each zone corresponding to a range of location coordinates, and determining a current zone the tracking module is located from the plurality of sets of location coordinates.

26. A score tracking method, the method comprising:
receiving, from a companion device, an input corresponding to a stroke event of a player competing in a golf tournament, wherein the input includes a time stamp corresponding to an occurrence of the stroke event;
collecting or receiving, by a location system, location data, wherein the location data corresponds to a location of a tracking module carried by the player, and wherein the location data comprises or is used to generate a plurality of sets of location coordinates, each set of location coordinates corresponding to a location of the tracking module at a specified time; and
pairing the time stamp with a set of the location coordinates corresponding to the location of the tracking module at the occurrence of the stroke event, wherein the stroke event is input into the companion device by a scorer viewing a video replay of the golf tournament.

27. The method of claim 26, wherein the stroke event includes ball hit, and wherein the location of the tracking module at the occurrence of the stroke event is used as a proxy for location of a ball of the player carrying the tracking module resulting from a previous stroke.

28. The method of claim 26, wherein the tracking module operates as a beacon in a location network.

29. The method of claim 28, wherein the location network utilizes ultra-wide band positioning.

30. The method of claim 26, wherein the tracking module is configured to transmit the location data to the location system.

31. The method of claim 26, wherein the location tracking system is configured to receive the location data from a location network, and wherein the location network is configured to calculate the plurality of sets of location coordinates.

32. The method of claim 26, wherein the location data collected or received by the location system comprises locating data that the location system uses to calculate the location coordinates.

33. The method of claim 26, wherein the plurality of sets of location coordinates comprise sets of GPS coordinates.

34. The method of claim 26, wherein the plurality of sets of location coordinates comprise sets of ultra-wide band positioning coordinates.

35. The method of claim 26, wherein the tracking module is configured to collect location data at predefined first intervals and transmit the collected location data to the location system at predefined second intervals, wherein the second intervals are greater than the first intervals.

36. The method of claim 26, further comprising segmenting holes of a golf course into zones, each zone corresponding to a range of location coordinates, and determining a current zone the tracking module is located from the plurality of sets of location coordinates.

\* \* \* \* \*